US010521813B2

(12) United States Patent
Okerlund

(10) Patent No.: US 10,521,813 B2
(45) Date of Patent: Dec. 31, 2019

(54) SYSTEM AND METHOD FOR INCENTIVES

(75) Inventor: Michael D. Okerlund, Minneapolis, MN (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 13/176,883

(22) Filed: Jul. 6, 2011

(65) Prior Publication Data

US 2013/0080239 A1     Mar. 28, 2013

Related U.S. Application Data

(60) Provisional application No. 61/399,104, filed on Jul. 6, 2010, provisional application No. 61/460,325, filed on Jan. 3, 2011, provisional application No. 61/518,232, filed on May 2, 2011.

(51) Int. Cl.
| | |
|---|---|
| *G06Q 30/00* | (2012.01) |
| *G06Q 30/02* | (2012.01) |
| *G06Q 20/34* | (2012.01) |
| *G06Q 20/38* | (2012.01) |

(52) U.S. Cl.
CPC ......... *G06Q 30/0226* (2013.01); *G06Q 20/34* (2013.01); *G06Q 20/387* (2013.01)

(58) Field of Classification Search
CPC .......................................... G06Q 30/00–0284
USPC .............................................. 705/14.1–14.73
See application file for complete search history.

(56) References Cited

U.S. PATENT DOCUMENTS

| | | | |
|---|---|---|---|
| 5,689,100 A | 11/1997 | Carrithers | |
| 5,732,136 A | 3/1998 | Murphree et al. | |
| 5,956,695 A | 9/1999 | Carrithers et al. | |
| 7,006,983 B1 | 2/2006 | Packes | |
| 8,135,505 B2 | 3/2012 | Vengroff | |
| 2002/0026348 A1 | 2/2002 | Fowler et al. | |
| 2002/0143626 A1 | 10/2002 | Voltmer et al. | |

(Continued)

FOREIGN PATENT DOCUMENTS

| | | |
|---|---|---|
| EP | 0 948 767 A1 | 10/1999 |
| EP | 0948767 A4 | 1/2000 |

(Continued)

OTHER PUBLICATIONS

United States General Accounting Office, U. S. Credit Card Industry; An Assessment of Its Competetiveness, Apr. 28, 1994—pp. 56-57 and passim, DIANE Publishing Company.

(Continued)

*Primary Examiner* — John Van Bramer
(74) *Attorney, Agent, or Firm* — Alston & Bird LLP

(57) ABSTRACT

The invention relates generally to systems and methods for the non-public creation, distribution and redemption of incentive offers. More particularly, the system and method generates incentives based on parameters selectable by merchants. The system and method constructs non-public incentive offers that are delivered to one or more program registrants satisfying a designated targeting profile and associated with one or more electronic payment instruments. Incentive offers may be redeemed confidentiality by the program registrant tendering an electronic payment instrument satisfying the parameters of the incentive offer. The invention further relates to systems and methods for participants to exert control over the volume and kind of incentives received through the system and by third party entities.

20 Claims, 37 Drawing Sheets

(56) References Cited

U.S. PATENT DOCUMENTS

| | | |
|---|---|---|
| 2004/0073482 A1 | 4/2004 | Wiggins |
| 2007/0156530 A1* | 7/2007 | Schmitt .................. G06Q 30/02 705/14.17 |
| 2008/0059297 A1 | 3/2008 | Vallier et al. |
| 2008/0097851 A1 | 4/2008 | Bemmel et al. |
| 2009/0030789 A1 | 1/2009 | Mashinsky |
| 2010/0106568 A1 | 4/2010 | Grimes |
| 2010/0106569 A1 | 4/2010 | Grimes |
| 2010/0106577 A1 | 4/2010 | Grimes |
| 2010/0106596 A1 | 4/2010 | Grimes |
| 2010/0106598 A1 | 4/2010 | Grimes |
| 2010/0179856 A1 | 7/2010 | Paretti et al. |
| 2010/0250351 A1 | 9/2010 | Gillenson et al. |
| 2010/0250356 A1 | 9/2010 | Gillenson et al. |
| 2010/0250359 A1 | 9/2010 | Gillenson et al. |
| 2010/0287103 A1 | 11/2010 | Mason |
| 2011/0029363 A1 | 2/2011 | Gillenson et al. |
| 2012/0310736 A1 | 12/2012 | Vengroff |
| 2013/0006770 A1 | 1/2013 | Vengroff |

FOREIGN PATENT DOCUMENTS

| | | | |
|---|---|---|---|
| EP | 1 631 930 | 3/2006 | |
| EP | 1631930 A2 * | 3/2006 | ............ G06Q 20/06 |
| EP | 1631930 A2 | 3/2006 | |
| EP | 1907974 A2 | 4/2007 | |
| EP | 1 907 974 A2 | 4/2008 | |

OTHER PUBLICATIONS

E.Garrison Walters, The Essential Guide to Computing, The Story of Information Technology, 2001; pages Passim; Prentice Hall PTR; Saddle River, New Jersey, USA, 07458.

United States General Accounting Office, "U.S. Credit Card Industry: An Assessment of its Competitiveness," (Apr. 28, 1994): pp. 66 and 67 and passim, DIANE Publishing Company.

E. Garrison Walters, "The Essential Guide to Computing, The Story of Information Technology," (2001): pages Passim, Prentice Hall PTR; Saddle River, NJ, US 07458. pp. 240-247.

* cited by examiner

Stored Value
Transaction Processing

Exemplars of processing utilized by various categories of EPIs. Any EPI may be utilized without departing from the scope of the invention. Regardless of the EPI used, any entity involved in the transaction processing has the potential and may communicate transaction data to the IPM Debit Card Processing Targeted Incentives & Filter Fig. 16 is Exemplar data associated with one of many customer records that are managed by the Incentive Program Manager (IPM). The data (e.g. Figs. 16B1-B7) associated with one customer account (Fig 16C2) need not be co-extensive with the information associated with each customer (collectively depicted as 16C1).

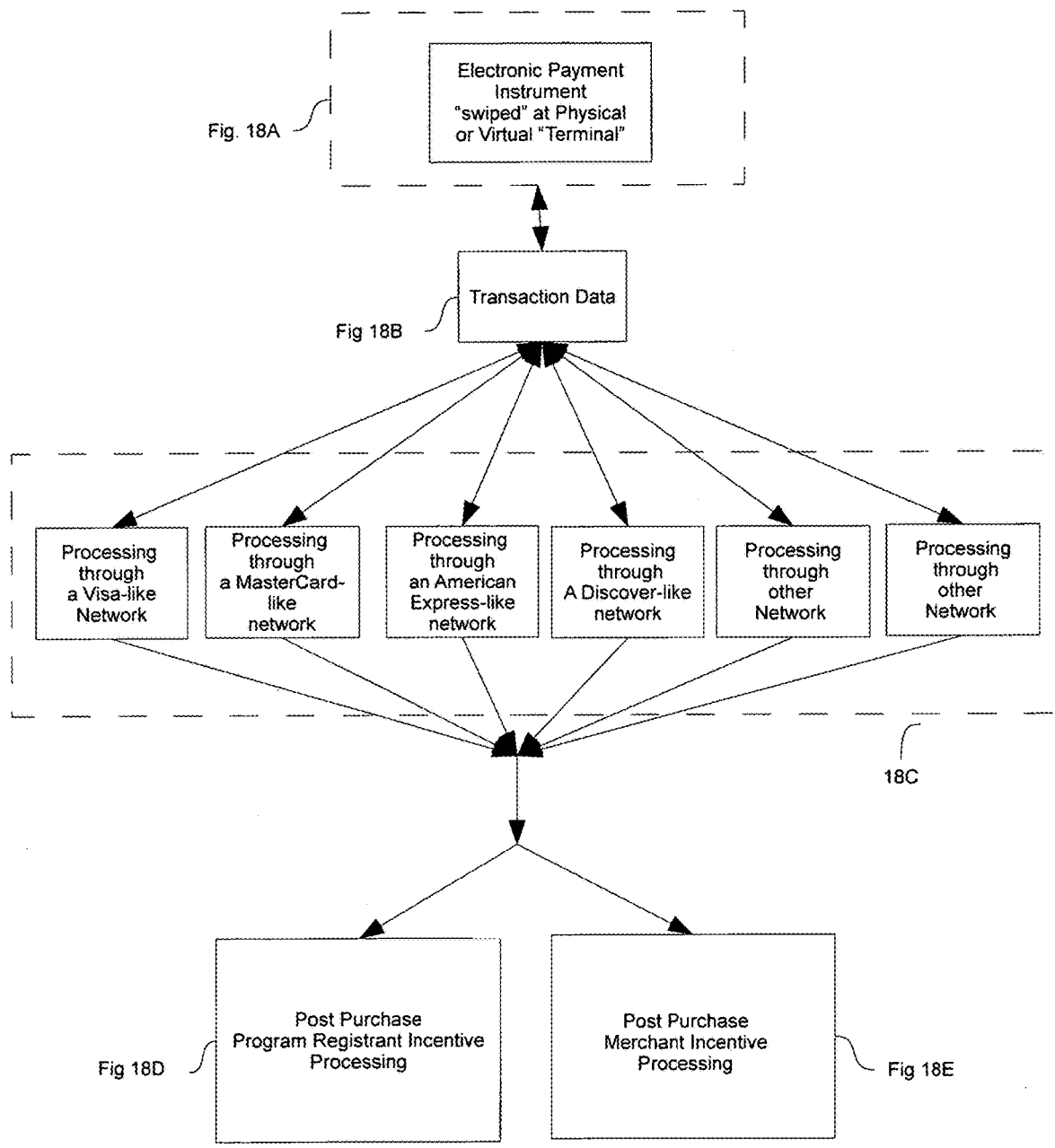

Depicts the variety of processing systems that the stealth transaction can utilize, i.e., all of them. With the MasterCard and Visa systems, which employ merchant acquirers, an interchange system, and an issuing bank (the components of which are captured here, though not specifically depicted) as part of their transaction processing and settlement, a network identical or similar to that employed by American Express, Discover, and other cards, (including stored value and debit cards running on other systems) can also be used. 90A can, in some embodiments, be part of the IPM.

Fig 18

Name: Account#: Program

| Date | Merchant ID | Eligible transaction amount | Reward | Transaction Fee | Reward | Status | Applied |
|---|---|---|---|---|---|---|---|
| 5-10-2010 | Olive Garden™ (R) | 32.00 | 50% | 1.6 | 14.20 | Delivered | Applied to Card# XXXX XXXX XXXX 4921 |
| 5-14-2010 | Stumble Inn™ (R) | 60.00 | 20% | 1.20 | 10.80 | Delivered | Applied to Card# XXXX XXXX XXXX 4921 |
| 5-20-2010 | Super 8 ™ (H) | 10% | 10% | .92 | 8.28 | Delivered | Applied to Account # XXXX 5764 |
| 5-25-1010 | Grill & Bar (R) | 15.00 | 33% | .50 | 4.5 | Delivered | Applied to Card# XXXX XXXX XXXX 4921 |
| 5-29-2010 | Salon (S) | 80.00 | 25% | 2.00 | 18.00 | Pending | Applied to Account # XXXX 5764 |
| 5-30-2010 | Waldorf™ (H) | 200.00 | 30% | 6.00 | 54.00 | Pending | Applied to Account # XXXX 5764 |
| 23A | 23B | 23C | 23D | 23E | 23F | 23G | 23H |

Stumble Inn by the Lake
Incentive Offer

25% cash back reward on purchases
over $30.00 with enrolled EPI on
December 29, 2010

REJECT          HAGGLE

24B

So You Want To Counteroffer?

Reward

Cash Back
Apply to Card ⬅
$ Discount         30%
Other              35% ⬅
                   Other

Amount ⬅
                   $50.00
                   $100.00 ⬅
                   Other

ACCESS ONLINE MENU

COUNTEROFFER

Figure 24

Participant Interface

Login: Secure Server

FIG.26A1 — Your Incentives ENTER

FIG.26A2 — User Name / Password

FIG.26A3 — Clink to link securely to your existing financial accounts and transaction data, including credit and debit card, gift cards, checking accounts, banking, and other financial or transaction data

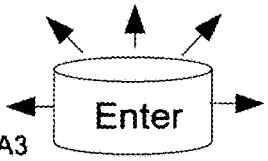

Enter

FIG.26A4 — Click here to link to other linkable accounts that may be relevant to the construction of your incentives, such as Facebook, LinkedIn, online calender, travel data, cloud-based or maintained information.

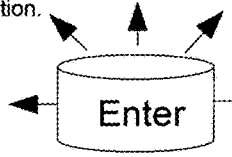

Enter

FIG.26A5 — Clink here to identify with precision what kinds of offers interest you. Restaurants? Hotels? Goods? Services?

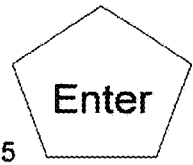

Enter

FIG.26A6 — Click here to manage how you want, when you want, and at what time you want to receive any relevant incentives. Click here to manage how you want to receive your rewards, and where you want to receive them.

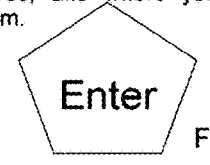

Enter

Incentive Filter

FIG.26A7

Designate third party coupon or incentive entities that you want to proactively filter, and dictate the criteria by which they should be filtered. We know you're busy, so we will filter all incentives, delete undesirable incentives from your email or otherwise restrict the delivery to the number and kind of incentives that match your designated criteria. You may spot check "filtered" incentives at any time, and adjust your filters accordingly.

- Permitted number of incentives in a designated period of time
- Permitted kinds of incentives
- Minimally acceptable terms of incentive types
- Blocker: blocked merchants & classes of merchants
  - Block merchants with policies or politics you disagree with
  - Block politically active merchants
  - Block environmentally unfriendly merchants
  - etc.

Active Filters

- ☒ Groupon
- ☒ Living Social
- ☒ BuyWithMe
- ☒ DealOn
- ☐ Homerun
- ☒ KGB Deals
- ☐ TIPPR
- ☒ "Other . . .

Fig. 26

Participants

| Participant ID | Last Name | First Name | Middle Name | Street Address | City | State | Zip Code | Geo Location Data Field 1 (GLDF1) | GLDF2 | GLDF3 | GLDF4 |
|---|---|---|---|---|---|---|---|---|---|---|---|
| 3 | Okerlund | Michael | D. | 65 Oakwood Drive | Minneapolis | MN | 55428 | 44.94656 | 44.94475 | -93.29959 | -93.29699 |
| 4 | Boebel | Nicholas | S. | 47 Front Street | Minneapolis | MN | 55410 | 44.9126 | 44.91063 | -93.32532 | -93.32384 |
| 5 | Smith | Sara | J. | 87 Rice Blvd | St. Paul | MN | 55063 | 44.9437 | 44.9427 | -93.1433 | -93.1414 |
| 6 | Jones | Roberta | W. | 10 Washington St | Eden Prairie | MN | 55344 | 44.8539 | 44.8536 | -93.42 | -93.4195 |
| 7 | Senara | Joshua | | 900 Tribune Blvd. | Maple Grove | MN | 58456 | 45.08237 | 45.07952 | -93.45901 | -93.4542 |

Figure 27A

Participant Planned Travel & Needs

| Participant ID | Planned Geo Location 6/27/2012 | Category Desired Incentives 6/27/2012 | Planned Geo Location 6/28/2012 | Category Desired Incentives 6/28/2012 |
|---|---|---|---|---|
| 1 | Washington, DC | Hotel, High End; Restaurant, Dinner, High End | New York, NY | Hotel, High End |
| 2 | San Francisco, CA | Hotel, High End; Restaurant, Lunch, Dinner, Mid- High End | Miami, FL | Hotel, High End; |
| 3 | Home | Profile | Home | Profile |
| 4 | Chicago, IL | Hotel, High End | Home | Profile |
| 5 | London, England | Hotel Mid to High End; Restaurant, Breakfast, Lunch, Dinner Mid-range | Paris, France | Hotel, High End |

Figure 27B

Participant Food Preferences

| Participant ID | Likes Italian | Likes Chinese | Likes American | Likes Mexican | Likes French | Likes Thai | Likes Greek | Likes German | Likes Fusion |
|---|---|---|---|---|---|---|---|---|---|
| 1 | True | True | True | True | False | False | True | False | False |
| 2 | True | False | True | False | True | False | False | False | False |
| 3 | False | True | False | False | False | True | False | False | True |
| 4 | False | False | False | True | True | False | False | True | True |
| 5 | True | True | True | False | True | True | False | False | False |
| 6 | False | False | True | False | False | False | False | False | False |
| 7 | True | False | False | True | False | False | False | True | True |
| 8 | True | False | True | True | False | False | False | False | False |

Figure 28A

Items Purchased

| Transaction ID | EPI Number | Participant ID | Merchant ID | ITEM 1 Purchased | ITEM 1 ID | Number Purchased | Price | Date |
|---|---|---|---|---|---|---|---|---|
| 1 | 4716204639950696 | 3 | | Heinz Ketchup | 1300X0574 | | $2.85 | 9/26/2011 |

Figure 28B

Electronic Payment Instruments

| Participant ID (account owner) | EPI Number | EPI Type | EPI Issuer | Authorized Card? | Participant ID | Expiration Date |
|---|---|---|---|---|---|---|
| 1 | 5105105105105100 | MasterCard | Citibank | True | 2 | 2/10/2012 |
| 2 | 4716204638950696 | VISA | Chase | True | 3 | 1/4/2014 |
| 3 | 376254803268183 | American Express | American Express | True | 3 | 1/26/2012 |
| 4 | 371449635398431 | American Express | American Express | True | 1 | 7/31/2015 |
| 5 | 3566002020360505 | JCB | Suntrust | False | 5 | 8/31/2016 |
| 6 | 4013888888881881 | VISA | US Bank | False | 4 | 12/1/2011 |
| 7 | 6011266328013767 | Discover | Discover | True | 1 | 10/31/2011 |

Figure 28C

Merchants

| Merchant ID | Merchant Name | Merchant Type | Sub-type | GLDF1 | GLDF2 | GLDF3 | GLDF4 | Street | City | State |
|---|---|---|---|---|---|---|---|---|---|---|
| 1 | Chili's | Grocery | American | 44.97027 | -93.33475 | -93.33224 | 44.96907 | 213 Terripen Way | Minneapolis | MN |
| 2 | CUB Foods | Grocery | Discount | 44.8944 | -93.2937 | -93.2895 | 44.8919 | 6388 Nicollet | Minneapolis | MN |
| 3 | Rainbow Foods | Grocery | Discount | 44.94997 | -93.29433 | -93.29325 | 44.94954 | 43 Lake Street | Minneapolis | MN |
| 4 | Albertson's | Grocery | Standard | 41.814 | -88.105 | -88.101 | 41.813 | 17 Penbroke Ln | Wheaton | IL |
| 5 | Azia | Restaurant | Asian | 44.96123 | -93.27818 | -93.27786 | 44.96095 | 1975 Nicollet | Minneapolis | MN |
| 6 | McDonalds | Restaurant | Fast food | 44.95892 | -93.27826 | -93.27791 | 44.9586 | 366 York Ave | Minneapolis | MN |
| 7 | McCormick & Schmick | Restaurant | High End | 44.975425 | -93.274177 | -93.273775 | 44.975121 | 900 LaSalle St. | Minneapolis | MN |
| 8 | Macy's | Department Store | M-H End | 44.976909 | -93.274027 | -93.272836 | 44.976085 | 9388 Mall of America Drive | Minneapolis | MN |
| 9 | Bloomingdales | Department Store | M-H End | 44.85679 | -93.24635 | -93.23824 | 44.85259 | 9388 Mall of America Drive | Minneapolis | MN |
| 10 | Target | Retailer | Discount | 44.87771 | -93.32123 | -93.31823 | 44.87403 | 6599 France Avenue | Minneapolis | MN |
| 11 | Wal-Mart | Retailer | Discount | 44.95537 | -93.16174 | -93.16037 | 44.95419 | 9884 University Ave. | St. Paul | MN |
| 12 | Kmart | Retailer | Discount | 44.95007 | -93.27941 | -93.27711 | 44.94935 | 384 Lake Street | Minneapolis | MN |
| 13 | Olive Garden | Restaurant | Italian | 44.96998 | -93.33353 | -93.3316 | 44.96873 | 89 Washington St. | Minneapolis | MN |
| 14 | Marriott | Hotel | M-H End | 44.97784 | -93.27374 | -93.27299 | 44.9774 | 2443 Xerxes | Minneapolis | MN |
| 15 | Hilton Minneapolis | Hotel | Standard | 44.97268 | -93.27354 | -93.272237 | 44.9721 | 785 California Ave. | Minneapolis | MN |

Fig 29A

Incentive Profile Data

| Incentive ID | Number of Incentives | Profile Requirement | Profile Requirement 2 | Disqualifier 1 | Geo Target 1 | GT 2 |
|---|---|---|---|---|---|---|
| 1 | 5500 | N/A | N/A | N/A | Region: S. Minneapolis | N/A |
| 3 | 10000 | Likes: Wal-Mart | N/A | Target: No Purchases 60 days | National | N/A |
| 4 | 75 | Likes: Italian | Likes: "Competitor" | Likes: "Olive Garden" | 55344 | 55419 |
| 5 | 24 | Likes: Fairmont | Location: In Minneapolis 1/4 - 1/6 | N/A | National | N/A |

Fig 30A

Incentive Data Table

| Incentive ID | Offering Merchant | Redemption Start | Redemption End | Minimum Purchase | Nature of Reward | Reward Calculation | Repeat Use? |
|---|---|---|---|---|---|---|---|
| 1 | Cub Foods | 8/15/2011 | 8/26/2011 | $0.00 USD | Cash Rebate | Purchase x 0.25% | True |
| 2 | Target | 11/3/2011 | 12/10/2011 | 0.01 USD | Cash Rebate | 10.00 USD | False |
| 3 | Olive Garden | 4/7/2012 | 5/7/2012 | 25.00 USD | Variable: Gift Cert or Disc. Bill | 10.00 GC or 25% discount | True |
| 4 | Macy's | 4/1/2013 | 5/1/2013 | 200.00 USD | Cash Rebate | 50.00 USD | False |
| 5 | Marriott | 1/4/2013 | 1/6/2013 | 187.00 | Variable: free stay or rebate | Free Stay or rebate of purchase x 0.4% | False |

| Participant ID | Preferred Method of Reward Receipt | Method of receiving Reward ||||  |
|---|---|---|---|---|---|
| | | Reward Destination | Pay To | Account Holder | Account Number | Routing Number |
| 1 | Check, via mail | Home Address | Participant | N/A | N/A | N/A |
| 2 | Automatic deposit | Designated Account | Participant | Participant | ###-###-2567 | ###-###-7785 |
| 3 | Pay down EPI Utilized | EPI Issuer | EPI Issuer | Participant | 376254803268183 | N/A |
| 4 | Check | Other Address | Mr. John S. Ridgefield | N/A | N/A | N/A |

Fig 31B

| Participant ID | Average Purchase per Month at Merchant X | Participant Spending Deviation from Population ||| |
|---|---|---|---|---|---|
| | | Spending Deviation from average at Merchant X | Average purchase per month at Merchant Y | Spending Deviation from average at Merchant Y |
| 2 | 100.00 USD | +50% Higher | 25.00 USD | +20% Higher |
| 3 | 50.00 USD | 0% Higher | 40.00 USD | +100% Higher |
| 4 | 40.00 USD | -20% Less | 10.00 USD | -50% Lower |

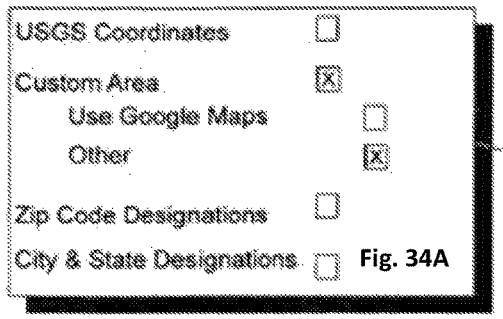

Fig. 34A

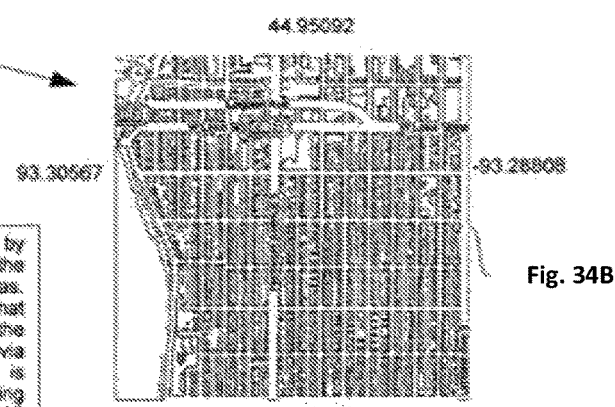

Fig. 34B

Geographic distribution module. Limit distribution by designating one or more targeted areas, and limit the distribution of your incentives to entities in these areas. Incentive target Areas are designated here utilizing a map that enables the user to designate a target area and obtain the coordinates thereof. In this instance, the map generated via Map data (© OpenStreetMap contributors, CC-BY-SA) is determined to be bounded by the following coordinates:44.95092 x -93.28808 x 44.93773 x -93.30567 (which collectively define the four coordinates for the map of the "Uptown" region of Minneapolis, MN. In one embodiment, the boundaries of the target area are then compared with the participant location data to determine whether the Participant resides within the targeted area. Any method of designating location may be employed without departing from the scope of the invention, and the designation of an area need not be so precisely defined, but may simply be the possible inclusion of participants via zip code, or within a designated radius or area from a designated point. Note that in the excerpt from the table below the participants, themselves, can supply an address, a zip code, or designated a position on a map, which can be matched to coordinates. In the table below, the GLDF fields 1-4 define a small area where the Participant is known to reside. In other embodiments, two coordinates alone are sufficient to pinpoint their location

Fig. 34C

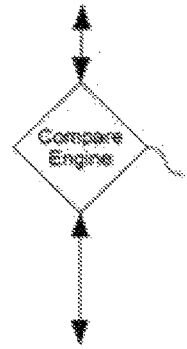

Fig. 34D

Table within database, showing location coordinates for participants

| ID | Last Name | First Name | Middle Name | Street Address | City | State | Zip Code | Geo Location Data Field 1 (GLDF1) | GLDF2 | GLDF3 | GLDF4 |
|---|---|---|---|---|---|---|---|---|---|---|---|
| 3 | Okerlund | Michael | D. | 85 Oakwood Drive | Minneapolis | MN | 55415 | 44.94656 | 44.94475 | 93.29853 | 93.29699 |
| 4 | Boebel | Nicholas | S. | 47 Front Street | Minneapolis | MN | 55410 | 44.9126 | 44.91063 | 93.32332 | 93.32364 |
| 5 | Smith | Sara | J. | 97 Rice Blvd | St. Paul | MN | 55063 | 44.9437 | 44.9427 | 93.1433 | 93.1414 |
| 6 | Jones | Roberta | W. | 10 Washington St | Eden Prairie | MN | 55344 | 44.8539 | 44.8536 | 93.42 | 93.4195 |
| 7 | Seneca | Joshua | | 300 Tribune Blvd. | Maple Grove | MN | 55356 | 45.08237 | 45.07952 | 93.45301 | 93.4542 |

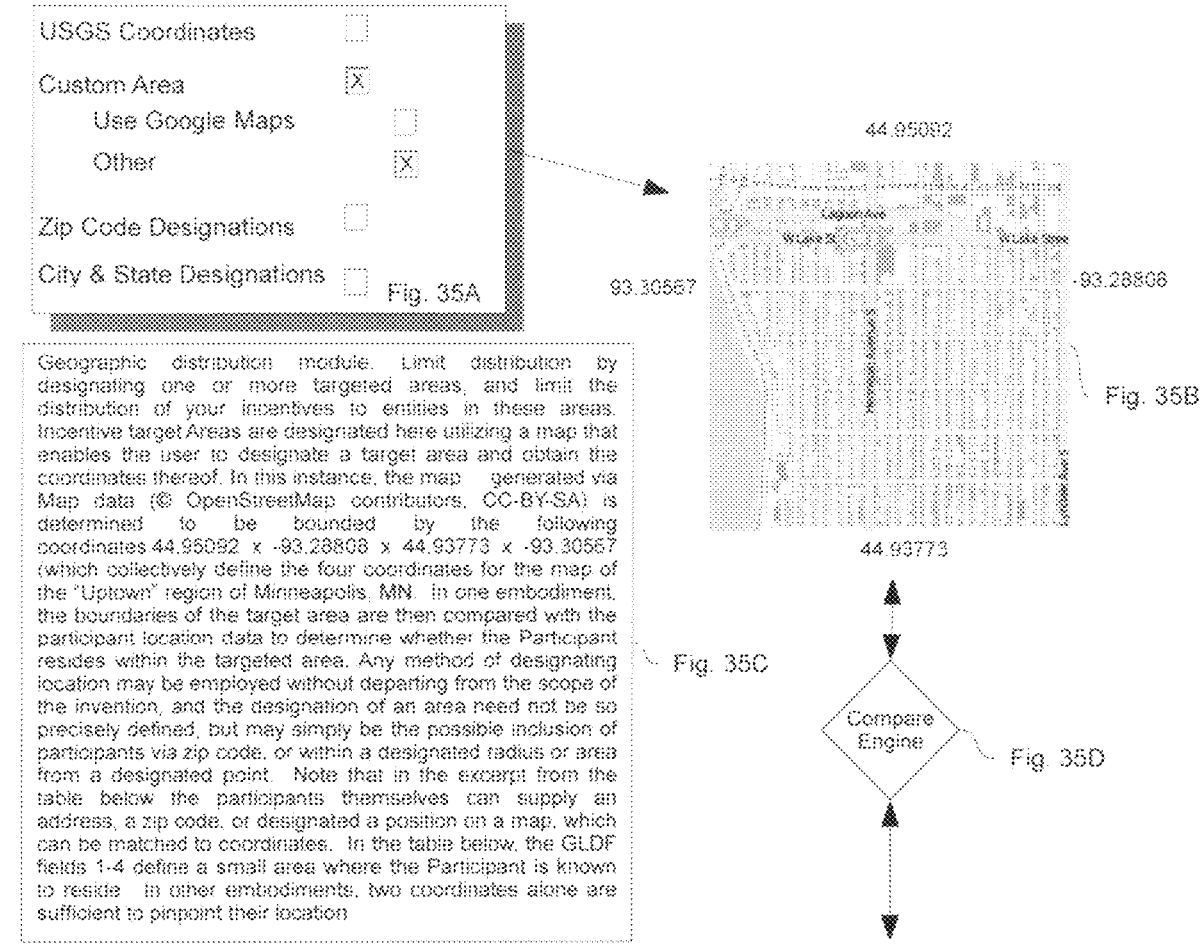

SYSTEM AND METHOD FOR INCENTIVES

CROSS-REFERENCES TO RELATED APPLICATIONS

The instant application is related to application U.S. 61/399,104 filed on Jul. 6, 2010 and application U.S. 61/460,325, filed on Jan. 3, 2011, and application 61/518,232, filed on May 2, 2011 each of which is herein incorporated by reference in its entirety.

SUMMARY

A system and method for merchants to target and disseminate incentive offers that a customer and/or potential customer registered for an incentive program (program registrant) can access through one or more of a variety of electronic systems and the redemption of said offers by program registrants utilizing an electronic payment instrument. In various embodiments, the identification, targeting, communication, redemption processing, and reward delivery related to incentive offers can be processed through an incentive program manager. In one embodiment, the incentive program manager can further provide redemption processing and reward delivery whereby the amount paid and shown on a receipt provided at the merchant location is an undiscounted amount, with an incentive or rebate amount provided to the customer either post-sale by, for example, depositing the incentive amount, such as a reward or discount, into an account, such as a savings or checking account or applying it to a pre-existing debt.

The system and method may allow an incentive program manager to handle the targeting, processing, and delivery of the incentive offers, and further handle the processing of the incentive offer redemption and reward delivery based upon making purchases with an electronic payment instrument, freeing the program registrant from any obligation to physically present an incentive offer to the merchant, freeing the merchant from any obligation to process the redemption of the incentive offer, and providing enhanced privacy protections to the program registrant. In some embodiments, where the incentive offer delivery and redemption are both processed by an incentive program manager, the incentive program manager can receive above average processing fees from one or more of merchants and program registrants, and further provide data analysis and other consulting services to one or more of merchants and program registrants relating to the identification of and delivery of targeted incentive offers to program registrants.

The system and method further provides means for participants to exert control over the volume and kind of incentives received though the implementation incentive screening, thereby eliminating the need to review and dispose of unwanted offers.

BRIEF DESCRIPTION OF THE DRAWINGS

FIG. 10-1 is a diagram of the transmission of data among various entities involved in an electronic payment instrument or EPI transaction in one embodiment;

FIG. 10-2 is a diagram of the transmission of data among various entities involved in an EPI transaction in one embodiment;

FIG. 18 is a diagram of processing methods that can be utilized in conjunction with an EPI transaction at a brick and mortar merchant and/or at a virtual merchant in one embodiment;

FIG. 23 illustrates how notification about incentive offer redemption and reward may be provided to a program registrant in one embodiment;

FIG. 24 illustrates one embodiment of a haggling function, where one or more terms of an incentive may be negotiated or renegotiated;

FIG. 25B is an example of sub-screen of a merchant interface that may be utilized to limit distribution of incentives to individuals residing in a geographic region in one embodiment;

FIG. 26 is an example of a participant interface that may be employed to enable participants to manage incentives in one embodiment;

FIG. 27A illustrates an example of one part of a data table, utilized in conjunction with a computer database, wherein information regarding individual program participants may be entered, stored, accessed, retrieved and manipulated in conjunction with the creation, deployment and redemption of incentives in one embodiment;

FIG. 27B illustrates an example of one part of a data table, utilized in conjunction with a computer database, wherein information regarding anticipated future needs of individual program participants may be entered, stored, accessed, retrieved and manipulated in conjunction with the creation, deployment and redemption of incentives in one embodiment;

FIG. 28A illustrates an example of one part of a data table, utilized in conjunction with a computer database, wherein information regarding individual program participants' preferences (here, food preferences) may be entered, stored, accessed, retrieved and manipulated in conjunction with the creation, deployment and redemption of incentives in one embodiment;

FIG. 28B illustrates an example of one part of a data table, utilized in conjunction with a computer database, wherein information regarding an individual program participant's aggregated purchases of specific items, may be entered, stored, accessed, retrieved and manipulated in conjunction with the creation, deployment and redemption of incentives in one embodiment;

FIG. 28C illustrates an example of one part of a data table, utilized in conjunction with a computer database, wherein information regarding electronic payment instruments (EPIs) may be entered, stored, accessed, retrieved, deleted and manipulated in conjunction with the creation, deployment and redemption of incentives in one embodiment;

FIG. 29A illustrates an example of one part of a data table, utilized in conjunction with a computer database, wherein information regarding merchants may be entered, stored, accessed, retrieved and manipulated in conjunction with the creation, deployment and redemption of incentives in one embodiment;

FIG. 30A illustrates an example of one part of a data table, utilized in conjunction with a computer database, wherein information regarding incentive "profile" or "targeting" data may be entered, stored, accessed, retrieved and manipulated in conjunction with the creation, deployment and redemption of incentives in one embodiment;

FIG. 30B illustrates an example of one part of a data table, utilized in conjunction with a computer database, wherein information regarding incentive data may be entered, stored, accessed, retrieved and manipulated in conjunction with the creation, deployment and redemption of incentives in one embodiment;

FIG. 31A illustrates an example of one part of a data table, utilized in conjunction with a computer database, wherein information regarding methods of receiving a reward may be entered, stored, accessed, retrieved and manipulated in conjunction with the creation, deployment and redemption of incentives in one embodiment;

FIG. 31B illustrates an example of one part of a data table, utilized in conjunction with a computer database, wherein information regarding participant past spending data (including spending data from disparate EPIs, where enabled, may be entered, stored, accessed, retrieved and manipulated in conjunction with the creation, deployment and redemption of incentives in one embodiment;

FIG. 34 is an exmplar depiction of an underlying GUI specific to the entry of data in accordance with one emobidment.

DETAILED DESCRIPTION OF CERTAIN EXEMPLARY EMBODIMENTS

Figure 1:
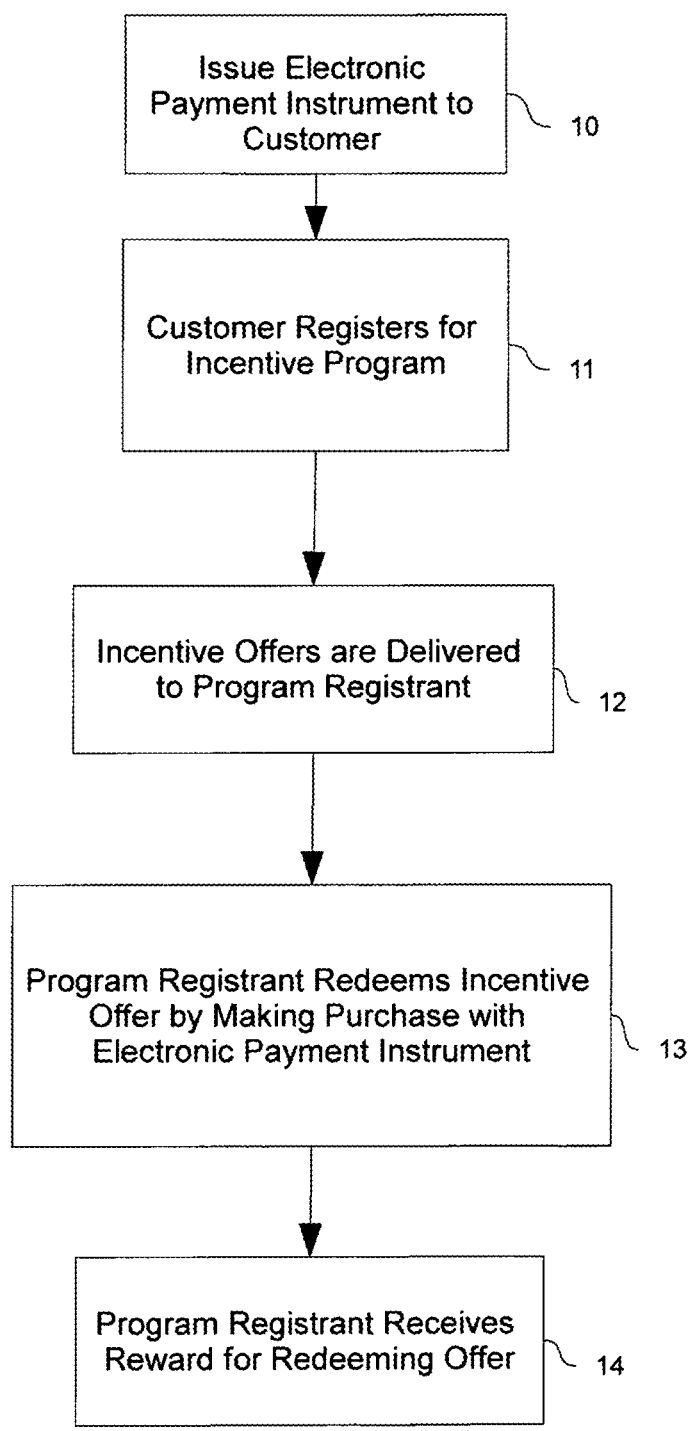
FIG. 1 is a schematic diagram of one process for the distribution and redemption of incentives in accordance with one embodiment.

In the following detailed description, reference is made to the accompanying drawings which form a part hereof, and in which is shown by way of illustration of certain specific embodiments how the present disclosure may be practiced. These embodiments are described in sufficient detail to enable those skilled in the art to practice aspects of this disclosure, and it is to be understood that other embodiments may be utilized. Structural changes may be made without departing from the scope of the present disclosure. Therefore, the following detailed description is not to be taken in a limiting sense, and the scope of the present invention is defined only by the claims and their equivalents.

What follows is a detailed description of certain exemplary embodiments. What follows is not an exhaustive list of all embodiments. Instead, the description covers exemplary embodiments and equivalents.

A. Participants in the Incentive Generation and Redemption System and Method

In an embodiment of the system and method of the disclosure, the system and method is operated through the collaboration of an incentive program manager, one or more program registrants, and one or more merchants.

1. Incentive Program Manager

An incentive program manager or "IPM" is one or more entities or organizations that alone or in concert manage and otherwise operate the incentive program system and method of this disclosure. The IPM could, in fact, be any person, entity, organization or institution (or combination thereof) capable of alone (or in concert with others) performing some or all IPM functions. In various embodiments, the IPM may be a credit, debit, or check card issuer (e.g., a commercial bank) or servicer, or may be one or more card networks or interchanges, such as the Visa or MasterCard networks. The IPM can also be one or more merchant acquirers. The IPM may also be one or more third party companies or entities that function individually or collectively to enable the system. In one embodiment an entity (such as a social networking entity) may alone or in combination with other entities, be utilized so long as it has access to (or otherwise draws upon) the data necessary to at least minimally enable the system and method.

One IPM function can be that an entity (or entities cooperating to perform one or more functions of incentive program management) be able to access data relevant to the identification and targeting of a potential recipient of an incentive offer. What qualifies as "relevant data" or "useful consumer data" is quite broad, and may include (solely by way of example) data on a consumer's past purchases, individual preferences, habits, travel patterns, dislikes, and associations, among many other things. The sources of such data can include data on past purchases that is maintained in, for example, a database maintained by a card-issuing bank. Data may also include information on an individual's travel patterns, as evidenced by GPS data generated in whole or in part by a cellular phone or a vehicle tracing device. Other data, including preference data, may be created or maintained by a third party social networking site, or data where information and preferences are provided by consumers for the purpose of eliciting incentive offers of most interest to them (e.g., where a customer proactively indicates that the are trolling for incentives for home improvement stores or for household appliances, for example). Databases and links of databases are discussed in additional detail, infra.

2. Program Registrants

Program registrants are registered with the incentive program manager, and in one embodiment are eligible to make purchases with an electronic payment instrument associated with the system and method for incentives of the present disclosure. Program registrants can be individuals, companies, or any other person or entity that makes purchases with an electronic payment instrument. Multiple program registrants may also share a joint account. The term "program registrant" broadly refers to any individuals that utilize the system and methods of the present disclosure, regardless of whether or not they formally "register" to utilize the program (which may not be a requirement in some embodiments). For example, an employer that wants to take advantage of the many advantages of the system and method may register all American Express cards issued to its employees to (for example) solicit company-wide incentives that may be redeemed using any company-issued American Express card. In such a situation, the employer manages the incentive, filter and reward aspects of the card (described infra) but the employee in possession of the company card (which is nevertheless a participant) does not him or herself "register" for the system.

3. Merchants

A merchant can be a seller of any type of good or service. Such merchants can include restaurants, airlines, retailers, grocery stores, car rental companies, hotels, electronics retailers, department stores, and mixed purpose stores (Targets and Walmarts), online retailers, wholesalers, manufacturers, component manufacturers, industry associations, service providers, etc. The system and method of the disclosure is robust and flexible enough to be used with any type of merchant that does or could potentially receive payment through use of any type of electronic payment instrument (EPI). For the sake of clarity, the term EPI refers broadly to any payment instrument that may be used in conjunction with a transaction, data from which may be transmitted electronically. EPI's would include all manner of credit, debit, gift cards and/or stored-value cards, to name a few. An EPI may also be a transaction-facilitating or transaction-enabling device that utilizes wireless communication technology, including any of a wide variety of communication utilizing electromagnetic means. Thus an EPI may be employed using radio frequency radio technology (e.g., Bluetooth-enabled devices) or other RF enabled payment mechanisms, such as those employing RFID technology. EPIs may be enabled utilizing Wi-Fi capabilities, including Wi-Fi devices employing security enhancements, such as IEEE 802.11i (WPA2) encryption standards. Other EPI devices compatible with the system and method include devices that employ infrared technology and communication protocols, including protocols standardized by the IrDA. By way of example, an EPI may employ "IrFM" Point & Pay technology for sending and receiving payment and transaction record information between mobile devices, such as handheld phones or PDAs and a financial terminal such as a Point-of-Sales (POS) device. In other embodiments, an EPI may be decidedly "low tech" and be comprised of an instrument with an identifier (alphanumeric, barcode, etc., to name a few) that can be employed to facilitate a transaction and transmit funds from consumer to merchant.

B. Issuance or Enrollment of an Electronic Payment Instrument

In one embodiment, an electronic payment instrument is issued.

In another embodiment, an electronic payment instrument is issued, the use of which is restricted to a specific person (such as a credit card issued to one person).

In yet another embodiment, an electronic payment instrument is issued to a person that is a participant or potential participant in an incentive program.

A system and method in accordance with yet another embodiment may be implemented utilizing pre-existing holders of electronic payment instruments, such as credit, debit, check, or gift cards who may register to participate in the incentive offer system and method, which in some embodiments is implemented by their pre-existing card servicers or issuers and in other embodiments is implemented by a third party, including third parties not affiliated with EPI-issuing entities such as banks. Whatever the nature of the electronic payment instrument, in most embodiments that instrument is enabled by the instrument issuer, servicer, and/or EPI holder to participate in the incentive program. It is worth noting that the system and method of the disclosure does not depend on any specific electronic payment instrument, and the system and method is sufficiently flexible to utilize other payment technologies including biometric information (e.g. a fingerprint scanner), EM technology, radio frequency (RF) technology, IR technology, or other payment technologies known or apparent to those of ordinary skill in the art or which are after developed.

In one embodiment, the EPI issuer, such as a bank issuing a credit card, approves a card application by a customer and issues them a credit card such as a Visa card to participate in the incentive system and method of this disclosure. In another embodiment a card issuer, such as a bank, approves an existing cardholder to participate in the incentive program. For example, an existing customer may contact their bank or EPI issuer and alert them that they would like to participate in an incentive program in accordance with the system and method of the disclosure. The bank or EPI issuer then authorizes an already existing EPI to participate in the program. Whatever the actual mechanism, and there are many different but equally valid methods, the electronic payment instrument issuing institution (or other entity) will want (with respect to one embodiment):

- to enroll, identify, or otherwise designate a customer as program registrant, and
- permit an electronic payment instrument (such as a credit, debit, check card, or other form of EPI) to be used with the incentive program.

C. Creation of an Incentive Offer

In one embodiment, incentive offers are constructed based on existing data about individuals or groups of people. Such incentive offers are created without reference to known individuals, and further without any identifiable program registrant information being sent to any participating merchant. Profile data is created based on the identification of parameters by the merchant, IPM, or others, and is stored, in one example, in a table in a database (such as a relational database) of the IPM. The profile data is matched to incentive data identifying the metes and bounds of the inventive offer with program registrants that are eligible to accept the offered incentive.

In some embodiments, a participating merchant (such as a store, a restaurant, a chain of stores, a hotel, a business offering a service, etc.) creates an incentive offer or has an incentive offer created on its behalf. In one exemplary embodiment, the incentive offer takes the form of an offer to discount a purchase, such as a discount on any purchase made at a merchant, such as a restaurant bill, or the offer of a discounted flight or hotel room, or a particular food item at a grocery store. In another embodiment, it is in the form of an offer to provide a rebate to a customer after the customer satisfies the terms of an incentive offer, wherein said rebate may, but need not, manifest itself as an immediate discount on a good or service at the merchant, but which in some embodiments can be accessed later by the program registrant (and in some embodiments is delivered automatically). Regardless, the incentive is delivered in one or more of many forms, such as:

- cash deposit into a designated bank account;
- the issuance of a physical check to the customer mailed to their home;
- a credit applied to a pre-existing debt (such as an existing balance on a credit card);
- the award of "miles" on airlines;
- the award of "points" or similar that are used as a medium of exchange for something of value.

In other embodiments, the incentive program manager provides analytical services to the merchants to assist them with the creation of optimized incentive offers for delivery to desirable program registrants. Such an "analytics" service enables an incentive program manager to utilize the system and method of the current disclosure to enhance revenue streams and profitability. Utilizing, for example, a database of historical spending information, the IPM provides targeted marketing services to one or more merchants and providing relevant incentive delivery services to program registrants. For example, in one embodiment, the IPM draws on its database or network of databases to identify for merchants those consumers that satisfy certain desired spending patterns. In certain embodiments, the average dollar value of participant purchases; the average purchase amounts at certain classes of merchants (restaurants vs. retail outlets vs. grocery stores vs. gas stations); the average purchase amounts in specific geographic areas; patterns in the timing of spending (e.g., when do purchases occur and where; patterns to spending on weekends, week days, mornings afternoons and evenings); correlations between the timing of spending and the location where an individual makes purchases, etc.

The breadth and potential accuracy of incentive and target delivery services that can be provided increases with the amount and kind of data that is accessed by the system. In one embodiment, the IPM incorporates data relevant to patterns of behavior, such as dates and locations of customer travel (e.g., data provided directly or indirectly by the program registrant), such as anticipated travel data sent by a program registrant to a database accessible by the IPM; data provided directly by the customer via a smart phone "app"; or data maintained by outside sources, such as frequent flier data maintained by airlines, data maintained by hotel rewards or perks sites that maintain a history of hotel reservations for a customer; travel sites maintaining travel history reservations for a customer; etc.).

In other embodiments, data accessible to or utilized by the IPM includes behavioral data, such as recurring dates of flower shop purchases (e.g. indicative of a loved one's birthday or anniversary), said data being potentially relevant to merchants or florists (such as 1-800-flowers) that want to solicit business from individuals with a demonstrated likelihood of making a flower purchase on or around a specific day. As will be recognized by one of skill in the art, these are only a few examples of relevant marketing data that is relevant to the creation of targeted incentive offers for merchants and the distribution of highly-relevant incentive offers to participating consumers. In the system and method of these embodiments, the IPM is uniquely positioned to aggregate disparate data sources and to identify relevant patterns and correlations without compromising program registrant privacy by providing these data to merchants. The incentive program manager can offer to target incentive offers to those program registrants that satisfy the optimal relationships to the merchant's loyal customers or ideal customers. This type of analytics service can be provided for a fee and may be in addition to the other multiple income streams that can be generated by the incentive program manager.

1. The "Metes and Bounds" of the Incentive Offer a) Time

In some embodiments, the incentive offer is defined, at least in part, by certain terms. In one example, an incentive offered by a restaurant expires after a certain date, or is redeemable during certain days, (e.g., Wednesdays & Thursdays) over a period of time, but may not be redeemed on Fridays through Tuesdays. In an alternative embodiment, an incentive campaign is launched and individual incentives are sent to a number of potential customers wherein the individual incentives differ in redemption periods. In one embodiment, the plurality of redemption periods includes different start and end dates for the redemption period, thereby lessening the chance of a "last minute" rush-to-redemption in the days leading up to the expiration of the incentive. In alternative embodiments, the time limitations on the redemption of an incentive offer are directed toward redemption at certain hours of the day. There are, of course, a nearly unlimited number of such "temporally limited" terms that can be incorporated into an incentive offer.

b) Purchase Amount

Another example of a term is a limitation regarding a minimum or maximum purchase amount. In one example, an incentive offer by a book store for five dollars off of a future purchase is limited to purchases where the total equals or exceeds ten dollars. In another example, an incentive offer is capped at an upper or "maximum" limitation: an incentive for 25% off of a purchase is limited to purchases of up to, but not exceeding, $500.00 USD. In another example, an incentive offer is tiered to incorporate multiple limitations relating to the amount of a purchase. One example of incorporating multiple limitations is as follows: 20% off of any purchase over $100.00 USD but less than $2,000.00 USD, and to the extent that any purchase exceeds $2,000.00. USD, the additional amount greater than 2,000.00 USD will be discounted by 30% (an extra 10 percentage points). As one of skill in the art will readily recognize, there are virtually unlimited number of variations of terms that may be applied to an incentive offer.

c) Other Limiting Terms

As demonstrated above, incentive offers incorporating various terms, including "temporal" terms or limitations, as well as terms/limitations that are based upon purchase amount, are provided to a program registrant. In other embodiments, however, virtually any conceivable terms or limitations (and combinations of such terms and/or limitations) are incorporated into an incentive offer without departing from the scope of this disclosure. Examples of such additional limitations or incentive terms include: terms limiting the redemption of an offer to specific store locations, where businesses (such as chains or franchised businesses) have multiple locations (e.g., the Westin hotel located in Edina, Minn. verses the Westin located in downtown Minneapolis, Minn. or the Olive Garden located in one part of town, but not the Olive Garden in a nearby suburb). Other examples of such terms or limitations include making an incentive offer valid:

upon the occurrence of a defined event, such as when it rains or snows more than an inch within any 24 hour period in a particular location;

on days where a particular sports team plays on its home court or field;

when a sports team scores a certain number of points in a game;

where there are a minimum or maximum number of individuals in a party (e.g., restaurant incentive good for parties of 4 or more at a restaurant);

The frequency with which a recurring incentive may be redeemed;

the arrival of a birthday;

where the user has previously redeemed (or not redeemed) another incentive;

specifying that the validity of an incentive offer is contingent upon (for example) a minimum or maximum number of program registrants which indicate they will accept that offer;

Any other term or limitation that can be articulated.

D. Communication of the Incentive Offer

In one embodiment, the terms of the incentive offer are defined by the merchant and communicated to the IPM (e.g., via a web-based interface). In one embodiment, the incentive offer is then communicated to the target program registrant. In one embodiment, the IPM dictates or otherwise designates the means by which the participant receives the incentive, wherein the participant is not permitted to designate or otherwise elect a specific device or means by which an incentive is received. In another embodiment, the participant is permitted to select multiple, and in some embodiments, redundant, methods and means for receiving the incentive which, in contrast to pre-existing methods, helps ensure the timely receipt of an incentive. Regardless, communication of the incentive is achieved through any one, or more, of a variety of means such as communication via SMS (text messaging), to a phone or PDA device in the form of a software application (an "app") for the iPhone, Droid, Blackberry or similar device, via email, or via a website, via another accessible online system, or through communicative technology hereinafter invented. There is no inherent limitation regarding the manner in which incentive offers are communicated, and it is likely dependent on the size, scope, amount, and nature of the offer. For some offers and targeted program registrants, traditional mail or even voicemail notification may be optimal, whereas others may be best communicated via text message, "push" alerts, smart phone apps, etc. The system and method is flexible enough to allow for communication through any means known to those of skill in the art or through communications technologies which may yet be developed. The system may also incorporate means of communication where the incentive is not "sent" to the participant (such as via an email alert), but where the participant must actively retrieve the incentive themselves.

E. Acceptance and Redemption of the Incentive Offer

In accordance with some embodiments of the system and method of this disclosure, redemption of the incentive offer by the program registrant occurs when the program registrant makes a purchase—with the (or a) relevant electronic payment instrument—that conforms to the terms or metes and bounds of the incentive offer. In one embodiment, once the specific terms of the offer or incentive are determined, the offer is communicated to the incentive program manager along with instructions on how and when it should be distributed to program registrants. Redemption of the incentive offer is achieved by the program registrant going to the merchant in question, satisfying the conditions of the offer, and presenting an authorized electronic payment instrument for payment.

Transaction data is transmitted, in one embodiment, from the merchant through the verification system for the relevant EPI to the incentive program manager In one embodiment, this can include transmitting the transaction data from the merchant to the merchant bank, through the interchange network (e.g. Visa, MasterCard, Discover, or American Express) to the EPI-issuing bank or entity. In embodiments where the IPM is not a member of the verification system, i.e. not the merchant or issuing bank or acquirer, and not the interchange entity, transaction data is shared with the IPM through, for example, a program registrant providing the IPM directly or indirectly with transaction information. In one example, the transaction data are shared by the program registrant registering the EPI with the IPM and allowing the IPM to download the transaction data from the program registrant's account. In another embodiment, transaction data is again transmitted independently of the authorization, batching, clearing and settlement and funding steps (and the entities known in the art to facilitate those steps) and is instead collected by the participant and transmitted directly or indirectly to the IPM. By way of example, a participant pay employ an EPI that utilizes "touchless" or "touch and go" pay technology (e.g., Bluetooth enabled devices) and may independently transmit an electronic receipt or other transaction data to the IPM independently of the participation of the merchant, merchant acquirer, EPI associations and EPI issuing banks, and independently of data originating from a POS terminal or device.

In embodiments where the EPI is enrolled in the incentive program, the IPM compares the transaction data to the incentive data of incentive offers communicated or accessible to the program registrant. Such comparisons may be performed by any of a number of methods, including utilizing database queries of a type known to those of skill in the art. If the transaction data satisfy the terms of a communicated incentive offer, then the IPM may (but need not) notify the program registrant that an incentive offer has been redeemed successfully. For purposes of describing an embodiment, such notification can take the form of updating an online system that is accessible through the World Wide Web or a smartphone "app," via text message, or via snail mail, but as will be apparent to those of skill in the art, such notification may take any form.

In another embodiment, an incentive is delivered to a consumer the "redemption" of which does not require the consumer to engage in a commercial transaction, but instead requires the participant to engage in or refrain from engaging in one or more acts. In such embodiments, said non-transaction actions (or—conversely—inactions) may be utilized so long as they are capable of being communicated to the IPM. By way of example, an incentive may require that you cease using an EPI at a certain store for a period of time, wherein a transaction database may access periodically a transaction database for said EPI and monitor for incentive disqualifying transactions.

Before, after, contemporaneous with, or in the absence of notification to the program registrant, the IPM coordinates the delivery a reward consistent with the terms of the communicated and redeemed incentive offer to the program registrant. The reward can take any form, including the form of a purchase discount, a rebate, reward, cash-back, or other incentive. In some embodiments, the reward is delivered to an account at the same financial institution that issued the EPI utilized to redeem an award. For example, a where a EPI in the form of a Citibank Visa card is used to redeem an incentive, a cash-back award may be credited to that same visa card, or to a separate account at Citibank. In other preferred embodiments, the consumer may designate an account that is not held at the same bank that issues the EPI the participant utilized to redeem the incentive, and instead the consumer or the merchant may designate another vessel for the receipt of the reward, including, for example, a savings account at another financial institution or delivery to an account held by a third party. All such accounts may be utilized to receive said incentive so long as they are enabled to receive the kind of incentive offered. By way of example, where a merchant designates "points" as a reward, said reward may not be deposited in some types of banks, but may be "deposited" in an rewards account associated with an airline or hotel chain. Conversely, a cash back or rebate award may not be deposited in a "points" account, but may be deposited in a wide variety of financial institutions, including bank, saving account, credit union, or in the form of a payment made to reduce an outstanding debt (e.g., a mortgage or other monthly bill). The form of the reward is limited only by the business relationships that have been established by the IPM to allow delivery of the reward to the program registrant. In one example, an EPI-issuing bank acting as incentive program manager establishes a savings or checking account in the name of the program registrant into which rebates, discounts, or cash rewards are deposited based on redemption of incentive offers by the program registrant.

F. Exemplary Data from which Profile Data is Generated

1. Historical Spending Data

When the Electronic Payment Instrument is used by the program registrant, in most embodiments the IPM captures transaction data regarding, at least, time, location, and amount spent by the program registrant and stores said transaction data in a database controlled by or accessible to the Incentive Program Manager. As indicated elsewhere, in an alternative embodiment the transaction data are not captured during, for example, the authorization process, but are instead acquired via other means, including via the participant sending such data to the IPM or otherwise giving the IPM authorization to access said data, for example, by providing login information to one of the participant's credit card accounts. Regardless of the specific means used to "capture" "receive" or otherwise "acquire" or "access" the data, once the data is ascertainable, it may be analyzed utilizing a variety of means. From analyzing such data, the IPM is able (or may be able) to determine where and how much the program registrant spends and, sometimes, the specific items purchased by a particular program registrant.

In one example, the IPM examines a database of historical spending data and constructs a profile related to how often a particular program registrant purchases flowers and then writes into the database a data entry associating the data, location, and nature of the anticipated purchase of flowers. For example, a program registrant that purchases flowers on or about Mother's Day may be a good target for an incentive offer in the form of a discount from that same or competing florist on or about Mother's Day. Similarly, a program registrant that frequently purchases flowers on some apparently arbitrary date may be making a purchase related to an anniversary or significant other's birthday. In this example, use of this historical spending data allows profile data to associate incentive offers from florists with program registrants that are likely to purchase flowers during the target period facilitating the communication of incentive offers that are likely to be redeemed by the program registrant.

Such data are valuable both to merchants and program registrants that wish to receive targeted offers on or around the dates when flower purchases were made historically. The program registrant will end up spending significantly less on products (such as flowers) that may have been purchased anyway, and merchants have the opportunity to secure a new customer.

Databases of historical spending information about program registrants is one example of a data source from which profile data may be created and stored by the IPM. Generally, data privacy laws and banking standards place restrictions on how credit card, debit card, check card, contactless payment systems, and other electronic payment instrument issuers utilize their customers' data. Where, however, current EPI holders and users enroll as program registrants and request that their historical spending data be used to generate incentive offers potentially of interest to them, there exists extensive data to be utilized. Such data is particularly accessible where and EPI issuer acts as the IPM, however it is by no means limited to EPI issuers. In one embodiment, the system is implemented where a consumer herself grants third party access to data they themselves are able to access, though, for example, online banking websites or through the analysis of online banking statements that are sent to or accessible to consumers. As is discussed elsewhere, other means for accessing transaction data may also be employed without departing from the scope of the invention. Consumers may, for example, utilize handheld devices, digital/virtual wallets, to facilitate a transaction without the use of a traditional magnetic card. Where enabled, these devices can receive, store and transmit electronic receipts, and utilize or otherwise permit the data from those receipts to be utilized by the system. In such a way, the issuer of that EPI (e.g., a bank) need not be an active participant in the system and method, though the data they maintain, or a subset thereof, may be incorporated nonetheless.

In one example, an IPM with access to historical spending data ascertains at what merchants program registrants use their EPI, how much they spend at those establishments, and in what cities its program registrant use their EPI.

In one embodiment, a credit card issuer acting as incentive program manager generates profiles of program registrants that travel to locations other than their home more than one time per month. Such profile data includes the specific cities to which the program registrant travels frequently, e.g. Boston, Vancouver, New York, and Santa Fe. In one example, a merchant doing business in any one of those four cities constructs an incentive offer where the incentive data limits the targeted program registrants to out of town visitors. Through generation of such profile data, the IPM targets program registrants for incentive offers that merchants utilizing coupons in traditional print media such as newspapers—or so-called "social" group-based incentives distributed to people domiciled in a defined geographic area—are not able to target reliably. By way of example, the popular "Groupon" service, and like competing services, distribute daily incentives to people in a defined geographic region wherein those incentives are only good in that one geographic region. Thus, profile data, including but not limited to profile data derived from the time and location of a past participant transactions, may be employed to efficiently and more broadly reach "traveling" customers.

In another example, profile data is created by the IPM based on merchant-selected parameters. For example, a new Italian restaurant may ask an incentive program manager to distribute coupons to individuals that have patronized certain competition in the last six months and who have spent on average at restaurants over $100. The IPM queries its database of historical spending data and generates profile data identifying the program registrants that satisfy the merchant's criteria. There is no need for the incentive program manager (in this embodiment a credit card issuer) to deliver the names, or other personally-identifiable information, to this new Italian restaurant. Rather, incentive offers are generated and communicated to the program registrants in a manner that is blind to the merchant. In doing so the new Italian restaurant is strategically targeting for its advertising campaign those individuals that can most benefit its business long-term without compromising the privacy, data, or spending history of the targeted program registrants. It is noted, however, that in other less-preferred embodiments, a participant may permit the merchant to have access to more specific information regarding their identity in order to obtain additional benefits, as opposed to maintaining that information as strictly private.

2. User-Provided Information and Preferences

In another embodiment, data about a potential customer's interests, physical location, spending patterns, etc. is provided by the program registrant to the IPM. Examples of such user-provided data that is relevant to the creation of profile data for the targeting of incentive offers is listed below. Note that the below categories are merely exemplary and are not meant to be exhaustive examples of the kinds of information a program registrant could provide or make accessible to the IPM.

a) Location Data

In one embodiment, program registrants upload data relating to their anticipated future geographic location by linking an electronic calendar, such as Microsoft Outlook, Google, or social network calendar, in a usable format to databases maintained by the IPM. The uploaded location data provides information on where the program registrant will be located, anywhere in the world, on a given day. In an alternative embodiment, a calendar is provided through the IPM web-based interface or other online portal.

In another embodiment, user-provided profile data may be employed without use of an IPM, but instead may be employed in conjunction with existing services, to overcome geographical distributive shortcomings. Thus, user-provided profile data may be communicated, in some instances, directly to the incentive services "Groupon" or "Living Social" to alert them that on a specific date, they should cease sending (or otherwise augment) incentives for Minneapolis by offering participants incentives relevant to other locations where the participant may plan to travel for business or pleasure. In such an embodiment, a database containing Groupon's participant data, which is employed to record the region of interest for an individual enrolled in their program (and which thus determines that only Minneapolis region-based incentives are sent to that individual, may be augmented by data provided by the participant (or by data relevant to that participant) in order to provide relevant incentives offered in other non-Minneapolis regions as well. For example, a Groupon participant may employ a GUI maintained by Groupon to indicate that they are interested in receiving incentives for San Francisco and Chicago (because the participant regularly travels there on business) and further that they are interested in receiving incentives that are valid during specific date in New York, but otherwise does not wish to receive New York-based incentives. Once this information is communicated, via any means, to Groupon, one or more databases are populated with the additional data and future incentives are thus delivered consistently (in the above case of San Francisco and Chicago) or for a specific and limited period of time (as in New York) before they cease to be delivered. As indicated elsewhere, the "filter" functionality employed by participants (or non-participant individuals) may similarly be used without an IPM, but in conjunction with third party incentive services in order to enhance and broaden the scope of incentives relevant to those services' users.

Turning back to location data made accessible by the IPM, the IPM constructs profile data based, in part, on the location data provided by the program registrants enabling said program registrants to receive and redeem incentive offers in locations that are geographically remote from their home. Such user-provided information is not, of course, limited to providing information about a user's-future location.

In one example, incentive offers that are relevant only to those particular locales where the program registrant is anticipated to travel are communicated to them in advance of or during their trip. By communicating such incentives, merchants target offers such as discounted hotels or for other discounted products and/or services that can be evaluated potentially weeks or even months in advance of the trip.

b) Market-Specific Preference Data

In another embodiment, the program registrant provides market-specific data to the IPM. In one example, a program registrant while traveling to Boston provides market-specific data indicating that the program registrant is only interested in patronizing certain classes of restaurants (e.g., 3 star restaurants in a Michelin guide), and that they are interested in offers from hotels that are located in a specific geographic region (e.g. near the harbor).

Such preference data are provided to the IPM through a dedicated website, through a smart phone application, or through any other manner recognized by those of skill in the art or later invented without departing from the scope of the invention. The market-specific preferences provided by the program registrant is incorporated into the profile data and has the effect of allowing a program registrant to filter out undesired incentive offers that do not correspond to their preferences, e.g., incentive offers from restaurants located in the hard-to-reach suburbs of a city they are visiting. In one embodiment, such market-specific preference data is generally updated by the user through the web-based interface, smartphone application, or another online system.

It is worth noting that certain program registrants have spending behaviors that are highly desirable to merchants. Examples may include high income customers or those that operate with generous spending allowances (for example, some elite business travelers) or individuals that are not particularly cost conscious. Such program registrants have developed a spending profile, as evidenced by one or more data sets and/or databases, that indicate that (for example) a merchant will enjoy a higher profit margin from the high-value program registrant's visit then the merchant would otherwise enjoy from its average customer. Such program registrants tend to be targeted by numerous incentive offers. While especially useful for "high-value" program registrants that receive many offers, all program registrants benefit from the option to designate through the online or smartphone portal other parameters that must be satisfied before an incentive offer is communicated from the IPM. The system and method of the disclosure allows the program registrant to restrict the system to communicate, for example, five offers a day and no more.

In another example, the program registrant preselects criteria that must be satisfied before an incentive offer is to be communicated to them (via the Internet, Email, a smartphone application, or other system. The preselected criteria are associated with the program registrant, and preclude the inclusion of the program registrant into any profile data where the associated incentive data fails to satisfy the selected criteria, such as minimum percentage discount or reward or restaurant or hotel star rating. Additionally, in some embodiments, the participant may designate conditions or criteria which, if present, will block offers or otherwise prevent the delivery of offers which absent that condition or criteria would have yielded an offer. By way of example, a participant may indicate that they are interested in incentives to restaurants, but one of their designated "acceptance" criteria is that the offer be the equivalent of at least a 25% off coupon or rebate. As one of ordinary skill in the art will readily recognize, such a filtering mechanism can be created utilizing a nearly infinite variety of customer-selected or other criteria.

It is worth noting that the above incentive filtering system may be used with great effect by individuals that are not program participants. For example, a non-participant that is confronted by numerous offers from such programs as "Living Social" or Groupon or even from individual merchants may seek to reduce the amount of time they spend reviewing irrelevant or uninteresting offers by utilizing a similar filter. In such cases, all incoming offers are automatically reviewed to determine if they satisfy one or more pre-determined parameters, such as if the offer is for a known category of goods or from a merchant or class of merchants that are of interest. By way of example, in one embodiment the filter could eliminate and automatically delete (where desired) any Groupon email that is directed toward "spa" or "beauty" or chiropractic treatment offers, but does not filter out offers for restaurants or home improvement stores (Menards, Home Depot, Lowe's, etc). Similarly, the filter can eliminate offers that fail to offer a minimal discount or which are for merchants that require a redemption that is outside of a designated geographic area In theory, any criteria for which data is available may be utilized. As will be recognized by one of skill in the art, there exist numerous methods for implementing the filtering systems and methods in conjunction with existing, external entities such as Groupon. In one embodiment, as described infra, a consumer may provide an external entity, such as the IPM, with username and password information to enable the IPM (in one embodiment) to access the consumer's existing email account and analyze and delete or filter offers, sent to that account by Groupon, that do not satisfy the consumer's specific criteria. In another embodiment, the consumer may register an email account managed or maintained by an entity (such as an IPM) and direct Groupon-like services to send all offers to that email account, whereupon they are automatically analyzed utilizing any number of methods employed by those of skill in the art, and then deleted, filtered, or "released" to the consumer as having passed their designated filtering criteria. In this way, the consumer need not review dozens or hundreds of inapplicable offers, few of which are of interest to them. In yet another embodiment, Groupon or a Groupon-like entity may itself adopt various embodiments of the filtering mechanisms described herein, permitting users, in one example, to log onto their own preference account maintained by Groupon, and therein provide data that Groupon may employ to limit the number of offers (and reduce "offer fatigue") or funnel to that individual incentive offers that more closely match the user's preferences. See, generally, FIG. 26 and accompanying discussion for additional functionality that may be employed in conjunction with third-party incentive services without departing from the scope of the invention.

c) Dynamically Provided Data

In another embodiment, incentive offers are sent to a program registrant based on information shared dynamically through an electronic device. In one example, an iPhone application or a cell phone with GPS capability may periodically share "current location" information. Alternatively, a program registrant can solicit relevant incentive offers by "sharing" their current location information utilizing the same or other tools. By way of example, a program registrant taking a trip gets off the plane in Dallas, Tex. turns on her cell phone, and the cell phone automatically determines (utilizing one or more methods known in the art) where the user is located and a software application of the device communicates that information wirelessly to an IPM accessible database. In another embodiment, the presence of the electronic device (e.g., smartphone) is detected without use of an application or "app" running on that phone and instead is detected by cellular networks, and the infrastructure utilized to track phone locations in order to route calls to that number is similarly dual-tasked to provide IPM-accessible data related to the current location of the program registrant.

In accordance with one embodiment of the system and method, a database query is run to identify incentive offers which correspond to the dynamically-provided location information and/or other parameters set by either or both the merchant and program registrant. In one example, a smartphone (e.g. iPhone, Droid, or Blackberry) "app" is activated and information about the date, location, time of activation is associated with the program registrant and the program registrant is associated with the profile data associated with relevant incentive offers.

It is worth noting that a database and/or dataset that is utilized for tailoring and targeting incentive offers to program registrants may contain data that originates from multiple/disparate sources. For example a database containing aggregate data of a user's historical spending with the relevant electronic payment instrument can be commingled with data from an online calendar of the kind already discussed. Additionally, said information can be further augmented by other sources of data and said data can be combined in one database or may be shared through databases that are linked electronically. In another example, a spending database for the relevant electronic payment instrument can be linked with (among a myriad of other data) data regarding a customer's present location or history of travel patterns. For example, such data would include data that is dynamically updated whenever a user's cell phone is activated (for example a cell phone is turned off in advance of a plane flight and then turned on again in another city, or via a GPS-enabled device, such as an iPhone application), and that data may be linked to a third data set that contains information regarding the user's preferences (which in some embodiments the user has himself provided), which in turn could be linked to a fourth data set containing information about where the user plans to be three months from now. The data need not be structured into a single database so long as it is electronically accessible for the purpose of identifying individuals to receive targeted incentives.

In one embodiment, an update is made to a predetermined category of data, that update may be configured to trigger an automated incentive-related query in order to determine if one or more current incentive campaigns that previously were not relevant to a program registrant now become relevant. In one example, the system and method is utilized by program registrants and merchants in Chicago, a program registrant is regularly presented with discounted offers to car rental outlets (Hertz, Dollar, Enterprise, etc.); restaurants (That restaurants, steak restaurants, & French restaurants); and home improvement stores. When that individual from Chicago flies to Anchorage, Ak. on business, their physical presence in Anchorage is made accessible by the system via any method known in the art or herein disclosed (electronic devices, GPS, manual updates of data via computer, smart phone capabilities including "app-enabled" capabilities, radio frequency or satellite data, triangulation data from cellular networks, etc.). If the "update" to participant location data is within certain parameters (i.e., it indicates that the participant has traveled a predetermined distance, for example), then the existence of that update is utilized to trigger the equivalent of a database query for "newly relevant" offers based on that information while (in some embodiments) also triggering additional incentive filtering that is not active when the participant is near home or near a different geographical area. Utilizing the above, a Chicago resident whose presence is identified in Alaska, is associated with profile data for "newly relevant" incentive offers for discounted meals in Alaska.

The system and method may also utilize different levels of discounts for different customers, based on certain location criteria or past transactional data. In one example, a restaurant offering deep discounts to program registrants it believes may become regular customers (e.g., individuals that are living in or which may frequent an area), programs a subsidiary campaign offering less substantial discounts to individuals that are not likely to become "regulars" at all (such as a vacationer temporarily in Hawaii). Profile data for the separate advertising campaigns is associated with different classes of program registrants. In such cases, location data is highly relevant to ensure that steep discounts are only provided to those program registrants for whom the likelihood of repeat business would allow long term recovery of the loss leading discount. Any number of such adjustments may be made in whole or in part due to participant location data (including historical data).

d) Other Electronic Databases with Preference-Related Data

Social networking sites provide another opportunity to generate value for the merchant, incentive program manager, and program registrant in accordance with yet another embodiment. Social networking websites and their underlying databases contain additional information that can be utilized to generate targeted incentive offers. Such information is stored in data sets and/or databases which, in certain embodiments, can merely be accessed as per (for example) FIGS. 7, 15-16. In other embodiments, however, the "social" aspects of such sites can be further leveraged to mutually benefit both merchants issuing an incentive offer and program registrants that redeem them. A few such examples are discussed further infra.

Program Registrant Privacy and Follow Up to Allow the Participating Merchant to Further Target Incentive Offers An advantage of some embodiments is that the system and method is utilized by the program registrant to receive and redeem targeted incentive offers without providing any personal information to the merchant. In fact, in some embodiments, the system and method is implemented without the merchant knowing who has received incentive offers, and even without knowing who has redeemed the incentive offers where both the communication of the incentive offer to the program registrant and the processing related to the redemption of the incentive offer and reward delivery is handled by the incentive program manager. In one such embodiment, the identification of the relevant program registrants is performed by the IPM, the IPM communicates the incentive offer to the program registrant, the incentive offer is redeemed by the program registrant when payment is initiated (e.g., via the EPI), and the merchant receipt need not identify the fact that an incentive offer was redeemed because the receipt itself indicates that payment is for the full amount.

In certain embodiments, the algorithms employed by the IPM analyze and/or otherwise utilize data in one or more data sets and/or databases. In one example, a participating merchant directs the IPM to communicate incentive offers only to program registrants that have a) not made a purchase at the merchant utilizing the EPI, but which have b) made a purchase at a merchant's competitor utilizing the EPI. The system and method also permits the merchant to preferentially target program registrants based on additional data controlled by or accessible to the IPM. In another example, the incentive program manager utilizes a database query to identify those program registrants with a history of spending more than the average amount at a particular merchant or class of merchants. At the request of the merchant, the system and method then generates profile data that associates these program registrants with incentive offers. By targeting higher-than-average spenders who patronize the competition for incentive offers, the merchant achieves hyper-competitive discounting by preferentially incentivizing only the most desirable potential customers.

For example, in an embodiment where the EPI is a standard credit, debit or check card, the transaction verification is performed by comparing purchase information [information that is transmitted through one or more of the following: 1) the credit card terminal, 2) an acquiring bank, 3) through a card network (Visa, AmEx, for example), 4) via an electronic payment instrument issuing bank (Chase, Citibank, Capital One), or 5) though other electronic means] with offers that are redeemable by a participant associated with that card. Any of these transaction-communicating entities (or a third party entity with access to the transaction data) could analyze the transaction data and compare the data against the terms required by a communicated incentive offer. Where the data indicates that a purchase has met the incentive offer terms, the system will register that the user has in fact redeemed the incentive offer and will record that fact. In some embodiments, this verification process will automatically trigger a redemption sequence without any further prompting by the customer. In some embodiments, the verification and redemption sequence will proceed without any immediate indication to the merchant that the program registrant was conducting a transaction subject to an outstanding incentive offer at the point of sale. Likewise, the receipt received by the program registrant at the point of sale need not register any indication that the transaction was subject to an incentive offer.

The benefits of the system and method of the disclosure will be apparent to those of skill in the art. By utilizing such a system, a program registrant, such as a business traveler that must regularly stay at hotels and eat out at restaurants when away from home, is able to utilize this system to access and "paperlessly" redeem a steady stream of incentive offers. These offers can be redeemed through use of an enrolled EPI and the program registrant can quickly amass a substantial amount of rebates, discounts, or other rewards, whether those rebates come in the form of cash, points, or other incentives (such as automatic payment of credit card balances, reductions to an APR otherwise associated with a registered EPI, deposits into a designated account such as a cash transfer to a savings or checking account). In addition, the program registrant need not, in some embodiments, publicly tender a coupon of any sort, which as previously mentioned can in certain circumstances make them look cheap or waste time at the merchant location.

Note that in an embodiment such as the one immediately preceding, where an incentive offer is redeemed by the customer paying a non-discounted amount at the point of sale but later receiving the incentive through another mechanism (e.g. through a deposit of cash into a bank account), the merchant has effectively secured a transaction for more money than they were entitled to receive had a traditional physical coupon been presented at the time of sale. As such, in accordance with one embodiment of the present disclosure, the initial payment by the program registrant, the merchant will have charged the program registrant the full purchase price, and the full amount of the purchase will have been deducted from the available balance of his credit card. Once the IPM determines that this transaction satisfies the terms of an outstanding communicated incentive offer, the merchant can be notified that a program registrant (perhaps an unknown program registrant) has redeemed an incentive offer.

Thus, in this embodiment, the merchant will ultimately receive the charged price less the redeemed incentive offer and any transaction processing fees. In addition, in certain embodiments the amount the merchant may ultimately receive may be less than the charged amount less the incentive offer amount and transaction fees, as the IPM may charge the merchant an additional amount for delivering to the merchant a new customer that the merchant would not have otherwise been able to capture. By way of example, if a program registrant receives a 40% off incentive offer for a $200 product and redeems that incentive offer through use of the EPI, the merchant would receive $200.00, less $80.00 (incentive amount), less $6.00 (transaction fees), less $14.00 (% 7.0 undiscounted fee paid to IPM), or a total of $100.00 to the merchant.

The follow-up from the incentive program manager to the merchant may take the form of summary statistics, or more detailed information as permitted by the structure of the incentive program. In one embodiment, the incentive program manager may be able to provide certain other summary data to the merchant about how to make their incentives more targeted and efficient for reaching the most desirable program registrants. For example, where a merchant receives an overly high redemption rate from an incentive offer, the merchant may wish to make the next such offer a little less attractive to reduce the amount of a discount or rebate and thus save money. Similarly, if the merchant received inadequate redemption, the merchant may wish to target a different demographic, or otherwise alter the incentive offer.

The incentive program manager (which again can be one entity or a plurality of entities acting together) can provide follow-up to merchants letting them know how successful their incentive offer was relative to other incentive offers based upon the results of past incentive offers. Said incentive program managers, using straightforward data analysis of the success and failure of one or more incentive offers, can provide detailed analysis of where offers are successful and where they are not. For example, aggregate data regarding the success of an incentive offer can be easily provided for the entire set of recipients of that offer. In another embodiment, success and failure rates can be broken down across sets of recipients that share one or more common characteristics (for example, success among customers that typically spend over 100 dollars at a restaurant vs. those that typically spend over 150 dollars and/or success among those that have exhibited a pattern of patronizing restaurants more than three times a week vs. success among those that patronize restaurants more than 6 times per week). The incentive program manager can provide additional feedback data regarding the aggregate characteristics of those incentivized customers that, in redeeming the incentive, engaged in the most beneficial behavior. For example, among the class of individuals that redeemed a certain incentive offer, the known characteristics of those "redeemers" that spent the most money while redeeming the incentive can be gathered and reported, as can aggregated behavior over time. In this manner, as will be recognized by one of skill in the art, a merchant will be able to gain a significantly greater understanding of its customers, and through that understanding will be able to carefully target its incentive methods to those that are most efficient and effective, while eliminating incentives and marketing strategies that (previously unbeknownst to them) were mostly ineffective, e.g. traditional coupons and/or institutionalized rewards systems that are meant to increase business but which in reality may only lower profit margins.

In yet another embodiment, participating merchants are offered a suite of services by an incentive program manager including, by way of example, a relatively low-cost service which allows a merchant to target program registrants for incentive offers utilizing one criteria (e.g., geographic area), where the next most expensive allows the merchant to utilize two or three criteria (geographic area, gender and financial information), and an even more expensive version permits the merchant to utilize any and all criteria. Such a tiered service could be combined with data analysis services of the sort identified above for extra cost, or as a benefit for the merchant participating in the program. As one of ordinary skill in the art will readily recognize there are nearly infinite number of services that could be offered to would-be merchants without departing from the scope of this disclosure.

In accordance with yet another embodiment, merchants may be provided with access to certain summary information about program registrants to allow them to identify certain desirable characteristics of the program registrants to whom incentive offers are to be distributed. As such, the incentive program manager need not disclose customer-specific data to merchants wishing to direct incentive offers to program registrants that the incentive program manager can identify for them using existing data. Instead, the incentive program manager can simply confirm that they have delivered "X" number of incentive offers to individuals that have met the merchant's criteria.

Privacy concerns are less, or even not at all, implicated in detailed analysis of program registrant spending patterns where such information is not directly shared with participating merchants. For example, as detailed above, the incentive program manager can dynamically track the success of various incentive offers. Through such tracking the incentive program manager can learn to whom an incentive offer is given, the exact nature of the incentive offer, and whether or not the user to whom the incentive was communicated actually followed up on it. Such information can be used to further augment an electronic data set and/or database which in turn can be used to provide merchants with even more accurate advice. For example, the incentive program manager may, through this type of tracking, learn which incentive offers generated redemptions associated with the largest percent tip to the wait staff, suggesting that offers targeted toward highly correlated groups are the most likely to generate longstanding customers. It is worth noting, that this type of data analysis and the utilization of these data to target incentive offers does not depend on the disclosure of any personally-identifiable information, or even any information at all, about program registrants from the incentive program manager to the participating merchant.

Scenarios Demonstrating the System and Method in Action

In accordance with certain embodiments set forth above, once you have 1) decoupled the redemption of an incentive offer from an obligation on the part of the program registrant to physically present an incentive offer to a merchant, and 2) have the delivery of an incentive offer reward handled by an incentive program manager rather than a merchant, it fundamentally alters the relationship between merchant and consumer. For example, an incentive program manager can deliver incentive offers to program registrants, the program registrant can redeem the offer by making a purchase from the participating merchant without the merchant knowing who redeemed the incentive offer. In this way, an incentive program manager can utilize data about the program registrants to target incentive offers, because such information need never be passed along to the merchant. Thus, an incentive system and method in accordance with certain embodiments can provide valuable opportunities relating to all aspects of the merchant/consumer value chain including, without limitation, targeted advertising, delivery of incentive offers, enhanced privacy protections for program registrants, enhanced fees for incentive program managers, targeted redemption of discounts by consumers, and the increased overall efficiency of the economy.

Several sample scenarios of the system and method of the disclosure in action may further illustrate the power and novelty of the system and method. These scenarios are exemplary only and based on particular embodiments and are not to be taken as limiting the scope of the invention, which is to be limited by the claims and their equivalents.

A. Scenario I: The Local Hotel

In scenario I, a local hotel utilizes an online system made available by an incentive program manager. Using that online system, the local hotel indicates that it wishes to generate and distribute no more than 250, 40% off incentive offers, available for redemption during the ensuing 3 months to certain program registrants. The hotel further identifies that it would like the incentive offer to be communicated to program registrants that have stayed in one or more local hotels within five miles of their hotel at least five times in the last year and which have spent on average at that hotel $200 or more during their stays. The incentive program manager then queries its own database and identifies the program registrants that satisfy the hotel's criteria, identifying 3000 individuals. Of these 3000 individuals 250 are selected and the incentive offer of 40% off is communicated to them through an electronic media of the program registrant's choice, such as through a smartphone app.

Upon receiving the incentive offer one of the program registrants calls the hotel and makes a reservation at the hotel corresponding to the terms of the incentive offer, and in doing so does not (or need not) tell the hotel that they intend to redeem an incentive offer. When the night comes the customer goes to the hotel, spends the night, wakes up the next morning and pays the bill with the electronic payment instrument (such as their own credit card or a employer-issued corporate card) enrolled in the incentive program. In this scenario, the bill which is paid by the program registrant with the relevant electronic payment instrument does not reveal that the bill is discounted by the incentive amount or otherwise subject to a "reward." Rather, the incentive program manager handles the incentive offer redemption and reward delivery in a manner that is blind to the hotel and which need not be noted on the subsequent credit card bill.

In this scenario the incentive will take the form of cash rebate of 40% off the room bill. The receipt presented to the customer need not (and in this scenario, does not) indicate that any incentives were involved in the transaction, and so when the business traveler submits his or her receipts to their accounting department, said receipt correctly shows that a full, non-discounted amount was actually charged to the program registrant. The receipt does not indicate that a program registrant is independently registered with an incentive program.

Once the purchase is made at the hotel, the program registrant's transaction is identified by the incentive program manager as a transaction that may be subject to a pending incentive reward. The transaction is examined by the incentive program manager to confirm that it satisfies the terms of a communicated incentive offer. Once the IPM confirms that that the incentive offer terms have been satisfied, an amount corresponding to 40% of the hotel bill is, in this embodiment, deposited into a checking account (or some other vehicle) opened by or otherwise designated by the program registrant for the delivery of incentive offer rewards. In this scenario, the IPM will deduct 10% of the reward before depositing the reward amount into the program registrant's account, thus the IPM deposits an amount corresponding to 36% of the program registrant's hotel bill into the designated checking account. In other embodiments, the IPM is compensated via an alternative method, and the full reward is conveyed to the program registrant.

In this way a business travelling program registrant that is often on the road may still patronize hotels that are within the same price range of the hotels he patronizes where an incentive is not at play, and his/her employer does not pay more than they have in the past. And yet the business traveler may amass hundreds, if not thousands of dollars, in rebates, which, in this scenario, are deposited like cash into a personal checking or savings account. At the same time, the IPM is rewarded with a "finder fee" and the hotel is able to court new customers and fill rooms that otherwise would have remained empty.

B. Scenario II: The Japanese Restaurant

In scenario II, a new up-and-coming Japanese restaurant has no or little existing client base. Because the restaurant wants customers and further wants its customers to exhibit certain behaviors, it utilizes the system (in this scenario by utilizing web-based services run by the incentive program manager) to develop an incentive strategy on its behalf. The incentive program manager queries its database of historical spending data, self-reported preference data, and other information obtained from any linked or accessible source, and identifies a body of potential program registrants who satisfy desired criteria. In this scenario, the IPM identifies program registrants that have patronized other Japanese restaurants within 25 miles of the up-and-coming Japanese restaurant five or more times in the past year, and have spent on average more than $100.00 per visit. The IPM then limits the set of individuals matching that criteria to those program registrants that have redeemed a 25% off incentive offer of any type in the previous three months. In this scenario, that leads to the identification of 1,200 potentially eligible program registrants. In this scenario, the IPM then recommends to the up-and-coming Japanese restaurant that the IPM should communicate on its behalf an incentive offer representing a 25% discount (in the form of a cash rebate) on food and drinks to the 1,200 identified program registrants.

Redemption of communicated redemption offer is based on an analysis of the transaction data by the incentive program manager, rather than through presentation of any type of physical or electronically-displayed coupon. Because of this, the program registrants that received an incentive offer may redeem it discreetly simply by virtue of tendering an authorized electronic payment instrument for payment. No one else at the dinner table will be aware that an incentive is being redeemed, nor will, in this scenario, the restaurant itself know at the time the purchase is made that one of its incentive offers has been accepted. The only one-who in fact is aware at that moment that an incentive is involved in any way in the transaction is the program registrant. A program registrant may redeem the incentive even where they are part of a larger party and the bill is "split," so long as his portion of the bill satisfies the terms of the incentive. Note that it is not unusual for groups of individuals to pay their portion of a restraint bill to one person in cash, and that person then pays for the entire bill using a credit or debit card. In such a scenario, it's possible or even likely that the program registrant could (by virtue of using their card for the group and earning a reward) have their dinner paid for entirely or even make money.

C. Scenario III: The Irritated Customer

In scenario III, an incentive program manager is utilized or retained by a restaurant to identify and send targeted incentive offers to program registrants who have patronized their own restaurant before, but may have had a bad customer experience. In addition, the restaurant retains or utilizes the IPM to target incentive offers to customers of competing restaurants that may have had a bad customer experience. The IPM identifies such program registrants through an analysis of the program registrant's transaction history, including in some embodiments their spending and tipping history. The IPM queries its historical spending database for program registrants based on first a) the amount which was first authorized on an electronic payment instrument at that establishment (said amount corresponding to the amount of the bill which is authorized for just that amount before the customer added any tip) and b) identify the subsequent amount that was actually charged to the credit card (said amount comprising the originally authorized amount plus that amount with tip), and then use those amounts to calculated a tip percentage. Where, for example, the query identifies program registrants that have patronized the restaurant 3 or more times with a history of tipping on average between %15-20 at the particular restaurant, but identifies that the most recent visit generated a tip of between %0-5, and that there has not been a return visit by the program registrant to the restaurant, it is likely that the prior experience was a poor one.

When such program registrants are identified they are targeted for an incentive offer of 50% off their next visit, as an attempt to correct for the bad dining experience (for the restaurant's own prior customers), and to solicit business from their competition (for potential customers who exhibit a similar tipping profile at the competition). Additionally, said information may be used to target particularly good "tippers" that patronize competing restaurants. In this scenario, the IPM is also retained to track tip percentages at the restaurant over time, to provide a type of early warning signal about potential problems at the restaurant if the average tip percentage of all program registrants (whether or not redeeming incentive offers) shows a decline over time. In such a scenario, large restaurant chains may obtain accurate data regarding how well each of their restaurants are being run. By monitoring tipping trends, any McCormick & Schmicks, Legal Seafood, Chili's or Outback Steakhouse can get real time indications of how well a restaurant is doing or is being managed, before it starts to fail.

D. Scenario IV: The Loyalty Program

In scenario IV, an incentive program manager is retained by a hotel chain client to develop a loyalty program for program registrants to encourage them to make multiple visits to the hotel chain. After analyzing the situation and their databases of historical spending information and other data, the incentive program manager determines that the ideal program registrant to target for this new loyalty program has the following characteristics: 1) stayed at the hotel chain's hotels at least once in the past 6 months; 2) has stayed in a hotel in at least 3 different geographic locations in the past 6 months; 3) have not demonstrated loyalty to any specific hotel chain as shown by staying in at least 3 different hotel chains in the past year, 4) spent on average at the hotels more than the average price of a room at the client hotel chain's hotels in the same city. After identifying the program registrants that fit the profile, the incentive program manager will communicate a targeted incentive offer to the identified program registrants. In this scenario, the terms of the incentive offer are as follows: a 10% cash back reward for each night spent at the hotel chain's hotels, said reward deposited into a designated checking or savings account, and for every 7 nights that are spent in a room at the hotel chain during any 1-year period a 100% cash back reward for the $8^{th}$ night, provided that each purchase is made with the enrolled electronic payment instrument. In this scenario, the hotel need not know who the incentivized program registrants are, or even that they are redeeming an incentive offer when they tender payment with the electronic payment instrument.

E. Scenario V: The Universal Discount Store

In some circumstances, program registrants prefer not to pay membership fees to wholesale retailers, such as Costco or Sam's Club, not only because of the fee itself, but also because such discount clubs often require bulk purchases of various products because those bulk items stay, unused, on a shelf for some time. Nevertheless, that same program registrant may prefer to pay the discounted prices often offered at said merchants. For example, while a program registrant may purchase 12 (or more) cans of tuna over the course of a year, the program registrant may not want to purchase 12 cans of tuna at one time. Indeed, program registrants may prefer to pay a slightly higher (though still discounted) price while purchasing (and paying for) only a few cans at a time.

Figure 32:
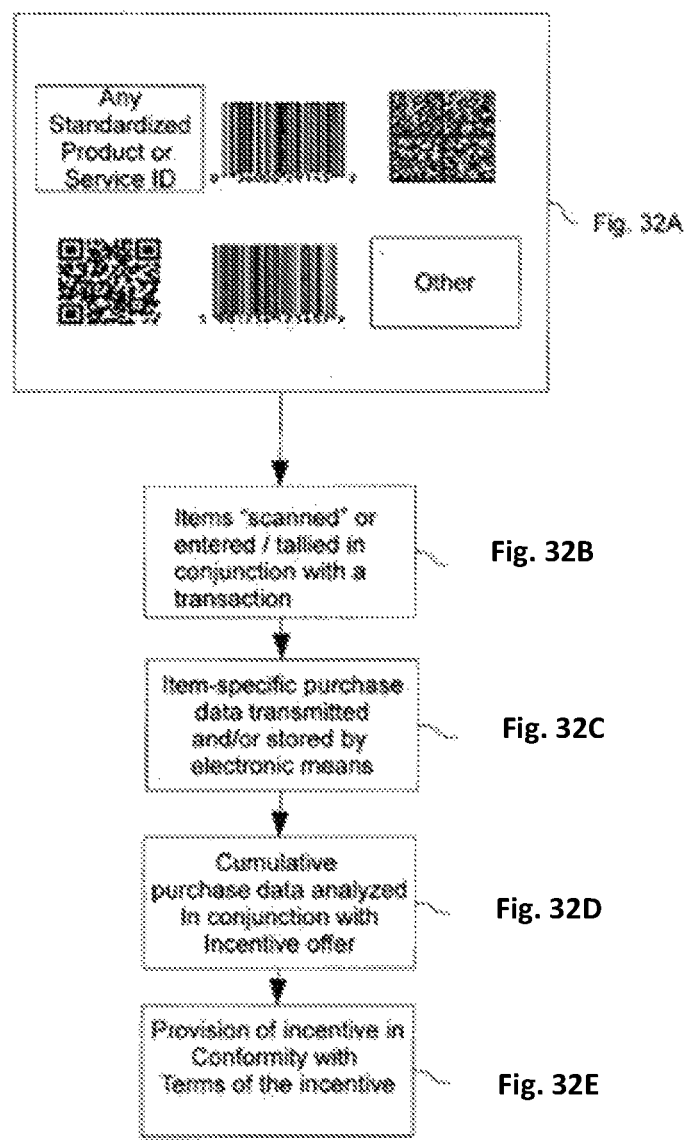
FIG. 32 is a process diagram representing the acquisition of individual product purchase data which may be entered, stored, accessed, retrieved and manipulated in conjunction with the creation, deployment and redemption of incentives in one embodiment.

To solve this problem, a canned tuna company retains the IPM to communicate and manage the following incentive offer to all program registrants who have purchased canned tuna in the last 3 months. Purchasers of tuna are identified via purchases where product codes of purchased items (including SKUs, bar codes, etc) are captured and saved in (e.g., in a database) and linked in connection with a particular program registrant. (See, e.g., FIGS. 32 and 28B, for example.) The communicated incentive offer provides the program registrants with a $0.15 cent discount on each covered can of tuna they purchase over a six month period for the first ten cans, and a $0.22 cent discount on any covered can of tuna purchased over ten cans. Where a program registrant uses an enrolled EPI (a smartphone equipped with an optical or electronic payment mechanism or a credit card) or even, in some embodiments, cash, to make purchases, then at the time that the items in their cart are scanned and payment is made (through any mechanism or via cash), information regarding the number, identity and price of each product may be collected and transmitted (via any means) to a database controlled by or accessible to the IPM. The program registrant is able to amass incentives for canned tuna purchases made at any store that is able to scan (for example) the bar code and transmit item purchase data to an IPM (with or without a credit or debit card). See, e.g., FIG. 32. Moreover, because the purchase behavior is tracked by the IPM across store chains, additional incentives may be offered to the program registrant, including cross-marketing incentive offers and incentives offered to induce purchase behavior away from the canned tuna company's competitors.

F. Scenario VI: The Last Second Gift Card

Because the architecture of the incentive system and method is highly flexible, it can be utilized to provide virtual gift cards to any individual that are redeemable at any merchant that accepts electronic payment instruments. For example, on the way to a birthday party, an individual who is enrolled in an incentive program realizes that he failed to purchase a gift. But he remembers that his friend, whose party he is attending, is also enrolled in the incentive program. Outside the house, he requests by phone or online portal that the IPM create a virtual gift card for $100 which can be redeemed at an independent bookstore that does not normally sell gift cards or gift certificates. After making the request, the gift giver receives a code (in one embodiment) that can be given to gift recipient. The gift recipient can go online and use the code to associate one or more of their electronic payment cards with that gift. Thereafter, the gift recipient continues to use their card as normal, but if they visit the designated gift store and make a purchase, the charge is automatically re-directed to the gift giver's account (in one embodiment). If the purchase exceeds the gifted amount, the total up to the gifted amount is charged to the gift giver and the excess amount is charged directly to the gift recipient. Thus any gift may be redeemed simply by the friend utilizing any of the EPIs registered with the incentive program. Thus, any EPI can become a gift card. Moreover, this avoids instances in which a dedicated gift card may be lost or stolen (which reaps an undeserved windfall for current companies offering gift cards). Moreover, the gift giver doesn't have to tie up funds, unused, for months at a time, funds on which a store that provides dedicated gift cards receives interest or "float" as referred to by one of skill in the art, rather than the program registrant that provides the gift. In an alternative embodiment, the specialty merchant may offer for sale virtual gift cards utilizing the same software architecture. Thus, a specialty merchant may sell a virtual gift card that has their own redemption criteria built into them.

The friend is notified of the gift card any number of ways, including being notified via e-mail or via a card or even a phone call from the person giving the gift.

G. Scenario VII: Limiting the Number of Incentive Offers

During the course of a normal day, Ms. Smith, receives numerous and annoying incentive offers from a variety of incentive companies such as Groupon, Living Social, and others. Ms. Smith makes a cursory review of her acceptance of such incentive offers and determines that she likely accepts less than 1% of them. At the same time, Ms. Smith realizes that for every one incentive offer she redeems, she spends four hours reviewing the terms of offers that she will never accept. Her conclusion: in exchange for saving 50% on one purchases (a dollar value of 25 dollars), her "net return on her time" is essentially $6.25 per hour. Ms. Smith is an intelligent and successful business woman. Her time is worth far more than $6.25 per hour. Because her time is valuable, Ms. Smith directs her email in-box to direct all incoming "incentives" directly to her trash bin so she won't be pestered by another offer for a "mani/pedi."

Ms. Smith then becomes a program registrant, and utilizes an online portal linked to the incentive system to lock out all offers for which she qualifies that do not satisfy criteria that Ms. Smith herself selects. Ms. Smith can change those criteria any time she chooses. The criteria she chooses is to only be presented, once a week, with offers that are for 30% or more off of restaurants that fall within a geographical area that she herself selects. She also elects to receive any hotel offers that correspond to designated hotel chains she selects, and only within certain dates and locations that she designated. All other offers are filtered out. Ms. Smith can check which incentives were "filtered out" at any time. By filtering offers that she is unlikely to accept, Ms. Smith determines that her "net return on her time" has gone from $6.25/hr to approximately $455.00 per hour.

H. Rapid, Incentivized Deployment of Incentive Offers;

Mr. Rodriguez is a dedicated consumer of coffee. Based on his aggregate consumer data, Mr. Rodriguez is presented with a coupon for a new coffee roaster that opens up several blocks from his house. He visits the coffee shop and finds he enjoys the coffee. The coffee shop utilizes a web-based merchant interface to make Mr. Rodriguez the following offer via his Smartphone: 25% off all purchases made at the store in the month of November. Thereafter, as detailed infra, any purchase Mr. Rodriguez makes that that coffee shop in the month of November is tracked by the IPM and the appropriate designated incentive (e.g., a cash reward credited to a savings account) is thereafter awarded. Moreover, because the coffee shop believes that Mr. Rodriguez may be a good evangelist for their store, they offer him a further award: Mr. Rodriguez may pass on that 25% off coupon—electronically—to friends. If any of those friends subsequently visit the store, Mr. Rodriguez will earn a reward of 10% back on his friends' purchases for the next two months as well (or any other designated reward). In this embodiment, Mr. Rodriguez disseminates these coupons to friends that are registered in the system via a) a social networking site such as Facebook and via email though a mobile app on his smartphone. These "passed on" coupons are registered and tracked by the IPM, which will monitor Mr. Rodriguez' accounts as well as the transaction data of any recipients of the coupon disseminated by Mr. Rodriguez. Because Mr. Rodriguez has many friends in the area, and because many of those friends also like coffee and trust Mr. Rodriguez's judgment, by the end of November, he has earned 60 dollars in incentives, and the business that sold all the discount coffee is able to very quickly (and without paying exorbitant fees to traditional advertising methods) develop a dedicated client base.

Advantages of the System and Method

There are a great number of advantages to the various embodiments of the system and method in this disclosure; some of which include:

- The ability to act on an incentive offer without having to carry and present a physical coupon or incentive offer, but rather by simply tendering an Electronic Payment Instrument for payment with the merchant;
- The ability to redeem an incentive offer at a merchant without the merchant knowing you are redeeming such an offer because the identification of a redeemed incentive offer and processing of the incentive may be processed by the incentive program manager rather than the merchant;
- The ability to complete incentivized transactions quickly and efficiently without having to elicit help from a manager, or otherwise handle a physical coupon, in order to redeem a coupon or an incentive offer;
- The ability to target incentive offers to a very specific audience of program registrants including past patrons that have not visited a merchant in a specific period of days, for example;
- The ability to offer incentive offers to program registrants that are not in the geographic area of the merchant offering the incentive offer. For example, the ability to offer a incentive to a business traveler that is going to be visiting Orlando, Fla. on specific dates wherein the business traveler does not live in Orlando, Fla. and is not otherwise easily reached by coupons and advertisements that are directed toward citizens of Orlando, Fla. and/or the surrounding areas (e.g., geographically-linked Groupon or Living Social web ads sent to users based on their home address, local news papers, T.V. advertisements, etc), for example;
- The ability for a program registrant to take advantage of incentive offers or respond to incentives in situations, areas, or geographic locations where they otherwise would not have had the ability to receive those incentive offers;
- The ability of the program registrant to communicate to would-be merchants what their availability is going to be to redeem incentive offers at some point in the future;
- The ability of a merchant to solicit customers by specifically targeting the customers of its competitor merchants by strategically incentivizing those customers that patronize their competition;
- The ability to avoid providing incentive offers to dedicated clientele who are likely to return to the merchant whether or not they receive an incentive offer;
- The ability of a merchant to specifically offer an incentive offer to program registrants that exhibit specific behaviors or a range of specific behaviors such as those program registrants that on average spend an amount of money that falls within certain predetermined parameters or other criteria;
- The ability of a program registrant, such as a business traveler, to amass a significant amount of rewards, including cash rewards, without having to account for those rewards to any third party by virtue of the fact that the receipts and monthly credit card bills need not register the redemption of any incentive offers;
- The ability of a electronic payment instrument issuing or processing entity to act as, or participate in the role of, an incentive program manager and to be able to help act as a "matchmaker" between program registrants and merchants that are seeking a specific customer or type of customer based on certain merchant identified and/or customer identified criteria;
- The ability of one or more entities embodying or collaborating as an incentive program manager in order to earn better than average fees by taking a percentage of a discount that is offered for redemption through, for example, a purchase made with an electronic payment instrument, such as a credit, debit, or check card;
- The ability of a program registrant to utilize dynamically provided information, such as their present location via smartphone, cell phone data, or PDA or coupled with a merchant's ability to dynamically offer that customer a coupon or other incentive offer based on that data through an incentive program manager;
- The ability to issue "gift cards" or their electronic equivalents that can be provided to any gift recipient with a credit or debit card and which is redeemable at any store that accepts credit or debit cards;
- The ability for a participant to "filter" all incentive offers using criteria of their design, in order to minimize or eliminate entirely having to review incentives that are uninteresting or irrelevant or which do not compete favorably with "better" offers;
- The ability of restaurant chains to monitor the performance of branch or chain restaurants by monitoring changes in average tip percentages, including via benchmarking those tips against historical data;

The ability to provide a service though which any merchant, anywhere, can easily construct an incentive campaign online and disseminate those incentives to targeted customers via a variety of means, all while automatically managing the redemption of said incentive campaign. By automating the incentive process, every small "mom & pop" business in America can utilize the system to conduct small scale incentive campaigns relevant to small cities, towns, communities and rural areas, without following the "boots on the ground" programs (such as Groupon) that need a critical population mass in order to justify an employee to generate a constant stream of incentives;

Eliminating the Groupon model of "one deal, one city, one day, one-size-fits-all incentive" and instead offering unlimited incentives, every day, to targeted individuals, wherein said incentives can be automatically tailored on a case-by-case basis;

The ability for one entity to send out an incentive campaign to multiple individuals wherein one or more terms of the incentive (including, for example, the discount amount) may be automatically adjusted pursuant to certain criteria (e.g., Customer X gets a 25% off coupon but Customer Z (who perhaps lives farther away) gets a 35% off coupon since he may need a greater incentive to drive the extra distance).

The ability of a merchant to utilize the system and method to detect a participating consumer's entry into or proximity to a competitor's store, and to dynamically present that participant with an incentive to leave/not enter the store and to make their planned purchase at the merchant offering the incentive, instead.

The ability to encourage early adoption of the system and method by providing incentives to individuals that "recruit" or "recommend" friends to participate in the program, by, for example, giving them a "cut" of all incentives redeemed by those introduced to the system (at least for a limited time).

DETAILED DESCRIPTION OF DRAWINGS

Certain embodiments are described herein as including logic or a number of components, modules, elements, units, and/or mechanisms. These structures may constitute either software modules (e.g. code embodied (1) on a non-transitory machine-readable medium or (2) in a transmission signal) or hardware-implemented modules. In example embodiments, one or more computer systems (e.g. a stand-alone, client or server computer system) or one or more processors may be configured by software (e.g., an application or application portion) as hardware that operates to perform certain operations as described herein.

Thus, references to computer hardware or software should be understood to encompass a tangible entity, be that an entity that is physically constructed, permanently configured (e.g. hardwired) or temporarily or transitorily configured (e.g. programmed) to operate in a certain manner and/or to perform certain operations described herein. In embodiments in which hardware is temporarily configured (e.g. programmed), the hardware need not be configured or instantiated at any one instance in time. One example is where hardware comprises a general-purpose processor configured using software, the general-purpose processor may be configured as if it were different hardware at different times. The various operations of example methods described herein may be performed, at least partially, by one or more processors that are temporarily configured (e.g. by software) or permanently configured to perform the relevant operations. Whether temporarily or permanently configured, such processor-implemented modules that operate to perform one or more operations or functions. In example embodiments, operations may be performed by one or programmable processors executing computer program to perform functions by operating on input data and generating output. Method operations can also be performed by, and apparatus of example embodiments may be implemented as, special purpose logic circuitry.

Example embodiments may also be implemented in digital electronic circuitry, or in computer hardware, firmware, software, or in combinations of them. Example embodiments may be implemented using a computer program product, e.g., a computer program tangibly embodied in an information carrier such as a machine-readable medium for execution by, or to control the operation of data processing apparatus, e.g. a programmable processor, a computer, or multiple computers. A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In addition, communications between modules and elements of the various embodiments may be achieved through the storage and retrieval of information in memory structures to which the hardware or software modules have access. For example, one hardware or software module may perform an operation, and store the output of that operation in a memory device to which it communicatively coupled. A further hardware-implemented module may then, at a later time, access the memory device to retrieve and process the stored output.

The one or more processors may also operate to support performance of the relevant operations in a "cloud computing" environment or as a "software as a service" (SaaS). For example, at least some of the operations may be performed by a group of computers (as examples of machine including processors), these operations being accessible via a network (e.g. the Internet) and via one or more appropriate interfaces (e.g. Application Programming Interfaces (APIs)).

Instructions, signals, data, and other information may be transmitted or received over a communications network using a transmission medium. Certain example embodiments utilize a network interface device and any one or more of a number of well-known transfer protocols (e.g. HTTP). Communications networks include at least a local area network ("LAN"), wide area network ("WAN"), the Internet, mobile telephone networks, Plain Old Telephone ("POTS") networks, and various wireless data networks (e.g. WiFi and WiMax).

FIG. 1 illustrates an embodiment of the system and method of this disclosure utilizing an electronic payment instrument to redeem incentive offers. At 10 an electronic payment instrument, typically a credit card, debit card, or check card is issued to a customer. Alternatively, 10 can be an electronic transaction-enabled smart device, such as an smartphone, iPhone, PDA, etc. At 11 the customer registers (or is registered) for the incentive program managed by an incentive program manager. In some embodiments the IPM may be the issuer of the electronic payment instrument; in other embodiments, the IPM is comprised by one or more entities linked or otherwise operating in concert to render IPM functions. Such registration 11 may be automatic as, for example, if the electronic payment instrument is an incentive card. Alternatively, the registration may be done following issuance of the electronic payment instrument via an online, phone, mail, or other registration system.

Following program registration, at 12 incentive offers are generated and delivered to the program registrant in accordance with the registrant's delivery and/or filtering preferences. The program registrant redeems the offer by making a purchase in accordance with the delivered incentive offer by making a purchase utilizing a registered electronic payment instrument 13 that conforms to the terms of the delivered incentive offer and/or is otherwise associated with the program registrant. In this embodiment, no additional action need be taken by any party to the transaction as the fact of redemption of the incentive offer is recognized once the purchase is made utilizing the electronic payment instrument. After the incentive offer is redeemed, automatically in this embodiment, a reward consistent with the terms of the incentive offer is delivered to the program registrant 14. The reward can take the form of a cash back that is deposited into a bank account, or any other reward consistent with the terms of the offer.

As can be seen from the embodiment set forth in FIG. 1, the redemption of an individually-delivered incentive offer is not dependant on physical possession and redemption of a coupon or other form of incentive offer. Note also that there is no requirement for the participant to pre-notify the merchant (electronically or otherwise) of their intent to accept the terms of the offer. In addition, processing and delivery of the incentive offer reward (e.g. discount, other reward) is processed by an incentive program manager. As such, the delivery of the incentive offer and redemption of the reward, in this particular embodiment, is decoupled from any requirement on the part of the program registrant to present an incentive offer (e.g. coupon), and the merchant is freed from an obligation to verify, process, or otherwise handle the incentive offer. In addition, in this embodiment, the processing and delivery to the program registrant of a reward in accordance with the terms of the incentive offer is processed at the back end by the incentive program manager.

Note that while, in this embodiment, the fact of redemption is detected by virtue of the transactional processing, post "swipe," alternative methods of detecting the redemption of an incentive may be used without departing from the scope of the invention. For example, while not specifically depicted in FIG. 1, redemption may be "manually" communicated by the consumer by authorizing an entity to access their account at a card-issuing bank in order to verify the transaction, which would trigger the incentivizing merchant's duty to deliver the reward to the customer.

Figure 2:
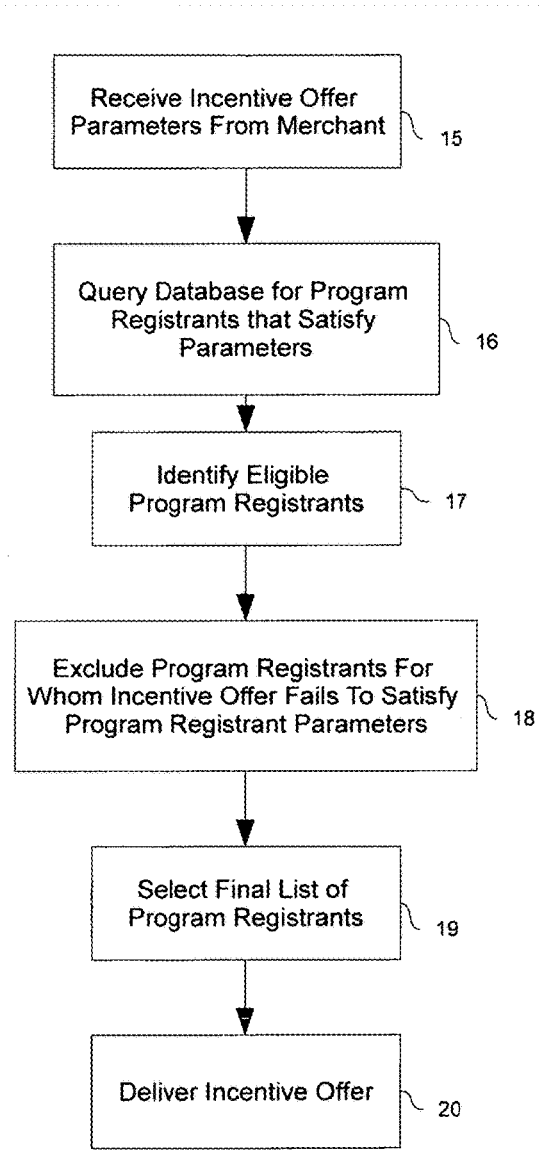
FIG. 2 is a schematic diagram of one process for the distribution of targeted incentive offers to program registrants in accordance with one embodiment.

As set forth in FIG. 2 in one embodiment, a participating merchant or third party, such as an advertising agency, may set the parameters for an incentive offer. For example, a merchant may choose to offer a 25% discount to its previous customers who have not made a purchase, utilizing the relevant electronic payment instrument, at its business or at one of a defined class of businesses in the preceding 30 days. Further, the merchant may make the offer available for the next three days, and make the offer to up to 100 targeted program registrants. These parameters may be set by the merchant or a third party utilizing any number of methods known to those of skill in the art, but in one embodiment the parameters (FIG. 20) are set via an internet-accessible online interface or other computer portal 15.

Figure 7:
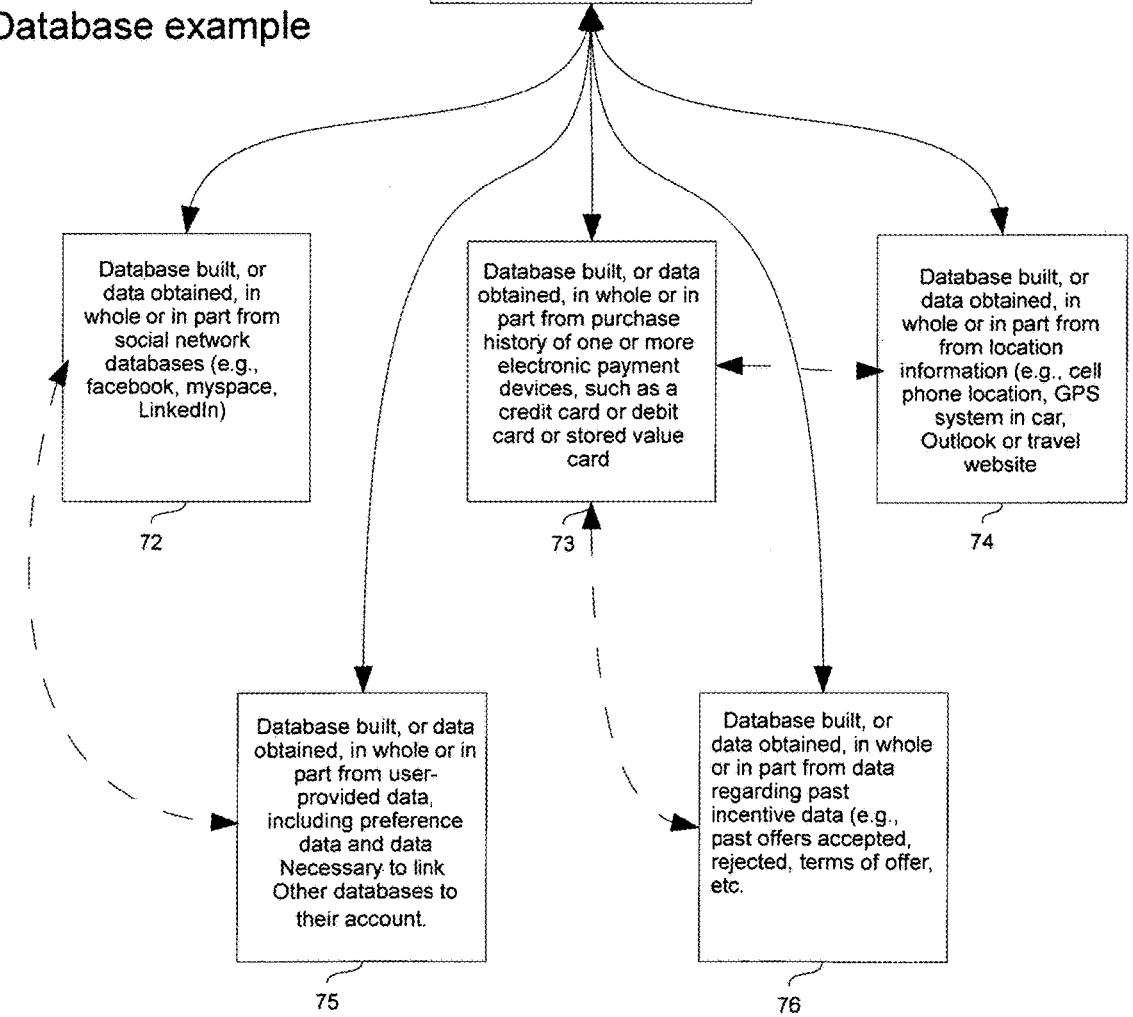
FIG. 7 illustrates the relationships among various databases and/or data sources that can be utilized by the incentive program manager or IPM in accordance with one embodiment.

Once the parameters of the offer are set, and in accordance with (for example) FIG. 7, the incentive program manager alone or in cooperation with another entity or entities with access to appropriate data, will query one or more databases of information to determine those program registrants that meet the defined parameters. In one embodiment, the incentive program manager is a bank that issues credit cards and queries its pre-existing historical database for program registrants that fit the defined parameters. In another embodiment, the IPM functions are managed by one or more entities engaged in credit and debit transaction processing, such as card-issuing banks (e.g., Citibank), merchant acquirers or "acquiring banks", merchants, and card (Visa, MasterCard, American Express, Discover, etc.), etc. In yet another embodiment, the IPM functions are managed by a diverse consortium of businesses with access to transactional data minimally-necessary to track the redemption of incentive offers.

In another embodiment, incentive recipients are identified by databases maintained by or accessed by a payment technology company, such as MasterCard, Visa, American Express, Discover, or JCB. In another embodiment, an incentive program manager utilizes a database built, in whole or in part, by information provided not by data compiled by information from past purchases, but instead by information provided by the program registrant, such as a database containing customer preferences, or from a social networking site.

Regardless of the identity of the incentive program manager, once potential targets for the incentive offer are identified, the offer or terms of the offer are communicated to one or more target program registrants. In an alternative embodiment, those program registrants may filter incoming incentive offers by setting rules regarding what incentives they permit to be communicated to them, effectively separating or filtering inadequate offers from offers truly of interest to them. Where such user filtering is employed, the incentive program manager (or other filter medium) confirms that the offer is of interest to the identified program registrant before it is communicated. For example, program registrants may set minimum required discounts before receiving such offers. By way of example, program registrants may select not to receive offers if the amount of the incentive falls below a particular threshold, for example 33%, 25%, or 10%.

In one embodiment, a program registrant may employ multiple filters to permit only a limited number of incentives to pass through to the program registrant over a particular period of time. For example, in one embodiment, a program registrant may employ a filter in order to receive incentive offers only for restaurants. Where implemented, those qualifying incentives for restaurants matching the program registrant's criteria are pre-analyzed and communicated only in batches to the program registrant to further narrow the scope of offers to be reviewed. Where, for example, a registrant only wants to review three offers a week but the program registrant would normally receive 20 offers each week if the offers were not adequately filtered, the offers may be first "batched" over a period of time and those offers made to "compete" internally (according to a pre-determined algorithm, in one embodiment) before they are communicated to the program registrant. In such an embodiment, the 20 offers that would normally be communicated (even where the offers are "filtered" to communicate only incentives for restaurants) will first be "held" for a period of time to see if a better offer comes along. Thus, a "king of the hill" contest ensues, and weaker incentives are eliminated and only the best three incentives "left standing" during the designated period of time are communicated to the participant. Thus, the registrant need not review the other 17 potentially-acceptable offers and only needs to review the "top three" incentives for which they quality. Incentive-issuing merchants may, thereafter, have access to data regarding the success and/or failure of their incentive campaign.

In the embodiment set forth in FIG. 2, at 18 potential program registrants that qualify for the incentive offer that have opted not to receive the offer because it is below a selected threshold are discarded and do not receive this particular offer. Of the remaining registrants, if the total number is below the number of incentive offers defined by the merchant, each will receive the offer. Alternatively, if the number exceeds the maximum number of offers defined by the merchant (if there is a "maximum"), then the selected set of registrants will be limited. In one embodiment, this can be achieved by randomly selecting the maximum number of registrants from the eligible pool. Alternatively, the selection may be performed according to a rule or algorithm that ranks potentially eligible registrants based on, for example, the average amount spent during previous visits, with the highest-ranked program registrants receiving the incentive offer.

At 20 once the pool of registrants is selected, the incentive offer is delivered according to the communication method defined by the incentive program system and method, or in an alternative embodiment, selected by the program registrant. As will be appreciated by those of skill in the art, notification of incentive offer eligibility may be provided by any number of systems and methods known in the art, including SMS message or text, email, smartphone (e.g. iPhone or Droid) app, voicemail message, website, post, or other method.

Figure 3:
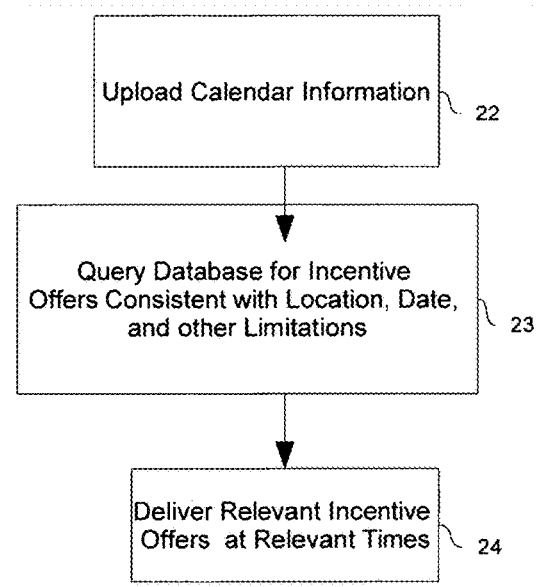
FIG. 3 is a schematic diagram of one process for receiving future travel or other relevant information and for the distribution of targeted incentive offers based on the analysis of a calendar and/or other information in accordance with one embodiment.
Figure 4:
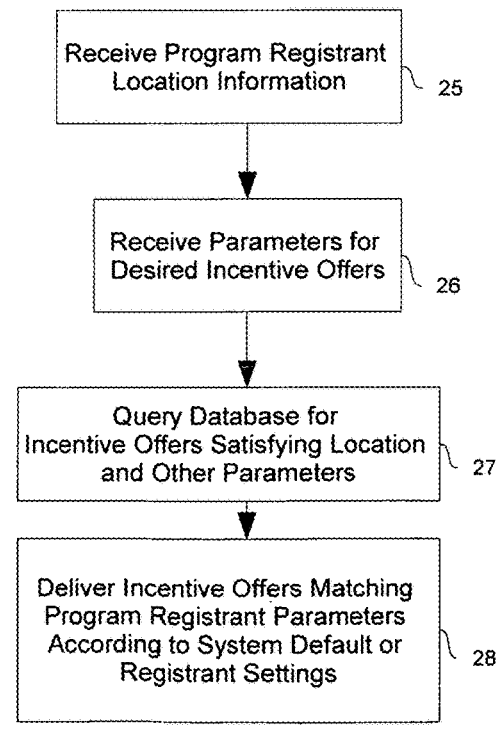
FIG. 4 is a diagram of one process for the receipt of current location information and for the delivery of targeted incentive offers based on the receipt of travel or other location information and for the distribution of targeted incentive offers based on the analysis of a calendar, location, and other information in accordance with one embodiment.

FIGS. 3 and 4 set out embodiments that enable the use of current or anticipated location information to strategically target incentive offers. In one embodiment, the system and method can synchronize or otherwise allow information to be uploaded to a database controlled by or accessible to the IPM or incentive offer manager. By way of example, information regarding location and date information is maintained and can be used to deliver relevant incentive offers consistent with future travel plans.

FIG. 3 links the delivery of incentive offers to calendar information uploaded or otherwise made accessible by a program registrant. In this embodiment, the registrant can be either an individual or an organization. The calendar information can be manually entered into, for example, a website or online portal maintained by the incentive program manager, or may be automatically uploaded by syncing information from any number of widely available calendar options, potentially including Google Calendar, Microsoft Outlook, a smartphone calendar, Facebook, LinkedIn, or other social networking website 22. Separate and apart from uploading the calendar information, the program registrant may indicate the types of incentive offers that are of interest, or may simply rely on certain preset preferences.

Upon or after receiving calendar information from the program registrant, the incentive program manager may query the database for incentive offers that correspond to the location, date, and other parameters provided by the program registrant's uploaded calendar information and other settings 23. Once the query of the database has identified offers consistent with the program registrant's location, date, and other parameters, the incentive offers are then delivered to the program registrant consistent with the program registrant's desired parameters 24. As is explained infra, the process set forth in FIG. 3 may also be utilized where a calendar is not updated, but instead the current customer location information is communicated to or accessed by the IPM (e.g., via a participant's cell phone being activated after a plane lands, and the location information is determined via GPS, cell phone towers, satellite, or proximity to any "detecting" device), whereupon steps 23-24 are performed.

Figure 9:
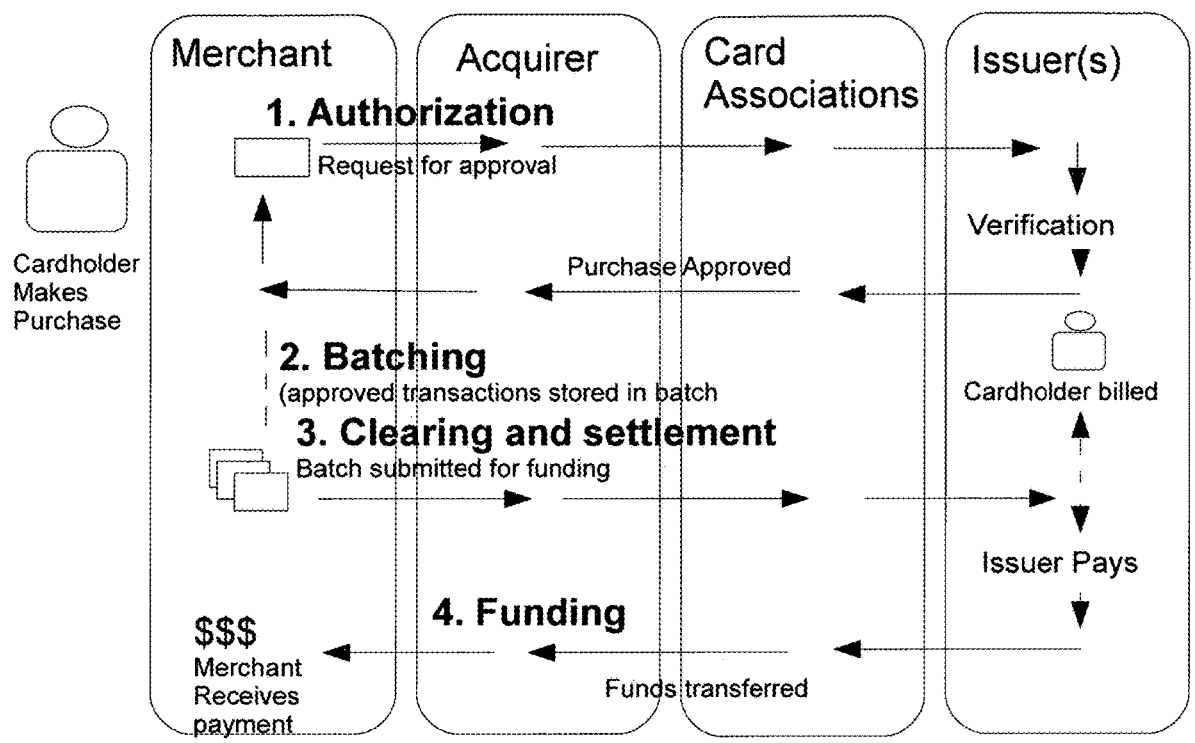
FIG. 9 is a diagram detailing certain existing pathways for authorization and funding of a credit or check card transaction.
Figures 1, 10:
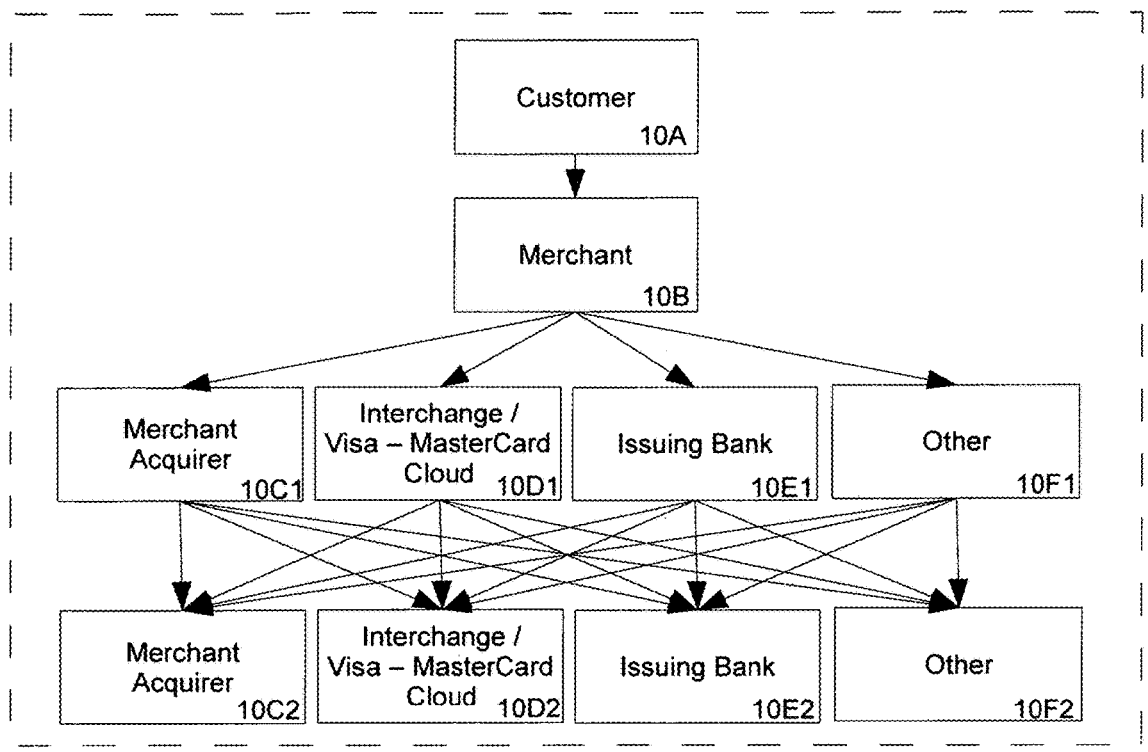
Figures 2, 10:
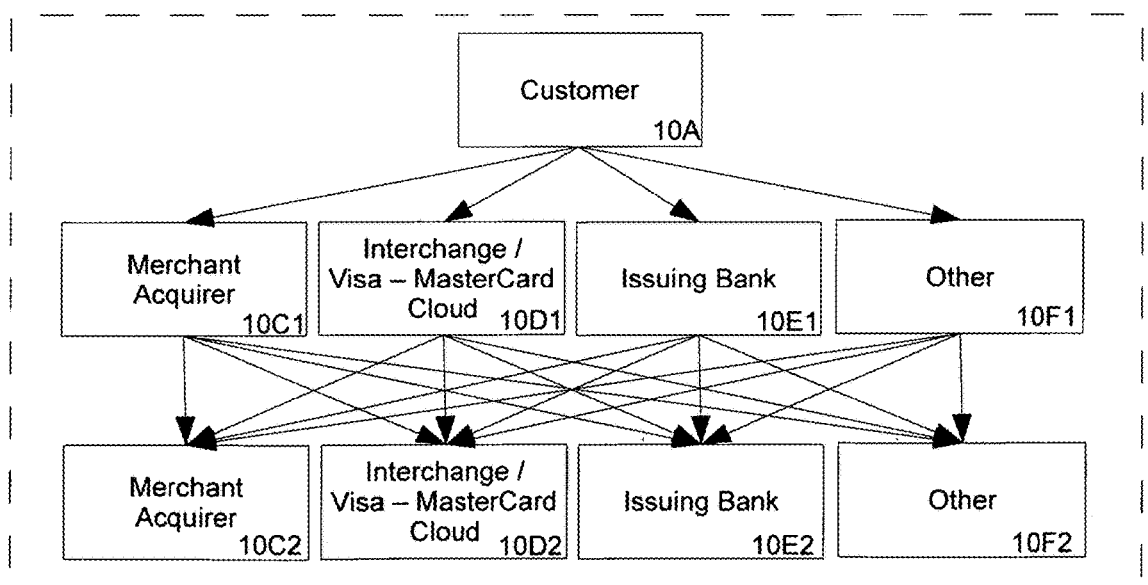

Note that in another embodiment, upon actively accessing calendar information or travel pattern data from the program registrant (whether said information is sent directly to the IPM as is the case in one embodiment, or accessed from one or more remote databases containing such information in accordance with FIG. 9 & FIG. 10), the incentive program manager may query a database containing incentive offers that correspond to the program registrant's location, date, and other travel parameters, and thereby create and deliver appropriate incentive offers.

FIG. 4 details an embodiment in which incentive offers may be made to program registrants based on location information provided through GPS or other location information available with many mobile devices, such as smartphones, e-readers, or mobile computers. By way of example an application or "app" may be provided for a smartphone, such as an iPhone, Droid device, or Blackberry, which can be activated by the user. In one embodiment, activation of the app will transmit user location information to the incentive program manager at 25 either automatically or at the registrant's option, e.g. by a pop-up request to use current location information. In FIG. 4 the program registrant may then utilize the app to designate or filter or solicit or enable the communication and receipt of an incentive offer. In one example, the registrant may request or search for offers regarding food or drinks from restaurants or bars within some specified distance of the current location. By way of example, the registrant may request offers for a certain percentage discount, such as 30% off, within a specified distance from the current location, such as ¼ mile, and available for redemption that day 26.

The incentive program manager then queries the database for available incentive offers that match the requested parameters 27. Once the query has identified such offers, information about the available incentive offers is delivered to the registrant via any means known to those of skill in the art. Such means may include listing available offers within the app, SMS text message, website, or other well-known technologies 28. Once the information about the incentive offers is delivered to the registrant, the registrant may redeem the offer simply by making a purchase that complies with the terms of the incentive offer utilizing an acceptable electronic payment instrument.

Figure 5A:
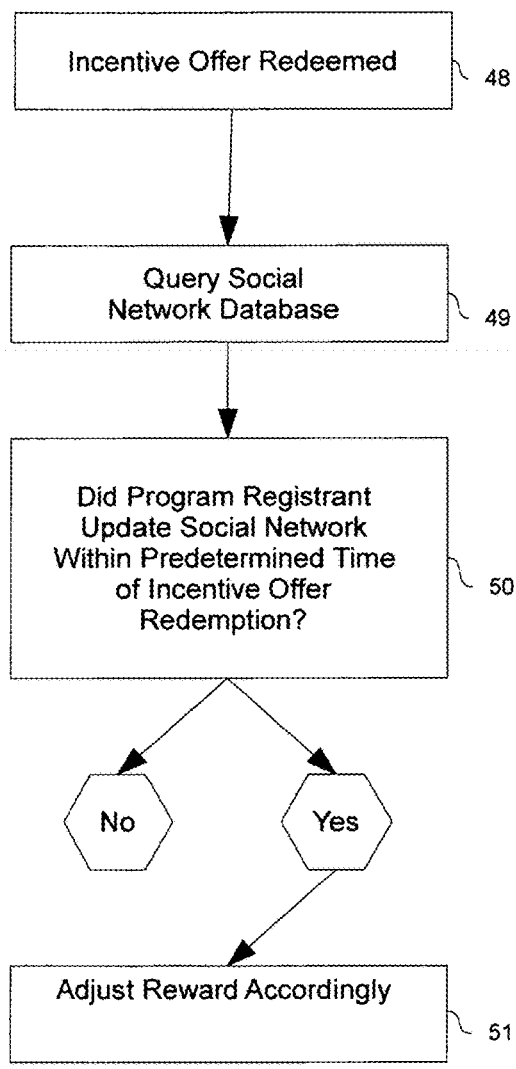
FIG. 5A is a diagram of one process for how the system and method may utilize social networking sites to enhance the value of the redeemed incentive offers to participating merchants.
Figure 5B:
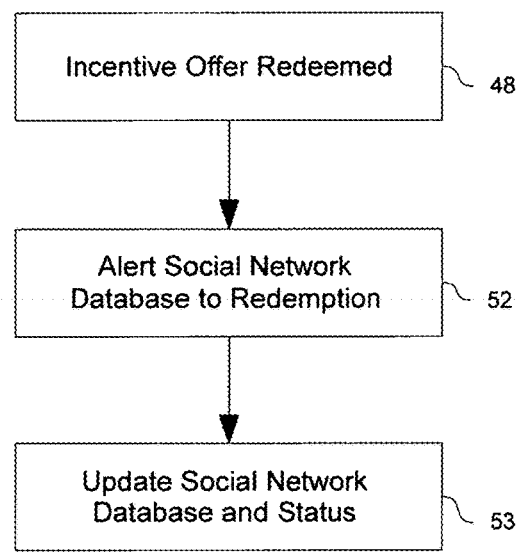
FIG. 5B is a diagram of one process for how the system and method may utilize social networking sites to enhance the value of the redeemed incentive to participating merchants.

In embodiments reflected in FIGS. 5a and 5b, the system and method can utilize social networking sites to further promote patronized establishments. By way of example, in FIG. 5b a program registrant may opt to link the redemption of an incentive offer (through utilization of the electronic payment instrument) to a profile on one or more social networking sites. At present, such sites potentially include Facebook, Myspace, Foursquare, and/or LinkedIn.

If desired by the program registrant, the fact of visiting a merchant and making a purchase, as well as optionally the fact of redeeming an incentive offer utilizing the electronic payment instrument, may be automatically posted to such social networking sites 52 and 53. In this way, the merchant secures not only the business inherent in the redemption of the incentive offer itself, but also additional "word-of-mouth" type of advertising through the post to the social network to be viewed by at least the registrant's circle of contacts, and possibly more broadly. Because such additional "word-of-mouth" type advertising may be valuable to a merchant, an incentive offer may be targeted to registrants with such functionality activated, or an increased incentive (e.g. 30% discount as opposed to 25%) may be offered to such program registrants.

In an alternative embodiment reflected in FIG. 5a, the program registrant may only opt to post information about the redemption of the incentive offer manually or where the experience exceeds some threshold. The threshold may be defined by a quality customer experience, spending a given amount of money, a particular percentage discount, or some combination. As reflected in an embodiment reflected in FIG. 5b, the incentive program manager can query the social networking database to determine whether or not the program registrant has updated their status 49 and if the program registrant has updated their status within some predetermined threshold of, for example, time, then the incentive program manager may adjust the reward related to redemption of the incentive offer accordingly 50 and 51. As will be recognized by those of skill in the art, there is almost no limit to the types of information that may be utilized by the program registrant, relevant merchant, and incentive program manager to facilitate this type of advertising.

In addition to the above, the incentive program manager may be able to make use of multiple databases, including those from social networking sites to facilitate the delivery of targeted and relevant incentive offers to program registrants. As reflected in FIG. 7, a program registrant may make information about their consumer preferences available to the incentive program manager by allowing the incentive program manager to link to databases associated with various social networking sites, in addition to other databases with relevant information regarding program registrant preferences. One example includes Facebook's well-known "Fan" pages which can be used by the incentive program manager to identify the types of incentive offers that may be of particular interest to a program registrant, either in the absence of, or in combination with one or more databases relating to program registrant preferences or historical spending patterns.

Figure 6:
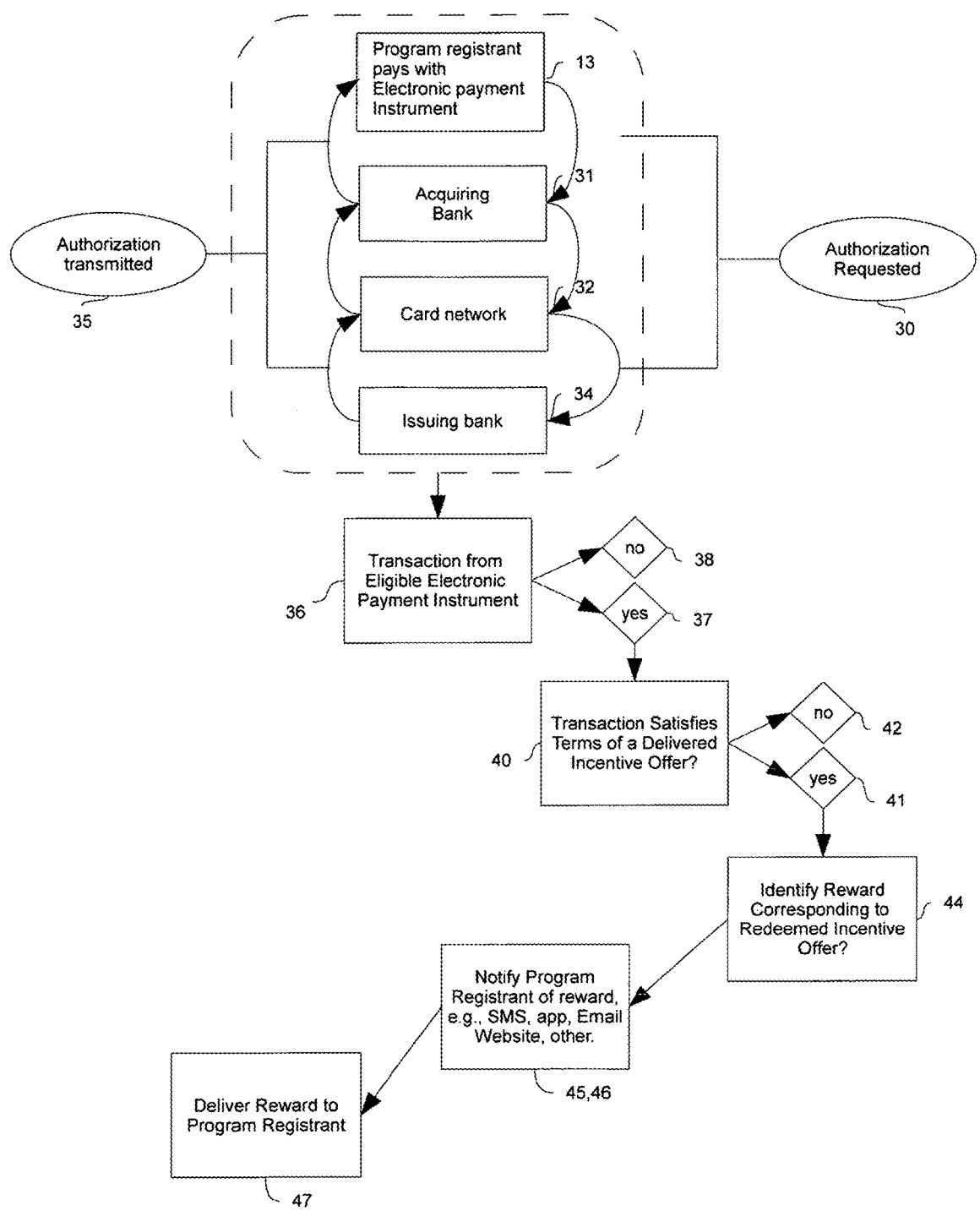
FIG. 6 is a diagram of one process for the verification and delivery of a reward following redemption of an incentive offer by a program registrant in accordance with one embodiment.

FIG. 6 sets out an example of how an incentive offer redemption may be verified, and a reward delivered by the IPM in accordance with one embodiment. In FIG. 6, upon payment with the electronic payment instrument 13, such as in this embodiment a credit card or check/debit card or smart device, the request for authorization 30 is first sent to the merchant acquiring bank 31, is submitted through the credit card system (such as the Visa, MasterCard, or American Express) for verification 32, and is then forwarded to the issuing bank for transaction authorization 34. Contemporaneous with or after authorization, the issuing bank, which also acts as the incentive program manager in this embodiment, confirms that the utilized electronic payment instrument could be eligible for a reward 36 (note that in principle, any entity privy to said transaction data could take the place of the issuing bank in this instance without departing from the scope of the invention.) If it is not a reward eligible payment mechanism 37, the system terminates the inquiry 38.

If the electronic payment instrument is potentially eligible for a reward, the system checks whether the transaction satisfies the terms of an available incentive offer that was delivered to the program registrant 36-40. If the transaction is not eligible, the inquiry terminates 42. If the transaction satisfies the terms of an eligible incentive offer, the system identifies or otherwise calculates the reward in accordance with the parameters of the system and delivers the incentive offer 44-47. In this embodiment, the system provides notification of the reward to the program registrant 45, by way of example, informing the program registrant by SMS or text message, making the information about the reward available through a smartphone (e.g. iPhone, Droid, or Blackberry) app, posting to a website or other online system, phone, mail, pager, or other means 46. The reward is then delivered to the program registrant in accordance with the system settings, as set by default or according to program registrant preferences, or through some combination 47. In alternative embodiments, the delivery of the reward itself triggers or otherwise serves as the notification mechanism to the customer.

In one embodiment, a reward value is calculated as part of the authorization request associated with a purchase made by the electronic payment instrument. In the embodiment in FIG. 6, a bank issues an electronic payment instrument and operates as the incentive program manager. While in this particular embodiment, the incentive program manager and the issuing bank are the same entity, those of skill in the art will recognize that the various portions of the system and method of this embodiment, and of the invention more generally, may be performed by two or more entities.

Note also that in an alternative embodiment relevant to the issuance of certain offers requiring the user to engage in specified behavior over a period of time (e.g., wherein redemption of an incentive requires a customer to patronize, for example, a hotel chain a minimum number of times in a given month, for example), the system tracks each incident of potentially qualifying behavior by the participant. For example, the system will record and track each time a hotel reservation is made (or a hotel stay has otherwise been purchased) by the participant in a given month and once the aggregate terms of the offer have been satisfied (e.g., three nights stayed in a month) it will generate a signal indicative of the fact that the incentive terms have been fully satisfied. Alternatively, where the deadline for redemption elapses and the participant has made some, but not all, of the required hotel reservations, the system will not generate said signal, or will generate a signal that the participant has not engaged in the defined behavior required for the redemption of the incentive offer.

FIG. 7 is a schematic depicting exemplar data 72-76 that can be accessed and used to generate one or more incentive offers. For example, an entity 15 elects to generate one or more incentive offers. Said entity 15 may be any merchant that offers products either at a physical location (a brick-and-mortar store) or an on-line merchant of any type offering goods or services. In another embodiment, the entity 15 may not be a merchant, but may be, for example, a marketing agency or service that provides marketing services to one or more merchants. In another embodiment, the entity 15 may be an association or an OEM that does not itself operate a storefront, but which manufactures products that are sold at specific merchants. In still another embodiment, the entity 15 can be one or more entities that want to offer coupons or other incentive offers. In one embodiment, entity 15 utilizes an incentive program manager 71 to generate the incentive. In another embodiment, the entity 15 identifying the need for the incentive offer is part of the incentive program manager 71. The incentive program manager 71 may either contain data utilized to generate, distribute, and track incentive offers, or the IPM 71 may be utilized to access external data from one or more sources, or the incentive program manager may both contain data and access outside data.

Many configurations are possible without departing from the scope of the invention. In one embodiment, the IPM 71 is a single entity, such as an issuer of electronic payment mechanisms ("Issuer") such as debit cards, credit cards, smart cards, stored value cards, or "virtual" payment instruments (to name a few). In this example, the IPM 71 itself has access to the records of those individuals that maintain an account (and electronic payment mechanism) with that bank, and in another embodiment, that access is substantially limited to those customers that have authorized access to their records for the purpose of generating incentives. Said records may include, by way of example and not of limitation, one or more identifiers that can be utilized to identify an individual, such as by customer number, social security number, credit card numbers, or any other alphanumerically-expressible designation and/or marker.

The IPM of 71 need not be an issuer of an electronic payment instrument; the IPM may in another embodiment be operated by a card network, such as the Visa and MasterCard network, or the Discover or American Express networks ("Networks"), for example. In another embodiment, the IPM is operated by one or more acquirers, sometimes referred to as "merchant acquirers," ("Acquirers") such as First Data and Alliances; Bank of America, NOVA (US Bank) and Key Merchant Services; Fifth Third Bank; Global Payments; Heartland Payment Systems; First National Merchant Solutions; iPayment, or entities that perform similar functions and/or services to these organizations. In another embodiment, the IPM 71 is jointly operated by one of more of a combination of Issuers and/or Networks, and/or Acquirers and/or other entities. In another embodiment, the IPM is any entity or group on entities, including non-banking/non-transactional entities that, via one or more means, have access (including customer-granted access) to consumer transaction records, both real-time, near real-time, and post-transaction. For example, in one embodiment, the IPM is permitted access to customer transaction data by utilizing customer-provided "access data," such as password data, that the entity can utilize to access a customer's electronic transaction or banking records (or, for that matter, non-banking records that nevertheless are potentially relevant to the generation of incentive offers). In sum, the IPM 71 can alone, or in conjunction with other entities, including other IPMs (not shown in FIG. 7) access data relevant to the creation of an incentive offer or coupon ("Offer").

The data utilized by the IPM 71 can take a number of forms, only some of which are depicted in the databases and/or data accessed in 72-76 (all of which depict exemplar data potentially contained in IPM databases or accessed by the IPM from external sources). Data distinct from 72-76 may also be utilized, including multiple sources of data fitting any one of these categories or other categories.

As one example, data relevant to an incentive offer may be obtained from data generated by social network-type websites (such as Facebook, LinkedIn, MySpace) and the databases 72 they utilize or access. For example, where the IPM 71 maintains a database that contains a list of consumers, some or all of which are participants in the systems and method, the IPM may assign at an alphanumeric marker to designate any particular customer. If that customer also maintains an account or presence on a social networking website, such as Facebook, the information about that customer's preferences contained on that site may be accessed by an IPM and/or some of the data regarding that customer's "likes" and fan pages may be sent to/accessed by the IPM or another outside database/entity and "mined" for data relevant to the generation of or receipt of an incentive offer. By way of example, if a program registrant indicates, either actively or passively, that they "like" a restaurant (or otherwise have patronized a restaurant (such as an Olive Garden at a specific location) or a class of restaurants (Italian restaurants in general), or conversely that they do not like certain restaurants (such Restaurant X) or a class of restaurants (German, for example), some or all of that data may be utilized by the IPM 71, either by accessing that data or by importing said data and maintaining it in a database utilized or which may be utilized to generate incentives.

The IPM 71 may also like to any other kind of database from which useful data may be obtained. In another example, the IPM may access a database containing information regarding a program registrant's past purchase history. For example, the IPM 71 or similar entity may build a record of data related to a specific consumer, which we shall identify as program registrant: MN09344565932. With respect to customer MN09344565932, the IPM 71 may contain information (in some cases, information provided to the IPM by program registrant MN09344565932) indicating that said program registrant maintains four electronic payment cards, including one Citibank Visa, one Capital One MasterCard, one American Express Gold Card, and one Discover card and one "smart" device, such as an iPhone, that is communicatively-enabled (via radio frequency/infrared/other) to facilitate transactions between merchants and consumers. Each of these issuers of these cards and/or device managers maintains one or more databases 73 which contain information regarding the program registrant's use of that card, including where and when a card/device was used, the amount that was charged, as well as any other data that is contained by those individual databases 73. Where enabled, some or all of the information maintained by the databases 73 employed by these four issuers (or any other issuer, for that matter) may be transmitted to the IPM for use in generating an incentive offer. Databases containing purchase history are not limited to cards; data maintained by banks in conjunction with (for example) checking accounts may also be utilized in some embodiments, virtual receipts from on-line merchants that are maintained on email accounts or other accounts, as well as information maintained on individuals by credit reporting agencies, for example. Any transactional data source may be utilized without departing from the scope of the invention. In some embodiments, where enabled, the purchase history of other individuals (other than the customer) may also be utilized, including the purchase history of friends and family or individuals that share one of more data points or traits.

Other data may also be utilized by the system, including location data 74. By way of example, by analyzing a customer's collective purchase history the system can derive patterns based on the where a purchase physically occurs (where purchases are made at brick-and-mortar merchants). By analyzing, for example, the aggregate locations where purchases are made, the IPM may utilize that data for any number of reasons, including offering incentives to brick-and-mortar merchants that are in or close to other areas where a customer has made purchases. Said location data may be cross-correlated with time-of-purchase data to provide temporally-targeted incentives. In other embodiments, the invention can be used to create incentives redeemable at merchants where the consumer does not presently make purchases, and in that way can cause consumers to gravitate toward making purchases in, for example, a different shopping center or even another part of town. (Note, in some embodiments, the IPM can be utilized to help revitalize not a specific store, but rather to revitalize a neighborhood, by, for example, offering incentives to merchants that are located in that neighborhood. Said neighborhood incentives could be utilized to induce economic activity in an area that is otherwise eschewed by a population that is proximate to, but outside of, that neighborhood. Where utilized over time, the system and method of the disclosure could create jobs and potentially economic prosperity and reduced crime in an area by delivering incentive offers to program registrants who shop or otherwise transact business nearby by outside of the target geographic area.

Location data 74 can also be obtained from, for example, smart phones that have GPS technology or other location-determination technology imported into it or otherwise enabled (cell tower triangulation/satellite/proximity detectors, including proximity to rf-enabled devises of known locations, etc). By way of example, an iPhone application that tracks where program registrants are located may be utilized to gather and/or transmit data regarding travel patterns and/or where a customer is in real time. Such data can be used as a powerful source to show what areas in a city, the country, or the world a program registrant frequents. In accordance with one embodiment, customer location information may be utilized (and in some embodiments in conjunction with additional data, such as historical transaction data) to detect when a consumer has entered or is likely about to enter a competitor's store, such as a Walmart. In such cases, an incentive can be dynamically deployed and delivered to that customer (in some instances while they are still parking their car or even after they have entered the store) with the effect being that the customer reviews the incentive, changes their mind, gets back in their car, and drives instead to a competing store that is utilizing the incentive database to re-direct consumers.

In one embodiment, present location data may be utilized to "trigger" incentives without ever disclosing consumer location data (including "present location data" to the IPM or other entity. For example, in one embodiment where a program registrant chooses to receive incentive offers via smart phone (e.g., an iPhone App) a plurality of incentives for which that registrant qualifies may be downloaded onto the device, and are only triggered and displayed to the registrant when they are within a certain geographic location. The fact that they are within that location, and the time and date of their location (or other triggering data) need not (but in some embodiments, may) be transmitted to the IPM. In this way, only those geographically-relevant incentives are ever delivered to the participant, and all stored (but not communicated) incentives are deleted if they are not "triggered." See in general FIG. 8B. Thus, in one embodiment, geographically-triggered incentives are updated to an iPhone, and when the user is driving to work and is physically proximate to a Starbucks, an incentive to that Starbucks is triggered and delivered to the program registrant, however the fact and time of that "trigger" need not be disclosed to the broader system in order to accommodate users with heightened privacy concerns. Incentives which are downloaded to the system which are never triggered may be automatically deleted by the application and the participant never has to review them. As will be recognized, there can be any number of triggering mechanisms that may be utilized to display a stored incentive upon realization of a specific event, including time/date-triggered incentives, transaction-triggered incentives, and incentives triggered upon the performance of an action or an occurrence. In one embodiment, GPS or Satellite date relevant to user location is not utilized, but the detection of a specific wireless network of known location (e.g., a coffee shop with wi-fi) by the smart phone can serve as a trigger.

In yet another embodiment, a purchase may itself be a trigger, especially where the identity of the purchased item itself is communicated to a database in conjunction with a transaction. Where, for example, a database is updated to note that a Toro lawn mower was purchased at Lowe's by a customer 10 minutes ago, Menards or Home Depot or Sam's Club may utilize that fact to trigger the delivery of an incentive for that same item, even if that item was already purchased. Thus, while driving home from Lowe's, the customer may get a 10% off incentive on that same lawn mower at Menards, whereupon the customer returns to Lowes, returns the just-purchased item, and then drives to Menard's and immediately earns cash back on their purchase.

In another embodiment, GPS systems associated with a program registrant can be utilized to generate or trigger incentives if the data is transmitted (even transmitted periodically) or otherwise accessible by the IPM. A GPS located in a vehicle, for example, may be utilized in certain embodiments. Where a phone is not equipped with GPS technology, or said GPS data is not transmittable, location data may still be obtainable. For example, cell phones utilizing radio frequencies that are picked up and transmitted from cell phone towers. In general, cell phone towers that are physically closest to a cell phone are utilized. As will be'recognized by one of skill in the art, even where an individual is not actively talking on their phone, data from that phone is transmitted to and from that cell phone such that a cell phone network "knows" where (roughly) a customer is, and is thus able to transmit incoming calls to that customer wherever they are. That data in aggregate form may be utilized to show travel patterns for any one consumer, and said data may, in certain embodiments, be utilized by the IPM 71 or other entity, and/or stored in a database 74. Said data 74 is especially powerful for identifying appropriate incentive offers for delivery to program registrants traveling for business or pleasure outside of their home territory. When, for example, a customer turns off their cell phone when boarding a plane in San Francisco, no RF data (or alternative, potentially location-relevant data) is being sent or received. However, where that person lands in Vancouver or Chicago and turns on that cell phone, the cell phone network proceeds to "locate" that phone after it is turned on or in other embodiments, other location-determinant data may be generated and utilized by the system. As will be recognized by one of skill in the art, that data can be utilized and communicated to the IPM 71 or accessed by the IPM 71 (including accessed through one or more intermediaries, whereupon said data may be utilized to offer that traveler goods and services in the new location, such as hotels, restaurants, taxi cabs, rental cars, or any other good or service. Utilizing data 74 is especially powerful given that customers that are traveling outside their home territory are not generally privy to incentives that are offered to people in another geographic location. As will be recognized by one of skill in the art, any location data may be utilized for this purpose, including satellite-enabled data, transaction data (i.e., a purchase at a brick-and-mortar store in a new city, indicative of a consumer's present location or travel or proximity to specific merchants, etc) without departing from the scope of the invention. See generally, FIGS. 27A-B, infra.

In another embodiment, data 74 may come from any other transmittable source. For example, a program registrant may utilize an electronic calendar that stores travel locations, including future travel/location data. An electronic calendar such as Microsoft Outlook/web-maintained data (such as data maintained on LinkedIn) or any other calendar data may, for example, be enabled to record not just when and where meetings are to take place, but may also be altered to show where in the country someone will be traveling. A woman in New York may update a calendar to show that she has a meeting next month in Miami or in Houston. Where stored and accessed or transmitted, said location data, including future location data, may be utilized to offer incentives that are available for redemption in Miami or Houston during or in advance of the relevant travel dates. See, e.g., FIG. 27B, infra. Such data may also be obtained from travel websites that enable transmitting travel information regarding a particular customer. By way of example and not of limitation, travel websites such as Orbitz, Cheaptickets, Travelocity, Kayak, Priceline, etc., where accessible, may be utilized to send travel data to the IPM or permit data relevant to incentive offers to otherwise be accessed from their databases. In some embodiments, an online retailer, such as Travelocity may transmit data 74 as well as other data 15B, (e.g., 15B2 & 15B7), said data may include (by way of example) how many plane tickets were purchased for this trip, and for how much were they purchased, and if they were in business class. All such data may be utilized by the IPM 71 to create targeted incentive offers.

As has been stated elsewhere, virtually any data that may be useful in the construction and/or delivery of incentive offers can be utilized, not just the exemplar data depicted in 72-76. It is also of note that said data 72-76 may be transmitted indirectly to the IPM 71 or accessed indirectly by the IPM through one or more intermediaries.

Turning now to data 75, the IPM 71 may utilize data provided by the program registrants themselves. For example, in one embodiment a program registrant participating in said incentives may go onto a website 75 maintained by the IPM 71, or which forms part of the IPM, and provide specific information regarding their spending behavior, preferences, etc., for the purposes of enabling the system to make targeted incentive offers available to them. Alternatively, data from any outside website or source (whether or not maintained by the IPM) may provide or make available said data. By way of example, data 75 obtained by a website may provide information concerning what kind of foods are most interesting to a them, e.g., Italian, That, Indian, Japanese, Mexican, French, Brazilian, Greek or German, what price ranges are of most interest. A program registrant may indicate the kinds of merchants where they are interested in obtaining discounts (such as electronics stores, high-end service stores (spas or massages), book stores, automotive shops or dealers, and/or appliance stores. Said preference data may be ongoing (in the sense that a program registrant always likes That food) or in other embodiments, the preference data may be more fleeting, such as a program registrant now has a preference for obtaining discounts at appliance stores (because, for example, they are considering getting or replacing a refrigerator or a washing machine), but they plan on making that purchase in the next month and are not otherwise interested in receiving discounts from that type of merchant.

Note that a program registrant may also enable blocking of certain incentives 14F, including through the use of filtering algorithms, to reduce or eliminate certain kinds of incentive offers and to avoid being flooded by unwanted offers. Program registrants may also use an outside website to provide permission (opt in) to the establishments they already patronize to share their data with the IPM 71, where that data would otherwise be held as private. Data 75 may be provided by the customer to show that they are actively interested in receiving incentives that fit one or more criteria, too, said criteria can be virtually anything.

Another example of data that can be utilized by the system is data 76 generated though the use of the program itself. In many embodiments, data 76 is generated internally by the IPM 71, and not accessed from an outside database. However, in some cases, incentive "acceptance and rejection" data may be obtained from other sources 76 external to the IPM 71, as well. In any case, said data may include (by way of example and not of limitation) data indicating that when it comes to incentives offered for high-end Italian restaurants, "program registrant X" has no history of redeeming any such incentive where the incentive is less than 40% off of a bill. Alternatively, data 76 may be utilized by the IPM 71 to determine that a customer has redeemed 90% of all restaurant offers where that offer is greater than (for example) 25% off. The IPM may then utilize that data to send on a merchant's behalf an incentive offer that is precisely 25% off, since the data 76 indicates that "less" of an incentive is generally sufficient to influence that program registrant's behavior, and would thus be less costly for the merchant. Similarly, data 76 may indicate that a program registrant has never responded to incentive offers that are less than 30% off, and so where a greater discount is necessary to attract a preferred customer, a "better" incentive may be employed. As will be recognized by one of skill in the art, there is virtually no end to how the rejection and redemption of incentive data may be utilized to make the system more efficient and more profitable. Of course, as will be recognized by one of skill in the art, not all incentive offers come in the form of "percentage off" discounts. Regardless, acceptance and rejection can be tracked across a wide variety of incentive types without departing from the scope of the invention.

As will be recognized by one of skill in the art, said data 76 is a powerful and valuable tool for merchants (even where the merchant does not have access to the underlying data), in part because it may be utilized to offer more "efficient" incentives. Generally speaking, merchants prefer to send only the most efficient incentives possible to elicit the desired customer behavior. For example, where a merchant is deploying incentives to get an additional 50 new customers to spend a minimum of 100 dollars at their store, all things equal, that merchant would prefer to have those 50 customers redeem incentive offers for 20% off, instead of incentive offers for 50% off, if both the 20% and the 50% off incentive offers would have been sufficient to entice the same number of customers to patronize their store.

Thus, in one embodiment, Merchant 15 utilizes IPM 71 to target 50 "new" customers to their high-end Italian restaurant. The Merchant wishes to target individuals that are no closer than 5 miles from their store, but no farther away than 10 miles. The Merchant 15 further wishes to preferentially select for individuals that have indicated on Facebook or other social networking site that they "like" at least one of said Merchant's 15 three largest competitors. Merchant further wishes to preferentially select for customers that have patronized one or more of those competitors in the last 30 days, spending in aggregate at those competing merchants at least $200 USD in that time. Additionally, the Merchant 15 wishes to send the offer only to individuals that have indicated in an "incentives preference" internet-accessible account they maintain with the IPM 71 that they are actively interested in trying restaurants they haven't tried before. Finally, Merchant wishes to preferentially select individuals with a history of redeeming more than 60% of the past incentive offers wherein those offers included discounts of 25% off or less. As will be recognized by one of skill in the art, databases and data depicted by 72-76 are merely examples of the kinds of data that may be utilized and or linked with the IPM, or, for that matter, any entity capable of utilizing data to construct targeted incentives. Many other sources are possible.

Having utilized the IPM to communicate the above parameters for their preferred customers, the IPM 71 queries its internal database and/or linked outside databases. In so doing, the IPM draws on data originally obtained from one or more 72-type databases, and in so doing identifies 7,987 unique individuals that have expressed on a social networking website (or similar, such as "yelp.com") that they "like" one or more of the three designated competitors to Merchant 15. Of these 7,987 unique program registrants, data originally obtained from three type 74 databases (one said database source 74 being a GPS-driven iPhone application that sends the IPM location data); one said database source 74 being the customer's account maintained by the IPM 71 wherein said account indicates an address including zip code; and one said database 74 source being data accessible from customer travel patterns, as indicated by aggregate geo-location of their cell phone/smart device wherein said data is obtained from the hours of 1:00 A.M. to 5 A.M. on most week days (i.e., times when they are most likely at home). Drawing on this aggregate information accessed from or originally obtained from multiple data sources 74, the IPM 71 determines that of the 7,987 unique program registrants already identified, 5,124 of them have a high likelihood of living 5 to 10 miles away from Merchant 15. The IPM 71 further filters those unique program registrants utilizing data 76 that the IPM itself has generated internally from past redemptions and acceptances of incentive offers, and in doing so finds that of those 5,124 unique individuals, 2,003 of these customers have redeemed 60% or more of the offers providing discounts of 25% or less. The IPM 71 then queries: 1) two internal type 73 databases (a Visa system database and a MasterCard system database constructed from aggregate transaction data obtained from the transactions conducted by participating customers using one or more Visa or MasterCard credit or debit cards—or, alternatively, a single database containing the information in aggregate form) and sends a query to 2) an external database 73 maintained by Discover. In so doing, the IPM determines that of the 2,003 unique individuals matching the previous criteria, 667 of them have spent over 200 dollars in aggregate at one or more designated competitors to Merchant 15. Finally, the IPM 71 reviews these 667 unique program registrants and determines, utilizing internal database 75, that 580 of them are actively interested in receiving additional incentives to restaurants, and of these 442 of them have expressed a preference for mid- to high end restaurants. Having determined that 442 individuals "fit" the merchant's 15 parameters, the IPM may then distribute the number of incentives requested, and communicate those incentives to those customers utilizing any means preferred or otherwise designated by those individuals, such as the methods of communication depicted generally in FIG. 13, and more specifically in 13B.

As an aside, with respect to the data acquisition capabilities of the system, it is noted that one of the major advantages of the system is its ability to utilize data from disparate sources (such as multiple, unrelated card-issuing banks with whom a participant does business), as opposed to limited data obtained from, for example, a single bank or a single card-issuing bank or electronic payment enabling entity). Because a participant may utilize a card issued from one bank to buy groceries and gas (because they get 2% back on all such purchases) and another card for other purchases (such as airline/travel) and still another for business purchases, the ability to aggregate or access data across disparate accounts provides a more robust and accurate picture and data set which can be utilized to generate better incentive offers. Moreover, the ability to "redeem" an offered incentive using one of a plurality of cards or instruments registered with the system is also a major advantage as well.

The one or more databases reflected in FIG. 7 represent an example at an external level of an exemplar database architecture that may be employed in one or more embodiments of the invention. FIG. 7 is a visual representation of information stored in one or more databases. This/these database(s) can take a variety of forms. In one embodiment, the database(s) are managed utilizing a database management system or (DBMS), which (among other things) may be employed to perform one or more of the following tasks: operation of the database(s); provision of storage, access, security, backup and other facilities, for example. Some embodiments may utilize one or more of the following forms of a DBMS: MySQL, PostgreSQL, Microsoft Access, SQL Server, FileMaker, Oracle, RDBMS, dBASE, Clipper, or FoxPro, among others. In one embodiment, the database software will employ an Open Database Connectivity (ODBC) driver (or other software) that allows the database to integrate with other databases in order to integrate more information relevant to the construction and delivery of incentives, and thus to provide extended functionality to the system.

Figure 8:
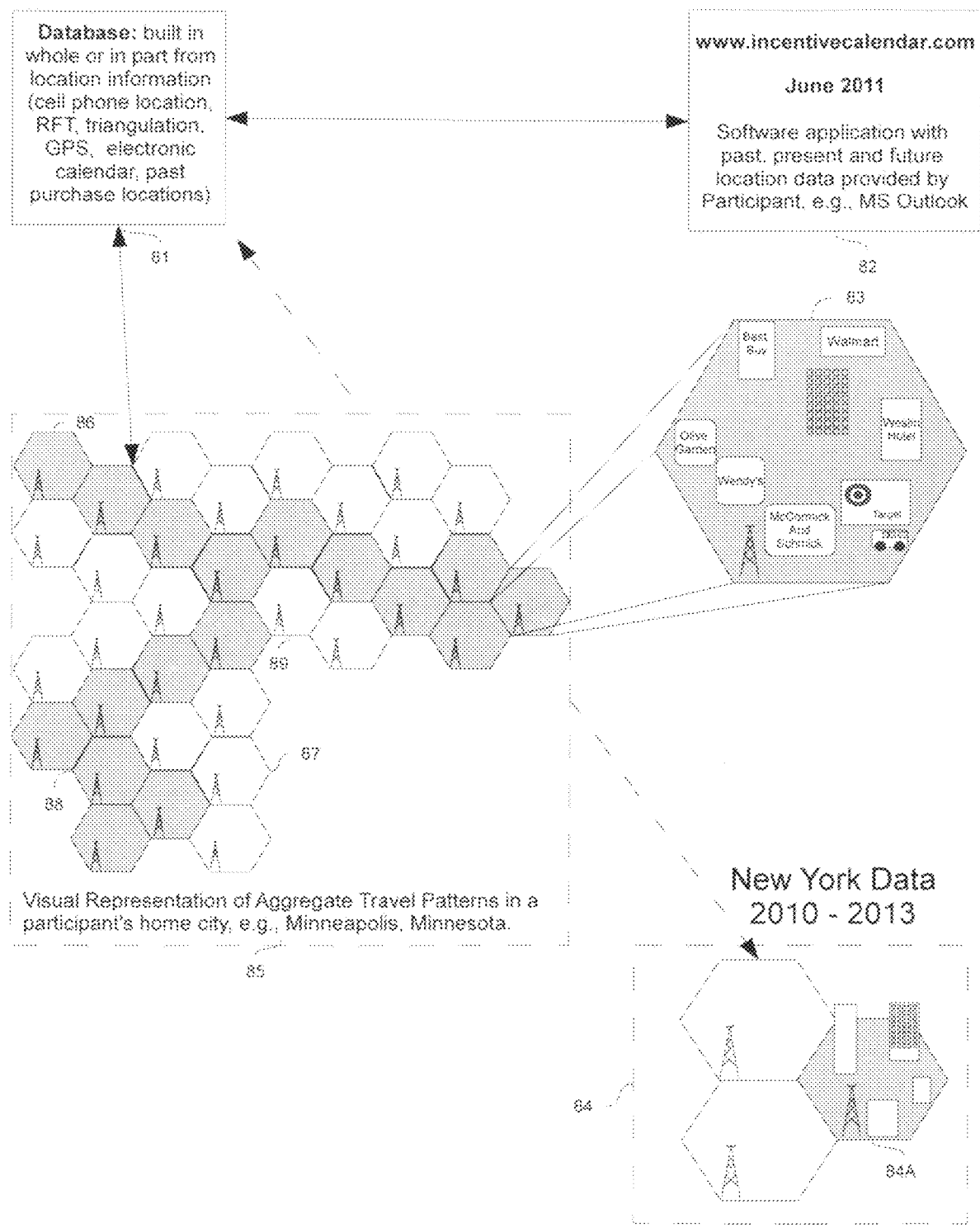
FIG. 8 is a diagram of how certain program registrant location data can be collected and utilized in accordance with one embodiment.

FIG. 8 is a visual representation of geographic and/or travel data that may be utilized by the IPM in constructing incentive offers where information regarding a program registrant's travel or physical location are pertinent. Data depicted by FIG. 8 is most useful where one or more program registrants are being incentivized to patronize brick-and-mortar retailers, as opposed to interne-based retailers where the physical proximity of the customer is not of major concern.

Database 81 is a depiction of data that contains geographically-specific information. Database 81 may, in many embodiments, contain additional, non-geographically specific information as well. In other embodiments, the system and method may contain more than one database 81, and may in fact contain several, some proprietary to the IPM, others proprietary to third parties or belonging to a participating program registrant.

In one embodiment, Database 81 is a relational database managed by the IPM. In another embodiment, database 81 is maintained on a program registrant's "smart device" such as an iPhone, iPad, Droid smartphone, other similar device, said device containing aggregate travel data for a given program registrant that may be linked via an application to the IPM. By way of example, database 81 may incorporate data that originates from any number of sources. For example, where a program registrant records planned travel events in the future, for example out-of-town trips, that information may be recorded on a computer calendar that is capable of registering specific dates of future travel. Said computer calendar may then automatically export said data, including to 81. Such travel information may alternatively or complimentarily be provided via website 82, where a program registrant inputs planned travel dates and locations for the express purpose of providing that information to the IPM to a) elicit incentive offers in other cities or countries over those given dates and/or b) to filter out, (for example, via 14F in FIG. 14) incentive offers redeemable in the program registrant's home city during the period they will be away. In another embodiment, said information may be maintained on an application (or "app") on a device. In another embodiment, said information 82 may be provided from a travel website, such as Travelocity or Priceline, which may include data regarding what city a program registrant is going to, and more specifically, where in that city the program registrant intends to stay, and for how long. As will be recognized by one of skill in the art, that data may be utilized to provide incentive offers for merchants proximate to (or distant from) the program registrant's hotel.

83-85 is an exemplar visual depiction of program registrant movement and location data captured from a variety/plurality of sources, some or all of which may be utilized by the IPM. 85 is a visual representation of aggregate travel data for a program registrant in their home city, in this case, Minneapolis, Minn.; actual data would reside in one or more databases. Each of the shaded and un-shaded hexagons represents an area of the city, and each of the towers depicted in those regions depict cellular towers, indicating that location data obtained through the use of the program registrant's cell phone may indicate travel patterns through the city, for example travel patterns from the home to the office. Note that the means for ascertaining location data is not limited to cell tower triangulation, but extend to include any means for tracking or determining location. The shaded areas indicate program registrant activity within each of those areas, as potentially evidenced by a variety of disparate data sources, including captured travel or location data (cell phone location, GPS data, radio frequency tags, user-provided information though a dedicated incentive application). 83 is a blow up of one such geographic area, showing the approximate physical location of merchants, such as Target, the Westin Hotel, Olive Garden, McCormick & Schmick's restaurant, and Best Buy, where the program registrant has made prior purchases. In some embodiments, the time of any said purchases (or the time of travel) is cross referenced and utilized to give the system sufficient information to determine the approximate times the program registrant can be expected to be in any specific region of a city, said information correlated to their commutes, where their home is, where they tend to shop or travel, and where they conduct business. Aggregate movement patterns of a program registrant can be correlated with merchant locations and used to estimate past, present and future locations. It is worth noting that cell areas typically vary by population density and the figure is exemplary only and not necessarily to scale.

By way of example, the IPM may be able to determine, based in whole or in part from data depicted in 85, that from Monday through Friday, program registrant X's aggregate data (e.g., from cell phone, GPS, Apps, and purchase data) indicates that program registrant X tends to be in region 88 from 6:30 PM to 7:30 AM in the morning. The data in database 81 may also indicate that from 8:30 in the morning to 5:30 at night, aggregate data from these same or other sources suggests that program registrant X will be in region 83, where they have a history of conducting transactions at various merchants in that area. That same data may indicate that program registrant X rarely goes to region 87, yet they do frequent region 86, but only on weekends. Such time and location specific data, when utilized by the system, can provide additional information that may be utilized by the IPM to, for example, issue competitive incentive offers to offer incentive offers to the program registrant to make an incentivized purchase in region 83 during the work day and in region 86 during the weekend. Alternatively, the IPM may utilize the data to make incentive offers to the program registrant for a purchase at a merchant in region 89, since while the aggregate data indicates that the program registrant does not frequently travel or make purchases in that area, that area is proximate to the consumer's regular travel patterns, and thus a stop at a merchant in that region will be more likely, given that it's "on the way" to either work or home.

Database 81 may receive geographic-specific data from areas away from the program registrant's home city, for example in New York 84. 84 depicts aggregate data about a program registrant's travel and purchase history in New York city over time. Said information may indicate that a program registrant travels to New York several times each year, and on those trips the program registrant tends to do business, eat at restaurants, and stay at hotels in area 84A. This information, stored in 81, may be utilized by the IPM to offer appropriate incentive offers to the program registrant to stay at competitive hotels and dine at competitive restaurant in the same area 84A on their next trip.

Figure 8B:
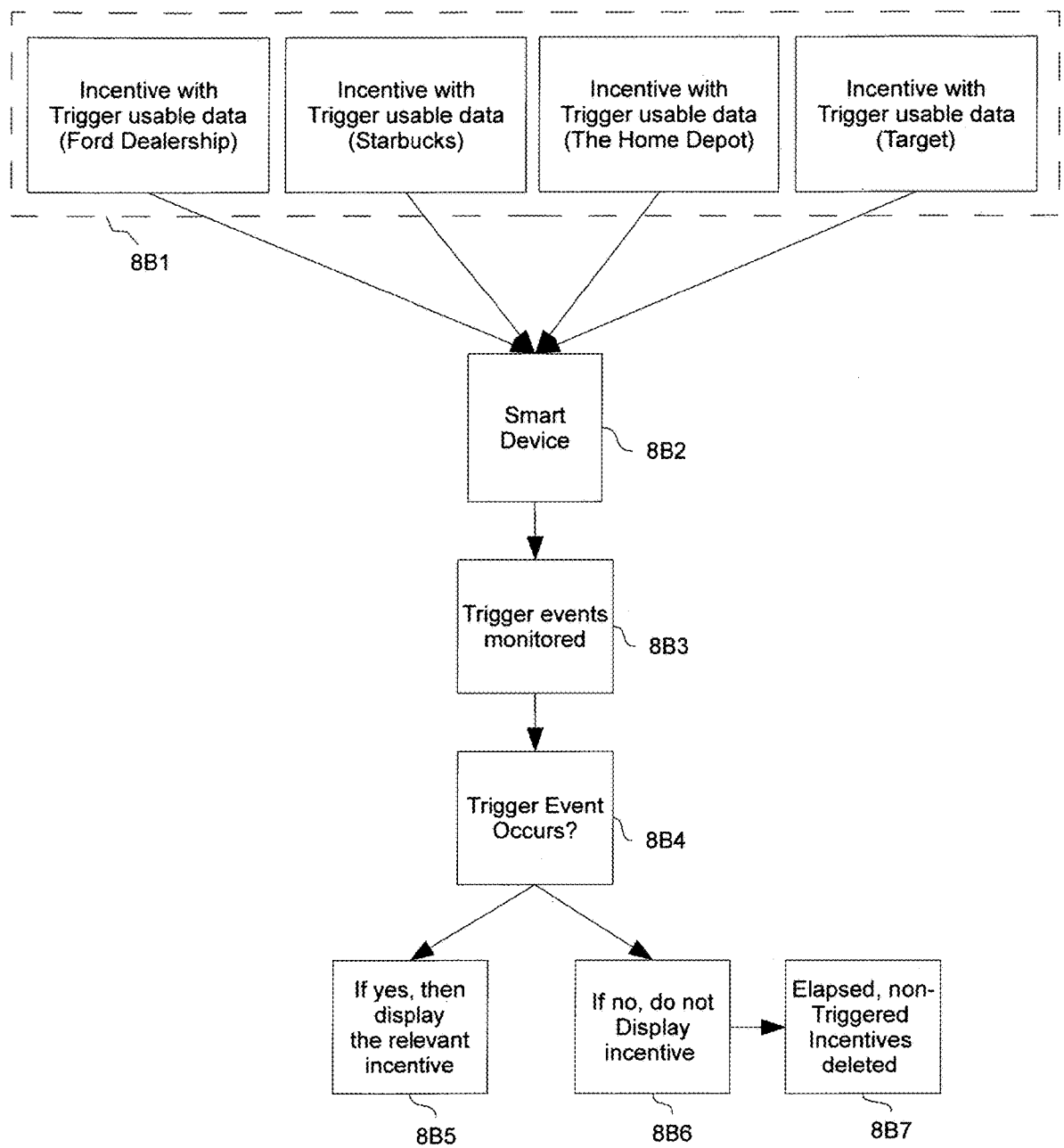
FIG. 8B is a diagram of the delivery of triggered incentive offers may be downloaded to a smart device for delivery upon the occurrence of a triggering event in one embodiment.
Figure 8C:
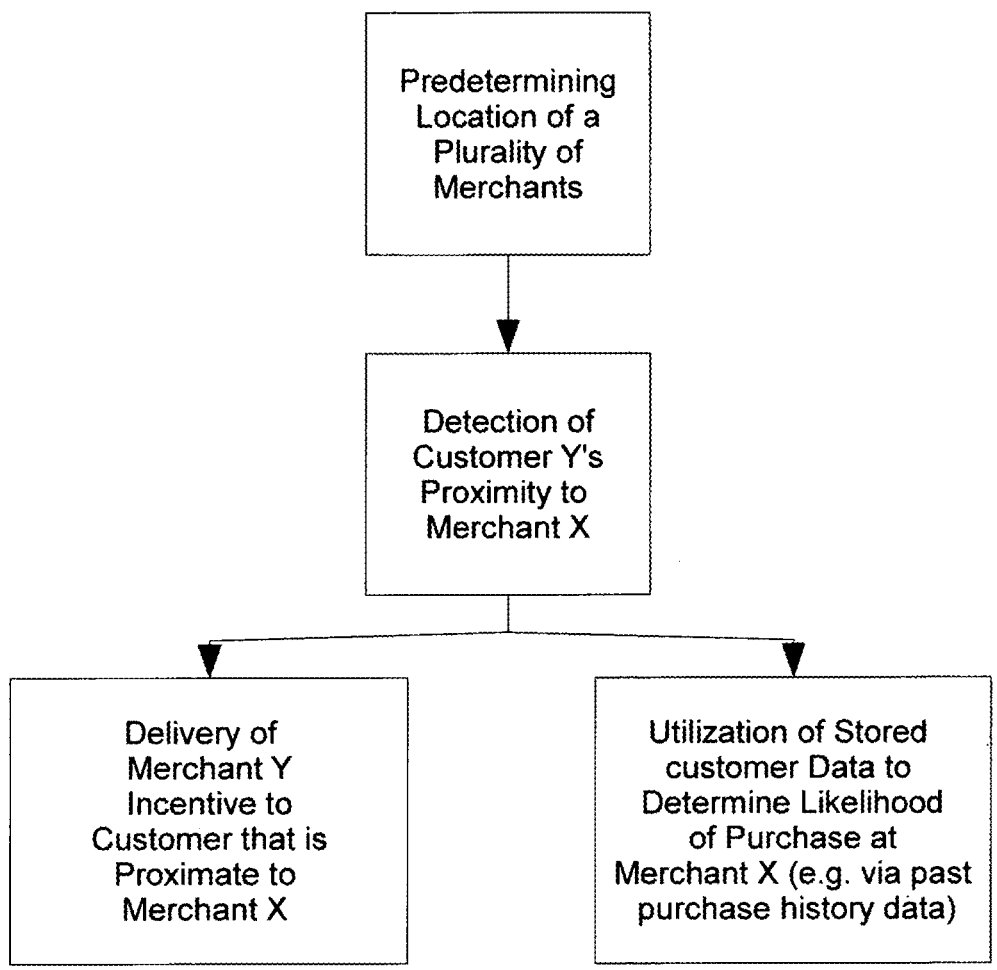
FIG. 8C is a diagram of the use of program registrant location data as a trigger for delivery of an incentive offer in one embodiment.

FIGS. 8B and 8C depict embodiments of "triggerable" incentives that are dynamically delivered to a consumer upon the fulfillment or realization of certain designated criteria. Triggerable events may be created using any data, but by way of example may include time or proximity triggers, event triggers, purchase activity or inactivity, activities of a participating consumer's friends, etc. FIG. 8B1 depicts several examples of incentives for which a participant may be eligible, but which have not been actively communicated to that participant because a precondition for delivery has not yet been satisfied. In one embodiment, those triggerable incentives are sent, but not displayed, to a participant's smart device 8B2, which itself is equipped to recognize the occurrence of a triggering event (or one of them, where a plurality of preconditions are required) without having to communicate the satisfaction of that triggerable event to the IPM or to any outside entity.

Thus, Target Corp may create an incentive offer in order to attract certain customers that have never before been to a Target store. Target creates the parameters of the incentive itself, and defines the characteristics of the "Targeted" recipients (including via a web-based interface similar to that depicted in FIG. 20, Infra.). The offers are deployed and downloaded to smart devices (via software applications on Android or iPhone or Blackberry devices, for example), but remain latent in the device and are not immediately displayed to the recipient. As in 8B3 the device in which the triggerable stealth incentive is now stored will monitor to determine if the predetermined "triggers" are satisfied. In one embodiment, the trigger 8B4 is the targeted consumers' physical proximity to a Walmart or Walgreens store that competes directly with Target. Note that physical proximity may be determined in any way, including via satellite, GPS, cell towers, methods employing triangulation or proximity to wi-fi networks or signals generated at a known location, etc). Thus, if the geo-tracking capability of the smart device in which the incentive is stored determines that recipient "Ms. Johnson" has parked her car at the competing Walmart (8B4) the smart device releases/deploys the stored incentive (8B5) which in this instance may be an incentive for 10% off any transaction made at Target stores in general or at a specific Target conveniently located two blocks away (see, e.g., FIG. 83). Said incentive may further come with a price guarantee that Target will automatically match Walmart's pricing for any items then purchased and applied prior to the application of the 10% discount. In such an instance, the incentive may be redeemed by presenting a coupon displayed on the actual device (for example) instead of being redeemed on the "back end" of the transaction in accordance with embodiments where the merchants (in this instance Target) are not aware of the redemption of the "triggerable" incentive at the time of sale.

Thus, the incentive is strategically delivered at the moment that a consumer is about to patronize the competition. Stored "triggerable" incentives are, in some embodiments, never displayed, as in 8B6, and after they lapse (if they lapse) they are deleted from the device's memory or, where stored remotely, from a remotely-accessible database as per 8B7. The advantages of this system and method are apparent, and indeed, where deployed long term, may effect major aggregate changes in customer behavior. In some instances, participants in the system may actually "cruise" for triggerable events, whether in a car, while walking, or by wandering around a mall, such as the Mall of America.

Turning back to the Target/Walmart example, the fact that Walmart's customers are being relentlessly re-directed to its competitor is never advertised, and the scope of the stealth campaign against Walmart is never made public. In fact, in many instances, hundreds if not thousands of customers (and specifically those'most desirable, high-spending customers) may be redirected to Target, while less desirable customers (those that make few or low-dollar purchases, or whom purchase mostly products with low profit margins) are left "un-incentivized" to continue to patronize Walmart, and Walmart may never know.

Note that in some embodiments there may be a plurality of preconditions that must be satisfied before an incentive is triggered.

More aggressive triggerable incentives may also be deployed, where, for example, the triggering event is an actual consummated purchase. For example, where the IPM registers the purchase of a high ticket price item at any store, that transaction may "trigger" an incentive offer (or just trigger the display of a paid advertisement, instead of an incentive) for that same item offered at a different store, which may in turn prompt the recipient of the incentive to return that high-ticket item and purchase it at significant savings just "down the road."

Note also that the incentives (both triggered and non-triggered) may take the form of a coupon with an authenticity code that is read in-store, and which is not subject to back end processing in order for the consumer to receive the reward, since the reward is received via an immediately-discounted purchase.

Figure 9B:
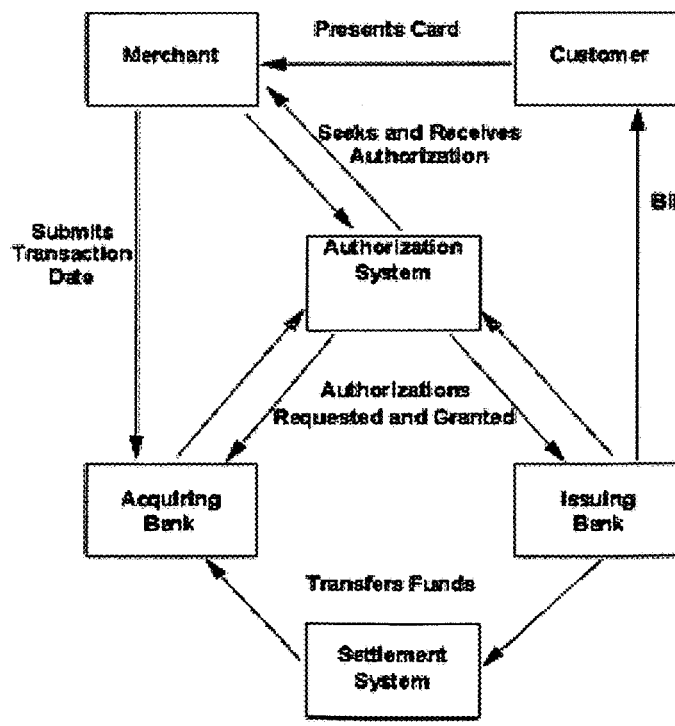
Figure 9C:
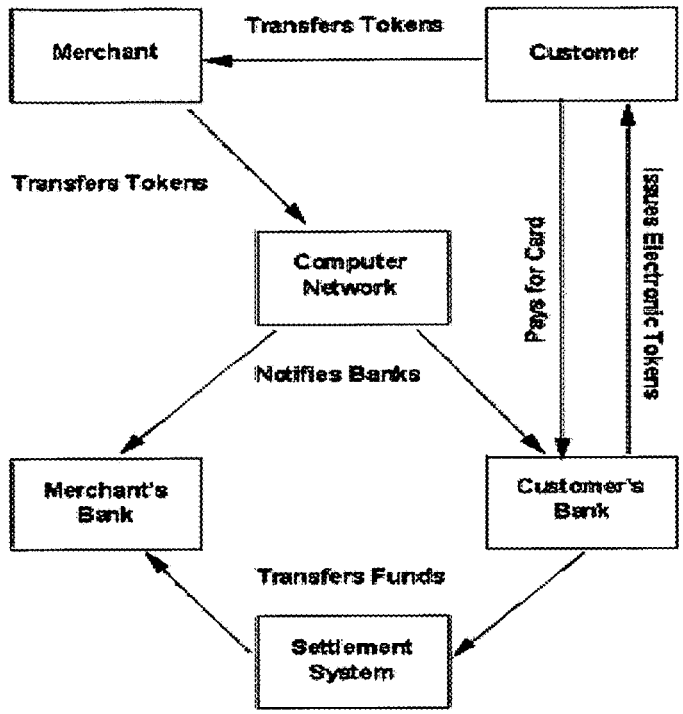
Figure 9D:
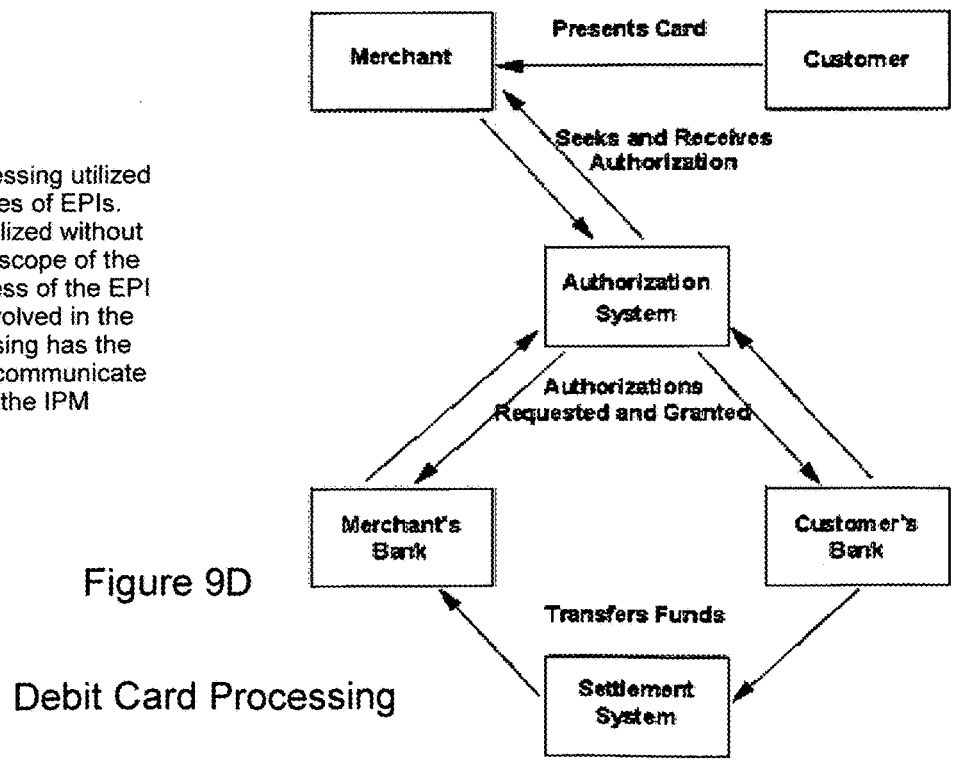

FIGS. 9 and 9B are diagrams depicting the process though which a customer tenders an traditional credit card to pay for a given purchase, including what happens once a customer swipes, for example, a creditor or debit card at a payment terminal. As indicated in FIG. 9, a cardholder may make some purchase by tendering a credit card at a merchant. The credit card is swiped at the credit card terminal, and the request and associated data ("data") is sent from the credit card terminal at the merchant's place of business to the acquirer. The purpose of this is to initiate a request for an approval for the transaction amount in question. Once the data is sent to the acquirer, it is forwarded to a card network, such as the Visa and MasterCard network. That association then forwards the request to the institution that issued the card to the consumer (the "Issuer") for example a bank or a credit union.

Upon receiving the data, the card issuer determines whether or not the transaction should be approved. Approval can be based on a number of factors including the amount of credit and balance on that particular card, whether the card is valid, or whether the transaction has been flagged for any reason as "suspicious." If the transaction is approved, the card issuing bank will issue an authorization code which will be sent to the acquirer through the card network. Once the acquirer receives the authorization code for the transaction, it transmits that authorization to the merchant who is notified that the transaction has been approved. At this point the cardholder receives the product (if it is a product that has been purchased) or has initiated payment for a service.

The second step is called batching. Throughout the day (or a period of time) the merchant will store all of the day's authorized sales in what is referred to as a batch. The merchant then sends the batch to the acquirer. The acquirer sends the batch through the card network such as the MasterCard or Visa card networks, which then distribute each transaction to the appropriate card issuer. At this point the issuer may subtract from the total purchase price what are referred to as "interchange fees" (which are shared with the card network) and transfers the remaining amount. The card network routes that amount to the acquirer. This process is called "clearing." At this point the acquirer subtracts its "discount rate" (another sum of money) and pays the merchant the remainder. Eventually the cardholder is billed for the transaction.

As has been explained, the distribution of targeted incentives may be facilitated by access to certain transaction data for participants in the incentive program of various embodiments. Information about where and when a customer shops or buys services, information on what was purchased, how much was spent, etc., may all figure into any algorithm utilized for determining the parameters and recipients of any incentive offers. To utilize this data, it should first be accessed and/or stored by an entity that is privy to the data. Collectively, FIGS. 9 and 9B-9D outline the entities involved in credit, debit and stored value card transactions. As noted, each entity depicted as being involved in the transaction processing may provide or serve as a source of transaction data, which may be utilized by the system. FIG. 10 depicts the transmission of transaction data to various entities, such as (for example) those entities involved in a typical transaction involving a Visa or MasterCard credit or debit card, as depicted in FIG. 9, or "smart" payment device, such as a transactionally-enabled smart phone. In one embodiment, such transaction data may contain (by way of example and not of limitation) the total cost of the goods being purchased, the identity of the particular goods purchased including (by way of example) SKUs (or stock keeping units) or UPC data (i.e., Universal Product Code data), and the amount charged for any specific item, including whether its purchase was subject to a discount from, for example, a store coupon, as reflected, for example in FIG. 21. Other data that may be transmitted includes the time of purchase, the date of purchase, the location of the store where a purchase was made, a credit card or debit card or other payment mechanism associated with the transaction, whether any coupons or incentives were redeemed during the transaction, etc. Moreover, in some embodiments, any of the above information that was previously captured and stored in connection with one or more previous transactions with that merchant may also be transmitted. Much of this data is not currently transmitted during a typical credit, debit, or check card transaction, however, in various embodiments of the system and method of this disclosure a wide variety of other data may be transmitted without departing from the scope of the disclosure.

In most transactions, such as those depicted in FIG. 9, consumer data is not transmitted from the consumer to other entities down a transaction chain without going through the merchant. Instead, such data is captured by the merchant and then transmitted down that chain, most commonly from the merchant to the merchant acquirer to the interchange to a card-issuing bank. But in other embodiments, that need not be the case, as demonstrated by FIG. 10.

FIG. 10 shows that transaction data may be distributed from any number of points to any other point in the system directly, and in some embodiments the data "skips" one of the typical entities down the traditional transaction processing chain reflected in FIG. 9 or is routed to another similar entity, such as from a program registrant to a merchant acquirer to a second merchant acquirer. For example, at the merchant level, some transaction data may be transmitted to the merchant acquirer and then to the Interchange and then to the issuing bank, but in other embodiments, data regarding the transaction is collected and is sent from the merchant acquirer or via the merchant, via a secure interne connection, directly to the issuing bank, completely bypassing the interchange. Any number of such split and or routed transactional data may be employed by one or more embodiments without departing from the scope of the invention.

By way of example and not a limitation FIG. 10-1 illustrates that program registrant 10A swipes an electronic payment instrument, such as a check card at merchant 10B. Data from that transaction (or subset thereof), for example data that is contained on a typical receipt, may be transmitted from that merchant to, for example, merchant acquirer 10C1. Alternatively, merchant 10B may transmit data directly to card network 10D1, or issuing bank 10E1, or to any other entity as indicated by 10F1, such as an IPM, a third-party, or consumer 10A's e-mail account. In addition each of these entities may forward, where permitted, said transaction data to any other entity, those entities being depicted as 10C2, 10D2, 10E2, and 10F2. While not depicted by FIG. 10-1 or 10-2, there may be intermediary recipients of said data anywhere along the chain. In summary, FIG. 10 depicts examples of how transaction data may be transmitted from any entity up and down the chain from the customer to the merchant to the Acquirer to the card network to the issuing bank and back down again. As will be recognized by one of skill in the art the same is true of networks that are not based on the Visa or MasterCard networks but are instead based upon the American Express or Discover networks which employ slightly different systems. The same is also true of non-card based transactions, as well, including transactions involving cash payment where the data is nevertheless captured and utilized, as via (for example) a loyalty card issued by the merchant itself. Any entity along a chain may transmit the data to one or more databases that may be utilized for tracking the redemption of an incentive offer or which may be utilized to amass additional data that may be utilized in constructing and/or delivering incentive offers to desired program registrants.

Figure 11:
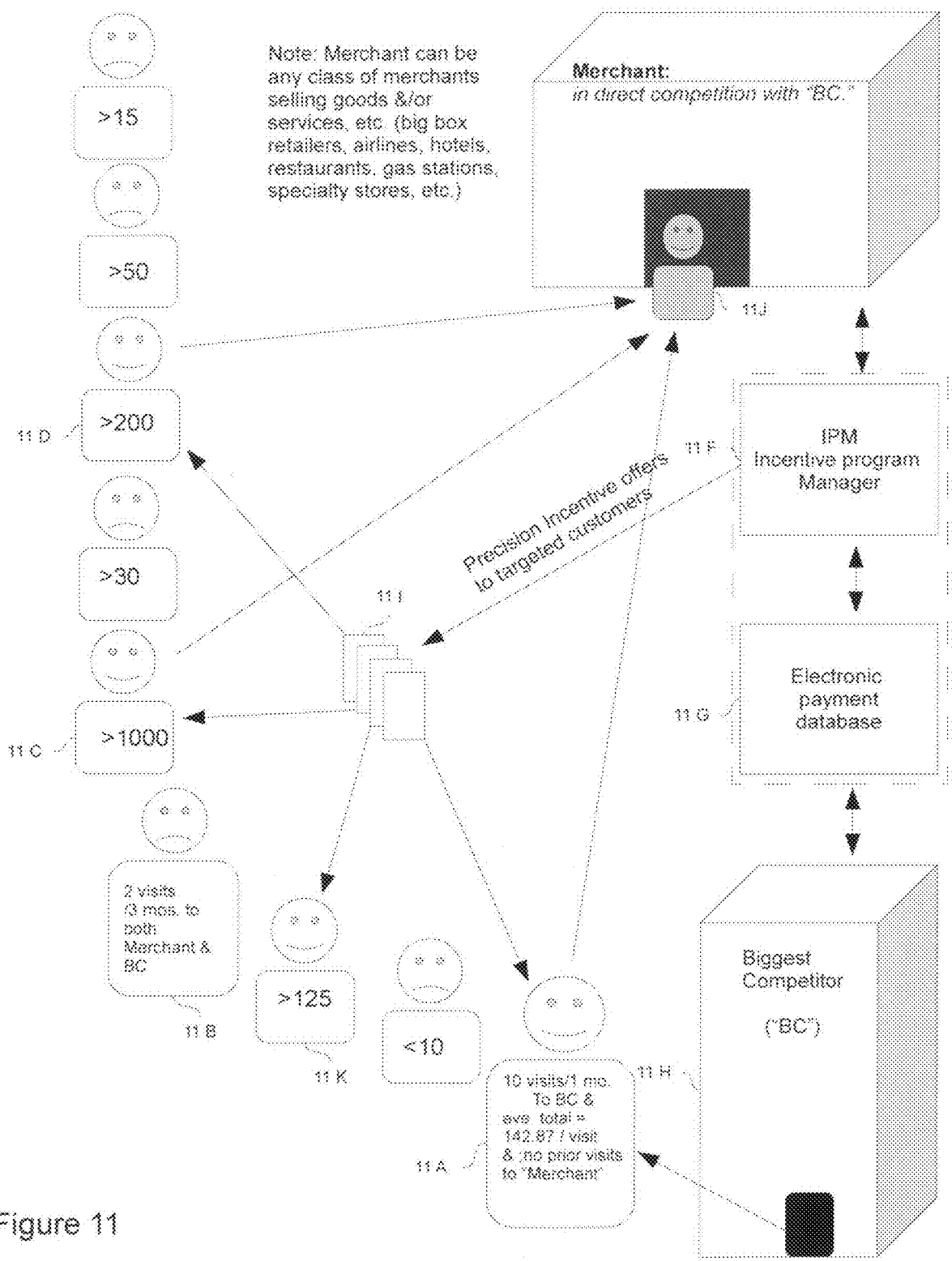
FIG. 11 is a diagram of how a merchant can use the system and method to strategically target customers of a competitor in one embodiment.

FIG. 11 is an example of how a merchant (or other entity that wants to send one or more incentive offers) may utilize an embodiment of the invention to strategically target the delivery of incentives to the customers of its biggest competitor. Note that this is simply an example, and that in other embodiments, a manufacturer of goods, such as an OEM making computer processors or a company that sells cereal, such as General Mills, may offer such incentives as well where their competition is not a brick-and-mortar store.

Figure 13:
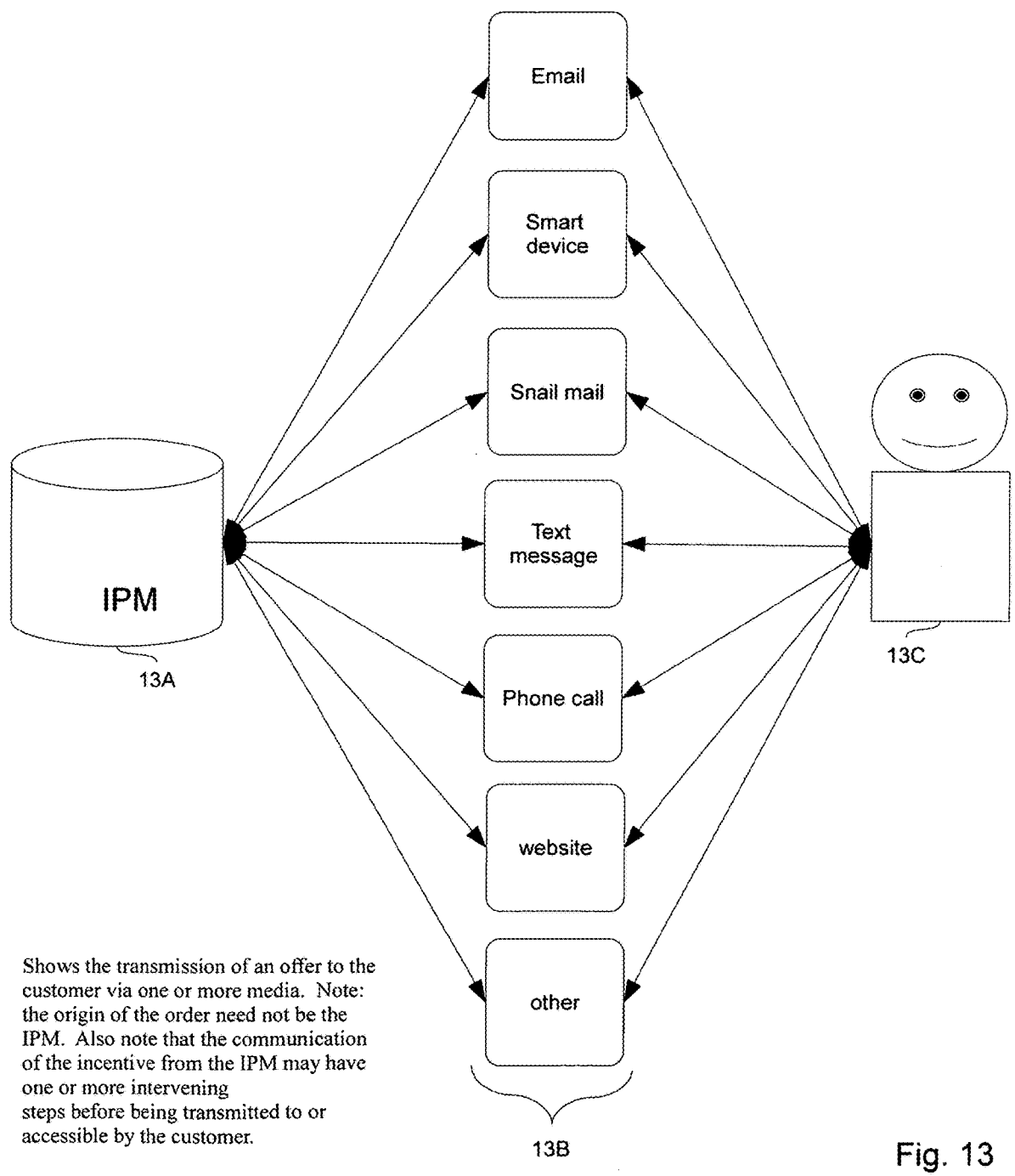
FIG. 13 is a diagram of communication links between an incentive program manager and third party, such as a program registrant and/or merchant in one embodiment.

In the embodiment reflected in FIG. 11, merchant 11J is in direct competition with its biggest competitor 11H. In an effort to attract customers away from 11H, 11J, utilizes the incentive program manager 11F. 11F has at its disposal data obtained from a number of sources, one of which is depicted as 11G. 11G is an electronic payment database that contains, among other things, information about those program registrants that have patronized 11H in the past. Using aggregate data obtained from 11G, the IPM 11F identifies a number of customers that have patronized 11H in the past. Among these program registrants is 11D, who has spent in excess of $200 at 11H in the recent past. Also identified is program registrant 11C, who has made a purchase from 11H (or a succession of purchases) which are in aggregate in excess of $1000 (also in the recent past). Program registrant 11B is also identified as having made two visits in the last three months to 11H and to merchant 11J, indicating that the program registrant already patronizes both merchants. Program registrant 11K is identified as having spent over $125 at 11H. 11A is also identified as having made 10 separate purchases in the last month at 11H, with an average purchase of $142.87 per visit, and no recorded prior purchases at merchant 11J. Additional customers of biggest competitor 11H are also identified. In FIG. 11, 11J determines that it wishes to target the best customers that it can of 11H, and so requests that the IPM 11F identify appropriate recipients for an incentive offer according to parameters set by 11J, and then to deliver those precision incentive offers 11I to program registrants 11D, 11C, 11K, and 11A. It's important to note that in some embodiments of the invention, the merchant 11J (or anyone initiating an incentive offer, for that matter) does not actually know the identity of the program registrants it is targeting, or even the specific characteristics of any one of those registrants; instead, the merchant may only know that program registrants fitting the merchant's criteria for the receipt of an incentive offer are available for incentive targeting. In response to their receipt of an incentive offer 11I, three of those program registrants including customer 11D, 11C, and 11A, go to the merchant 11J and redeem the incentive offer. As has been described elsewhere, incentive offers 11I may be sent to each of these program registrants in any one or more than one of a variety of ways, some of which are depicted in FIG. 13.

It should be noted that incentive offers 11I may be both for traditional discounts (such as a percentage discount, a dollar discount, or cash back) in exchange for a qualifying purchase, and (in other embodiments) for non-traditional incentives as well. By way of example, Merchant 11J may provide an incentive to a program registrant if they refrain from taking a specific action. For example, where customers of a competitive restaurant are identified, a merchant (e.g., 11J) may offer an incentive to program registrant 11A not for patronizing 11J's store, but for not patronizing arch-competitor 11H, or not engaging in other undesirable behavior. In such an instance, merchant 11J may be, for example, an issuing bank that wants to offer incentives to customers of rival banks to stop using a certain bank card, or decrease the amount charged to that bank card, etc.

It should be noted that in the embodiment depicted in FIG. 11, merchant 11J need not be aware of the identity of the recipients of its targeted incentive offers 11I. The identities of each of these program registrants can be maintained as a secret, and the redemption of the incentive offer need not be known to 11J at the time of a qualifying purchase or redemptive event (or even thereafter). Once, however, a qualifying purchase has been made at 11J by 11D, 11C, and 11A, the fact of that purchase including data from which it is possible to test and/or to determine whether or not a redemptive event has occurred will be sent either directly or indirectly to (or is otherwise accessible by) the IPM 11F.

Figure 12:
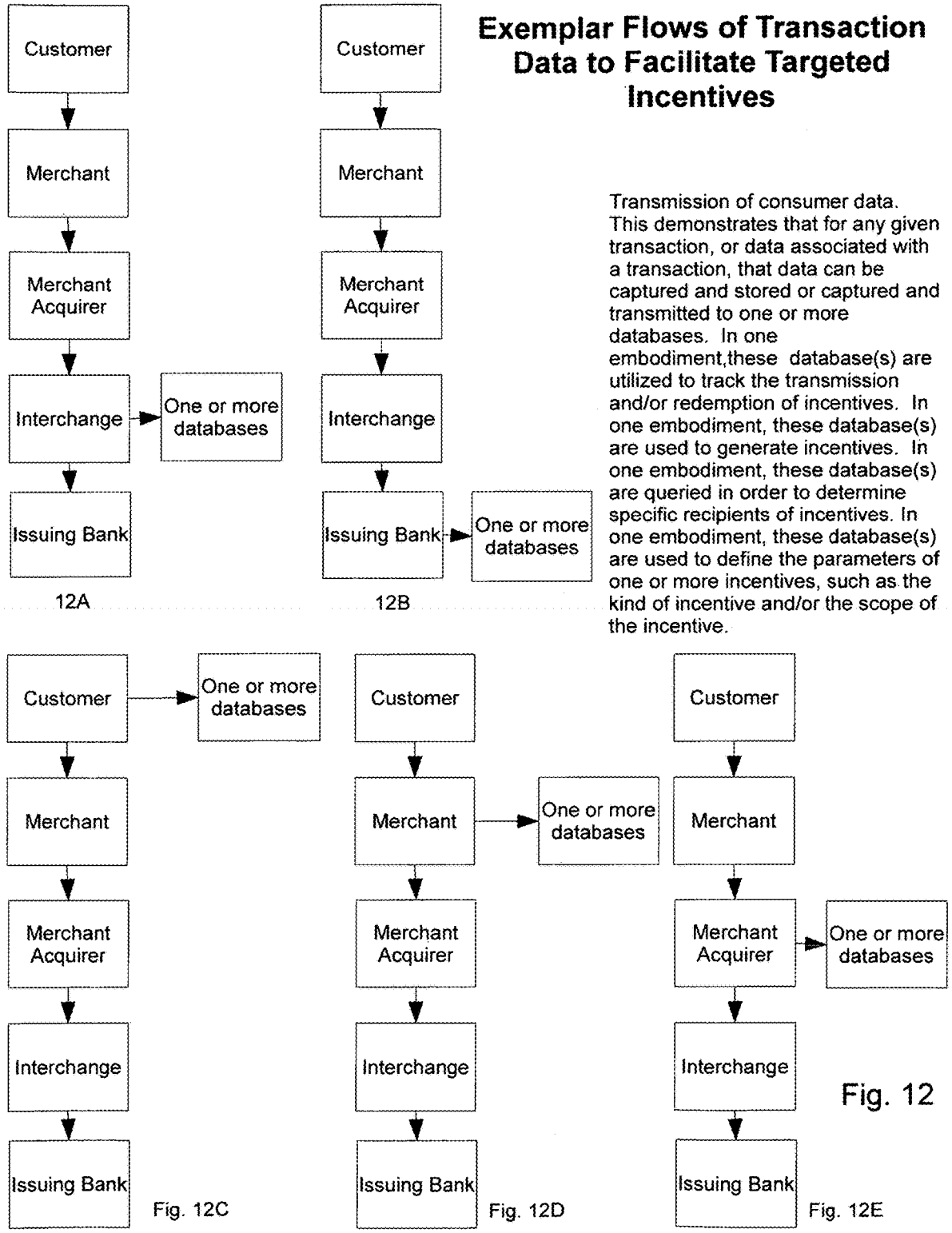
FIG. 12 is a diagram denoting the potential source and transmission of transaction data controlled by or accessible to the incentive program manager in one embodiment.

FIG. 12 illustrates examples of the flow of consumer transaction data, said data may include any and all information generated in the course of a transaction (merchant, location, transaction amount, transaction time, EPI utilized, specific items purchased and their number and cost, etc.). In one example, transaction data may be sent to the IPM by an interchange such as the Visa or MasterCard network or the American Express or discover networks, as depicted in 12A. In another embodiment, information and data concerning a transaction may be forwarded to one or more databases—including a database maintained by or accessed by the IPM—by an issuing bank as depicted in 12B. In another embodiment it is the consumer that forwards transaction data, via any available means, to one or more databases, including databases maintained or accessed by the IPM, as depicted by FIG. 12C. In one embodiment, the consumer utilizes a Bluetooth-enabled "touch and go" EPI, which captures a digital receipt of all the items purchased (including UPC data) during the transaction process. In another embodiment, the consumer provides, for example, the IPM with access to the consumer's banking and transaction records which are accessible online (for example). Said data communicated by the participant/consumer in 12C may include data regarding the specific items purchased, the quantities purchased, and the costs of each said item. In still another embodiment it is the merchant that forwards transaction data to one or more databases including databases managed by or accessed by the IPM, as depicted by FIG. 12D. And in yet another embodiment, it is the merchant acquirer that forwards transaction data to one or more databases that are either maintained or accessed by the IPM as depicted by FIG. 12E.

FIG. 12 depicts examples of how data related to any given transaction may be transmitted to an entity that may or may not play an active part in that transaction. While in an alternative embodiment the data need not be transmitted to an outside entity, but is instead maintained by one or more databases maintained by, for example, a card network (such as Visa, MasterCard, American Express, or Discover); or which is maintained by one or more databases maintained by an issuing bank, for example. Of course, any of the entities (or other entities) depicted in FIG. 12 may alone or in concert with any other entity create or contribute to a transaction database for the purpose of issuing and redeeming incentive offers.

Capturing and utilizing these transaction data allows an IPM to, among other things, determine whether or not an incentive offer has been redeemed through the course of a transaction, and also allows the IPM to continue to add data to a program registrant's records to enable the system to have more data to draw upon in crafting and delivering targeted incentive offers.

Turning now to FIG. 13, we see a depiction of an entity 13C communicating with IPM 13A. In this figure the IPM 13A has identified program registrant 13C (and perhaps others) for receipt of an incentive offer. The IPM then utilizes one or more means of communication, collectively depicted by 13B, to communicate the offer to the customer 13C. As will be recognized by one of skill in the art, any form of communication is possible, although some forms of communication may be more efficient than others. For example an incentive offer can be communicated to a program registrant 13C via e-mail, a smart phone or "smart" device. In other less efficient embodiments, an offer may be communicated to 13C via mailing through the post office. In still other embodiments, the incentive may be communicated via text message or "tweet" sent to a cell phone or through a phone call (including an automated phone call) or a phone call from a human. In another embodiment, the incentive may be accessed through a website or smart phone "app" that accesses a website (including in one embodiment a website maintained by the IPM), where the website's main purpose is the management or delivery of incentives. Virtually any communicative mechanism may be utilized without departing from the scope of the invention. Note that in FIG. 13, while the entity communicating the incentive is designated the IPM 13A, it may be any combination of entities or intermediaries that communicates and delivers said incentive offers to a program registrants. Note that in one embodiment, the program registrant instructs the IPM (or IPM alternative) of the form(s) of communication that is/are preferred, and the program registrant provides to the IPM data necessary to communicate an offer, such as a email address, an account number, a phone number, twitter account, etc.

Figure 14:
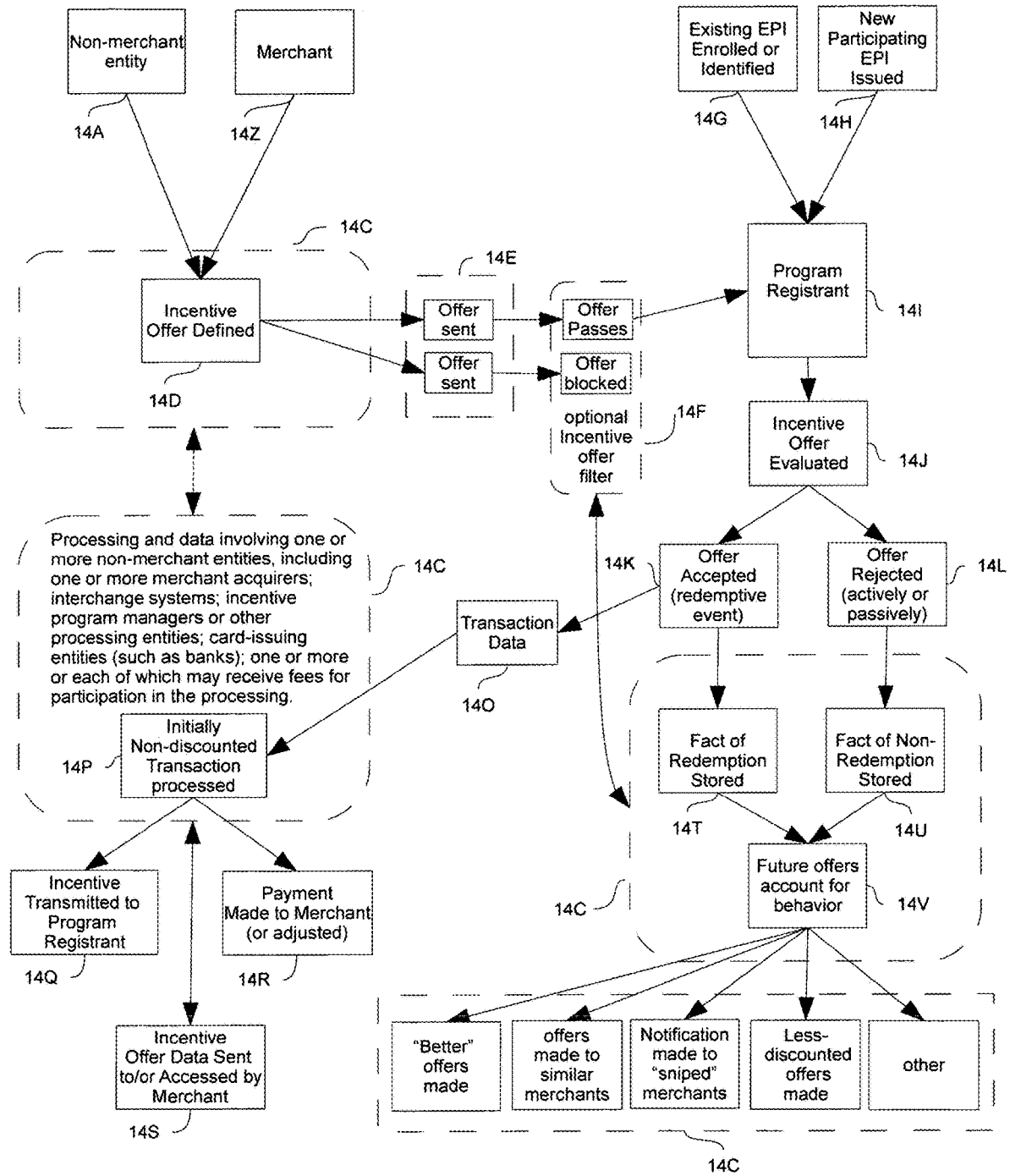
FIG. 14 is a diagram of the initiation, receipt, redemption, and reward delivery related to an incentive offer in one embodiment.

FIG. 14 shows the relationship among various participants in one embodiment of the incentive system and method of this disclosure. In this embodiment, the terms of the potential incentive offer are defined by the merchant or a third party, such as an advertising or marketing agency 14A, 14Z. The incentive terms are sent to (or determined in) an incentive program manager 14C, via, for example, an online system. The incentive program manager then creates an incentive offer consistent with the terms received from the merchant or third party. Once the incentive offer is created, it is then communicated to the program registrants 14I, who have either enrolled one or more preexisting electronic payment instruments in the incentive program 14G or have been issued a new eligible EPI 14H. The incentive offer is communicated to the program registrant through any communication method known to those of skill in the art 14E. In this embodiment, the program registrant has implemented an incentive offer filter, to limit the delivery of incentive offers to those offers which exceed some threshold or which meet certain criteria 14F (e.g., for certain classes of merchants (restaurants but not massage parlors); merchants having met a threshold of acceptability (a "star" rating or minimal Yelp.com rating, for example); or merchants in a certain geographic area, etc.).

Where incentive offers are delivered to the program registrant (and not otherwise filtered out), the program registrant evaluates the incentive offer 14J, and either accepts or declines the incentive offer 14K, 14L. An incentive offer may be declined either actively, such as by deleting the incentive offer from a web or smartphone accessible list of available incentive offers, or by simply not redeeming the offer and allowing it to expire, or by actively communicating a "decline" decision 14L. Data on whether or not an incentive offer is redeemed (14T, 14U) may be stored (including by the incentive program manager 14C), and may be used (as part of a data set utilized by one or more algorithms) to make recommendations to merchants or otherwise tailor incentive offers delivered to program registrants to maximize redemptive behavior 14V 14C.

In this embodiment, where a program registrant accepts an incentive offer by making a purchase with a participating electronic payment instrument that complies with the terms of a delivered incentive offer, transaction data is generated 14O. These transaction data are utilized by the incentive program manager 14C in this embodiment to process an undiscounted transaction for the program registrant that is redeeming the incentive offer 14P. Note that in alternative embodiments, a discounted transaction may instead be processed, though the discounted nature of the transaction may not be evident from the receipt. In this particular embodiment, following, or contemporaneous with, the transaction processing of what is, from the merchant's perspective (at least at the time the transaction is run) an undiscounted transaction, the incentive program manager or the IPM in concert with others, will then take steps to process the reward relating to the incentive offer redemption and transmit the reward to the program registrant 14Q. In one embodiment, the incentive program manager (or other enabled entity) also takes steps to ensure that the payment that is ultimately received by the merchant reflects an amount that takes account of any reward, discount, cash back, and or processing fees, by, among other ways, paying the merchant the discounted amount as part of transaction settlement, invoicing the merchant for the reward amounts, or through 14R. Data regarding the redemption rate of the incentive, or other information, in summary or particularized form can be made available to the merchants 14Z or a third party 14A for purposes of analyzing the efficacy of their incentive offer 14S. Alternatively, in another embodiment (not specifically depicted in FIG. 14), a transaction is processed in the same manner as is a standard credit card transaction, but the merchant (or other sponsor of the incentive) is billed later.

Figure 14B:
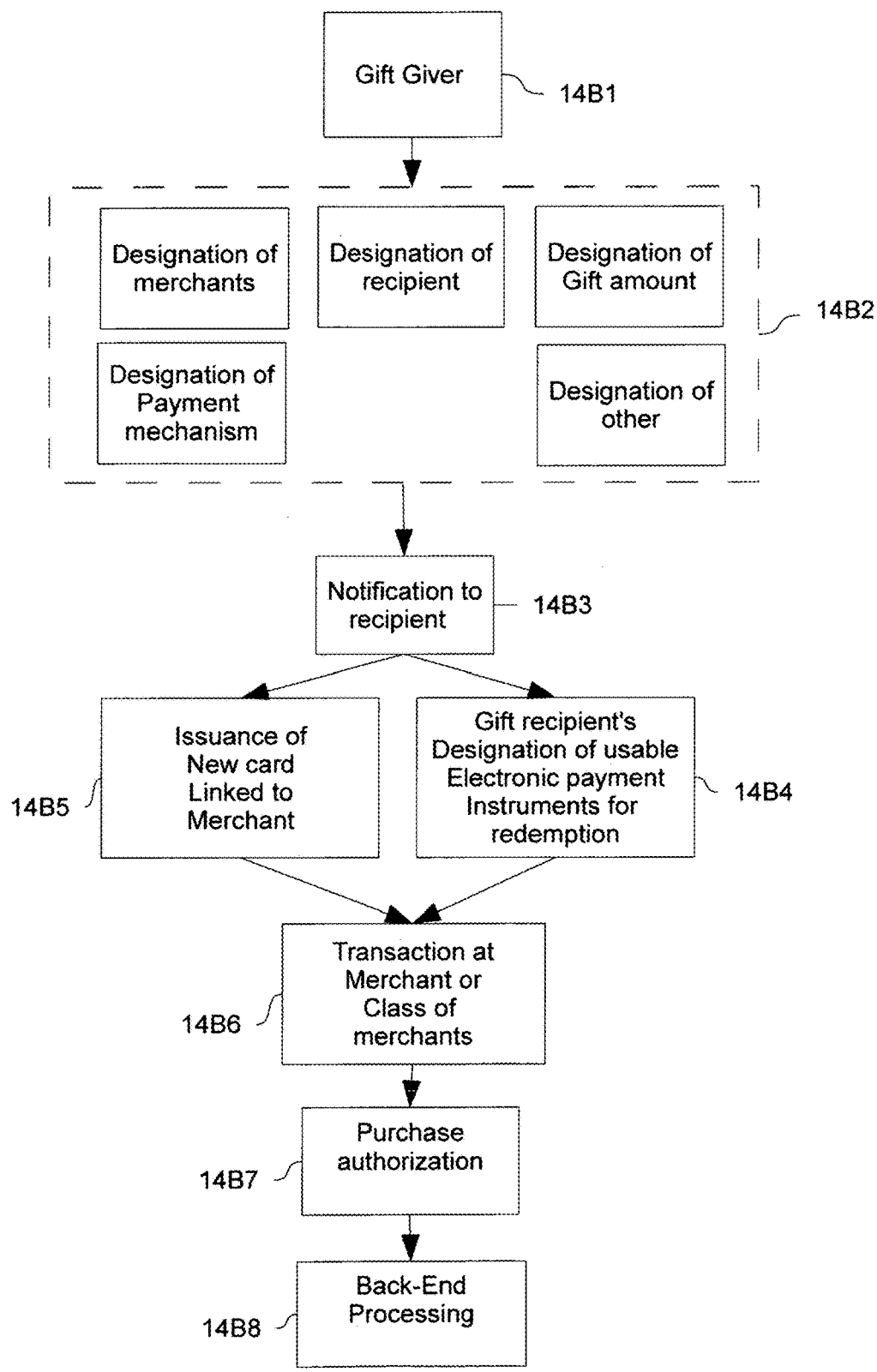
FIG. 14B is a diagram of the process for the creation of a universal gift card in one embodiment.

Turning now to FIG. 14B, we see one exemplar embodiment of the utilization of aspects of the system to create gift cards to virtually any merchant that accepts payment via an electronic payment device or method (credit or debit cards, "thumbprint" or biometric enabled transactions, smart devices, smart cards, etc.). As depicted in 14B1, a gift giver (or initiator of the creation of a new gift "card") elects to initiate the creation of a new gift card (or non-"gift" equivalent). Gift Giver, utilizing in this embodiment an on-line service, crafts the parameters of the gift, said parameters including (in this embodiment) the designation of one or more authorized merchants, the designation of the recipient, and the designation of the amount of the gift. Other designations or limitations may also be employed. For example, a gift card for use on a honeymoon in the Bahamas may designate that the card is only used at merchants physically located in the Bahamas, but otherwise may not be used in the continental United States.

Substantially contemporaneously with the gift designation, one or more payment mechanisms are designated for "funding" the gift (14B2). In one embodiment, the funding mechanism may be an electronic pre-payment via an existing credit or debit card owned by the gift giver. In another embodiment, where the gift recipient will use a pre-existing credit or debit card, the funding mechanism employed may "redirect" charges that would have been applied to a gift recipients own card (discussed infra), for example by re-directing that charge to a designated account owned by the gift giver, or a funded account maintained by an entity participating in the system and method, with the end result that the charge never appears on the gift recipient's card account or if it does it is reimbursed. Any number of such funding mechanisms or delayed funding mechanisms may be employed without departing from the scope of the invention.

Once the parameters of the gift are substantially determined, it is (in most embodiments) communicated to the recipient for their use (14B3). Though not explicitly depicted, in some embodiments, the recipient may designate that they would prefer the gift card in the form of a new pre-funded card, which may be mailed directly to the recipient for their eventual use (14B5). In such instances, the use of the card will be subject to the predetermined parameters designated by the gift giver. In another embodiment, the gift recipient may designate that they will use one or more existing payment mechanisms (14B4) such as their existing Chase Visa card. In such an instance the card is identified and/or designated and, enabled for use in accordance with the parameters of the gift 14B2.

Thereafter, the gift recipient may use the card at authorized merchants, such as at a designated non-chain specialty store (that may or may not otherwise issue or sell gift cards), so long as the use is authorized, 14B7, as having fallen within the acceptable parameters. In some embodiments, multiple transactions may be made so long as they remain in compliance with the gift parameters. Where a gift is made to Babies-R-Us in the amount of 100 dollars, the gift recipient may make (if enabled) multiple purchases over time in order to utilize the entire 100 dollars. In other embodiments, transactions in excess of the designated amount may also be made, so long as an appropriate means is deployed or enabled for funding the balance of the purchase. Thus, where a recipient received notification of the gift 14B3, and designates or otherwise enables the use of their own credit card as the redemption mechanism (via 14B4), any purchase at Babies-R-Us that exceeds the gift amount may be, though any settlement means, charged to that account such that the $100.00 virtual gift card is effectively depleted on a $125.00 purchase, and the remaining $25 dollars is charged to the gift recipient's credit card. Any manner of back end processing may be employed, 14B8, (including processing involving merchants, merchant acquirers, card associations, issuing banks, or other entities privy to the transaction etc.) to enable the split payment functionality without departing from the scope of the invention. Note that in some embodiments, a charge subject to such a "gift card" may be detected at any point in the card processing cycle (e.g., FIG. 9) by any entity (the merchant, merchant acquirer, card association and/or card issuers, or alternative entity) and re-directed to another account for authorization or payment. Any method of funding may be employed so long as the end result is that the instrument used by the gift recipient is compatible with whateer redemption mechanism is employed by a particular embodiment.

The advantages of the present system are significant. The system and method enables the creation of cards that can be used at retailers that do not themselves issue gift cards. Moreover, the virtual cards may be employed with any of an infinite variety of limitations or options, so long as data is available or accessible to enable them (e.g., virtual cards that work only in Washington D.C., or only at restaurants, or only during a particular time, or which are unlimited in redemption amount but are limited in some other fashion, or which only work at gas or grocery stores, but nowhere else).

Because the existing gift card industry delights in "unredeemed" or "partially redeemed" or "belatedly redeemed" gift cards (because they are immensely profitable since they have been funded in advance and may not be completely redeemed) many embodiments may be employed where such gifts never go to waste. For example, where a gift giver utilizes the system to redirect qualifying purchases made by the gift recipient to the gift giver's own credit card or bank account, they don't need (in some embodiments) to actually pre-fund the gift, and thus if it is never redeemed or only partially redeemed, the gift giver is never charged and never has to pay for the unredeemed amount. The result is that the intended "gifted" funds are either used or reserved and are never unintentionally converted into a windfall for the gift card industry or a particular gift card/gift certificate issuing merchant. Additionally, in some embodiments, there are no built-in surcharges or user fees or inactivity fees as are often employed by traditional cards. The money goes precisely where it is intended.

In an alternative embodiment, virtual gift cards may be sold directly by the designated merchant itself utilizing substantially the same architecture. Where a specialty merchant elects to sell such incentives, they may (in some embodiments) dictate the terms of funding and redemption. Thus a merchant may sell a discounted virtual gift card to a gift giver in the amount of 100 dollars, but as an incentive, may only charge that gift giver 90 dollars to purchase the virtual card. In such a case, the merchant may designate that the virtual card is pre-funded (and not dynamically funded as it is used) and that unused amounts are not refunded.

Figure 15:
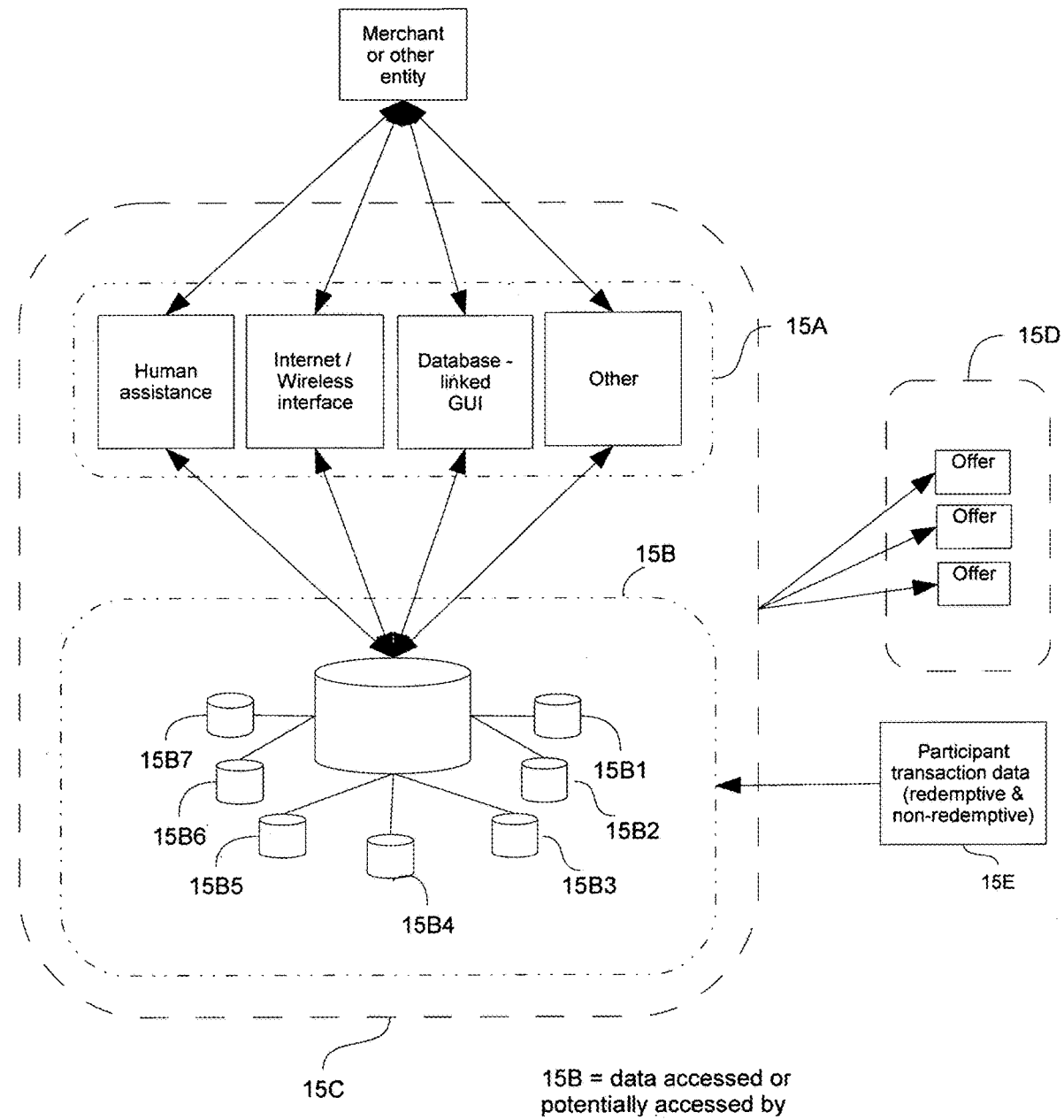
FIG. 15 is a diagram of the relationship between a merchant and its interface with one or more databases relating to an incentive program manager in one embodiment.

FIG. 15 illustrates the links between the various participants in one embodiment of the incentive system and method. The incentive program manager 15C in this embodiment maintains a database of information controlled by or accessible to the IPM that is potentially relevant to the creation and targeting of incentive offers 15D. The database may be created from any combination of program registrant historical transactional data 15B4, social networking data 15B1, self-reported program registrant preference data 15B5, geographic data 15B3, merchant data 15B6, as well as other available data 15B7. Such data sets may be supplemented and increased on an ongoing basis by the addition of data (from multiple sources) regarding the program registrants, as represented illustratively by 15E (which specifically lists transaction data, but which in other embodiments is not limited thereto), and in certain embodiments may include program registrant transaction data, including data about program registrants redeeming and not redeeming delivered incentive offers.

In the embodiment illustrated in FIG. 15, the incentive program manager 15C also maintains a variety of methods for merchants to communicate with the IPM 15A. This enables the IPM to receive information from merchants about the types of incentive offers they wish to send out and the characteristics of those customers, and also to provide consulting and other analytics services to merchants by utilizing the links between 15B and 15A. Taking into account the desired incentive offers received from merchants, and utilizing the data available through the data available in 15B, the IPM can communicate or deliver incentive offers to optimized program registrants represented by 15D in this particular embodiment.

Figure 16:
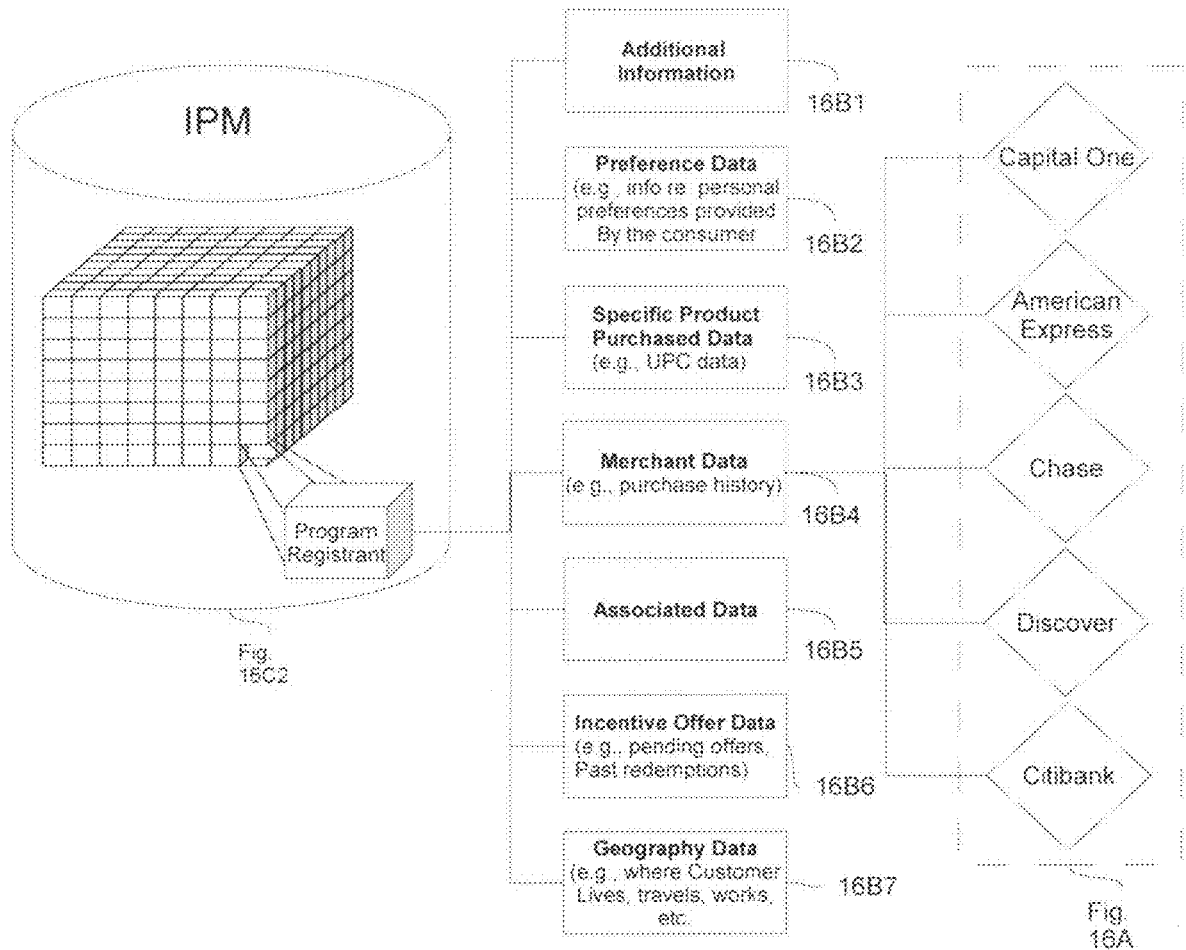
FIG. 16 is a diagram of exemplar data which can be stored in a database and associated with one or more program registrants in one embodiment.

FIG. 16 is a visual depiction of exemplar data which can be stored in a database and associated with one or more unique program registrants. Specifically, 16C2 is, in this embodiment, an IPM containing numerous program registrant records. One such record is called out in the bottom right-hand of 16C2. As depicted by FIGS. 16B1 through 16B7, a wide variety of information may be associated with a particular record.

By way of example, 16B7 indicates data associated with geography. An example of the type of geographic data that may be associated with any specific program registrant is depicted in FIG. 8. As has been previously explained, such geographic data may represent a specific program registrant's travel patterns throughout their home city, their country, or the world. Further, such geographic data may be utilized by algorithms employed in one or more embodiments to predict future travel patterns, including estimations of at what time and on what dates a program registrant will be within a certain geographic region. Even further, such geographic data may be utilized to trigger the delivery of incentives when a consumer enters or is likely to enter a competitor's store in order to divert them back to a specific merchant before they consummate a sale.

16B6 depicts another category of data that may be associated with a program registrant's record. 16B6 indicates data related to incentive offers that are associated with that program registrant, or in another embodiment may be associated with a class to which that program registrant belongs. For example, the data represented in 16B6 may include a list of any incentive offers currently pending for that program registrant or currently pending for an organization to which that program registrant belongs, such as for example where a merchant wishes to broadly deliver an incentive offer to any member of the AARP, wherein said program registrant is designated as a member of that organization and thus a recipient of the designated incentive offer. The data depicted in 16B6 may also contain data regarding that program registrant's past acceptance or rejection of other incentive offers. 16B6 may further contain any other data related to incentive offers.

16B5 represents personal and demographic data that's associated with a specific program registrant. Such data can include age, sex, income, home address, memberships in organizations, telephone number, e-mail address, etc.

FIG. 16B4 represents transactional and merchant data associated with a specific program registrant. Such data may take many forms including the transaction records for one or more electronic payment instruments, such as credit or debit cards held by that program registrant as indicated in 16A (note that other payment mechanisms may also be utilized without departing from the scope of the invention). In this example, the program registrant may have five distinct credit and/or debit cards as exhibited in FIG. 16A that are enrolled in the incentive program. Where enabled, all of the transactions associated with each of those cards may be, in some embodiments, transmitted to the IPM and associated with the program registrant's account. For example, data obtained when, for example, the program registrant utilizes their American Express card to purchase a train ticket to San Francisco may also be transmitted to the IPM and associated with that program registrant's account. Such data associated with 16B4 may indicate which of the five cards depicted in FIG. 16A are utilized with greater frequency, and how much proportionately is charged to each card. FIG. 16 may, in certain embodiments, further contain information about how much in total a program registrant spends each month utilizing each of the electronic payment instruments enrolled in the incentive program. The types of transactional and merchant data that can be captured and transmitted or otherwise associated with a specific program registrant is virtually unlimited.

In 16B3, specific product purchased data may also be associated with the program registrant represented by 16C2. For example, when a program registrant goes to a grocery store and purchases any item with a universal product code, or SKU, or any product with a product designation (such as a bar code), that information may be captured at the checkout counter, typically when a store "scans" those items to determine which product is being purchased. The merchant then charges the customer a specific amount for that product, as designated by the database of products and prices utilized by that particular grocery store. Once all of the items have been scanned and their associated prices tabulated, and any coupons for any specific product are taken into account, the customer is presented with a total and asked to pay for their purchase, either with cash, check, or an electronic payment device (whether via a smart phone, a credit or debit card, or other payment mechanism).

Because this process is mediated by a computer, all of this data may be collected and stored and/or transmitted to an IPM (or elsewhere) and thereafter associated with the specific program registrant making the purchase. In some embodiments, data regarding any particular sale may be associated with a specific program registrant by virtue of the unique electronic payment instrument utilized to make the purchase. Note, however, that data regarding any particular sale may be associated with a specific program registrant in any number of ways, including in instances where the program registrant pays with cash and not an electronic payment instrument. For example, this may be accomplished where a program registrant transmits the purchase-data themselves to an external database or, in another embodiment, by a customer or merchant otherwise associating a unique ID with a specific transaction to enable the data from that transaction to be later associated with data maintained on behalf of the program registrant by, potentially, an IPM. Note that as depicted in 16B4 the unique credit card numbers of each of the five credit/debit/check cards depicted in 16A may be associated with a specific program registrant, such that any incoming transaction that is sent to the IPM in 16C2 will be associated with a specific program registrant known to carry that individual electronic payment instrument. It is important to note that the payment mechanism utilized to purchase items is not important, so long as information on some or all of the items purchased are actually captured and transmitted so that they can be linked with the registrant or participant. The method of transmitting the data is similarly not important, so long as data regarding a participant's purchases are captured and transmitted in order to be evaluated for compliance with an outstanding incentive offer. Note, too, that the information that may be transmitted from the merchant may exceed in scope the information generated by a specific transaction, and may include information on that participant's past purchases, too, including the identity and number of products purchased by that consumer and when and at what price they were purchased (for example). In some instances, consumer permission to transmit said data may be provided verbally or may be signaled by use of a designated instrument the use of which itself signifies (contractually or otherwise) said permission. In other embodiments, said information may be transmitted to a storage device maintained by a consumer and thereafter the consumer may provide that data to a database for use with the generation of incentives.

Turning now to 16B2, preference data associated with any one program registrant may also be maintained by or accessible to an IPM. For example, where a program registrant indicates on a social networking website that they have certain likes or dislikes, or that they prefer certain types of merchants, but not others, that information may be associated with that program registrant. In another embodiment, the IPM in 16C2 may utilize a website or other online portal where a program registrant may create and/or login to a unique account and register any number of preferences that may be related to their purchasing decisions. For example, a specific program registrant may indicate that they like Italian food but dislike Chinese food, and further indicate that they enjoy German and Italian cars but dislike cars manufactured in the United States and Korea. Other examples of preference data may include brands program registrants like and dislike, a wish list indicating the kind of incentive offers that a program registrant is most interested in receiving and redeeming (I'm in the market for and receptive to discounts on new cars, but I am not in the market for or receptive to incentives for travel), as well as any other data related to that program registrant preferences. As previously stated, such data may be utilized to identify not only "appropriate" incentives but also to filter out incentives that are inappropriate or otherwise unwanted.

Finally, 16B1 represents additional information or data that may be associated with a specific program registrant or a specific class of program registrants. In this regard, it is important to recognize that the data exemplified by 16B1 through 16B7 are merely examples of a wide variety of data that may be associated with any one program registrant. As will be recognized by one of skill in the art, any data that can be electronically stored and accessed for the purpose of creating, delivering, and managing incentive offers may be utilized by the system.

It is worth noting here that the data associated among the various types of data, may contain either overlapping data, or in some case, contradictory data. The data can be parsed and analyzed over time to determine which types of data correlate most strongly to a user's preferences or with a high redemption rate for delivered incentive offers. For example, an indication of a "like" of Chinese food may be a better indicator than the fact that the transactional data does not show a single purchase at a Chinese restaurant in the prior year. As the amount of data in the system expands, and data regarding incentive offer redemption is collected, such questions can be answered utilizing well-known, data-driven analytical techniques.

Figure 17:
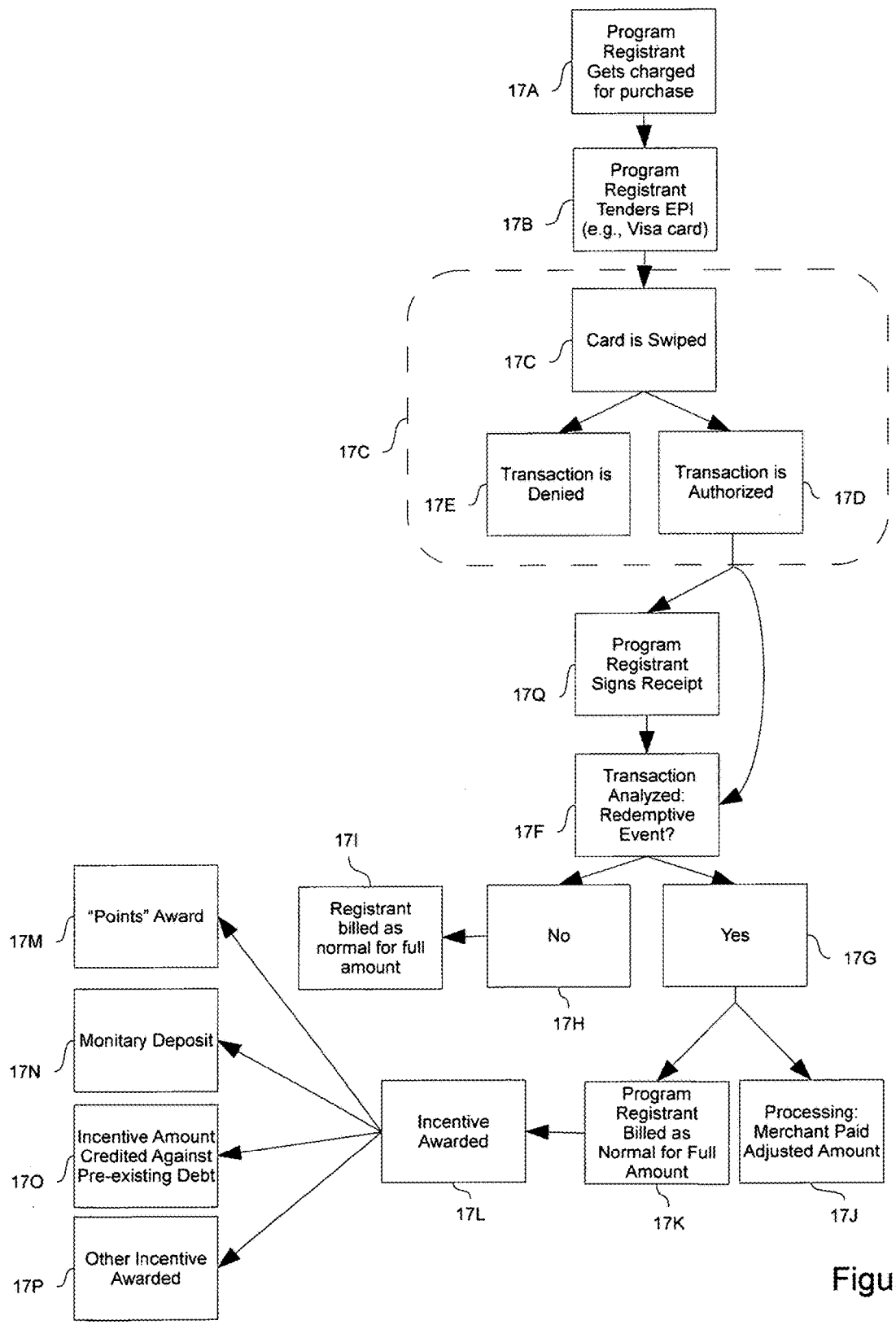
FIG. 17 is a flow chart diagramming how an embodiment of the system and method of this disclosure can operate from transaction through delivery of a reward in one embodiment.

FIG. 17 sets out an exemplary flow chart diagramming how an embodiment of the system and method of this disclosure can operate from transaction through delivery of a reward. At 17A a program registrant enrolled in the incentive program is charged for a purchase. At 17B the program registrant tenders an electronic payment instrument, such as a credit, debit, or check card (or alternative) to pay for the purchase. At 17C the electronic payment instrument is then "swiped," literally in the case of an EPI such as a credit, debit, or check card at a brick and mortar merchant, or virtually with respect to online merchants or with respect to certain other EPIs, including "swipeless" radio frequency "RF" technology or IR technology, to name a few. Following the "swipe" an authorization process is undertaken, such as (by way of example) the process set forth in FIG. 9 or sequence 13, 31, 32, and 34 of FIG. 6. If the transaction is not authorized, the procedure terminates at 17E. If the transaction is authorized at 17D, the program registrant is then presented with a receipt by the merchant, which in this embodiment requires the program registrant's signature 17Q. Note that in other embodiments, no signature may be necessary where the purchase amount is below a pre-set limit.

Either following or as part of the authorization process, the transaction is examined and compared to incentive offers that had been communicated or otherwise delivered to the program registrant 17F. If the transaction does not satisfy the terms of a communicated or delivered incentive offer, then the inquiry terminates and the program registrant is billed as normal for the transaction 17H, 17I. If the analysis of the transaction reveals that it complies with the terms of a delivered incentive offer 17G, the system then proceeds to further process the transaction and incentive offer redemption. In the embodiment described FIG. 17, at 17J the amount that is received by the merchant is adjusted down by the incentive offer amount plus any transaction or other fees by the IPM. In other embodiments, the amount is not adjusted down due to the redemption and a merchant is charged or billed separately from the settlement and funding (See, e.g., FIG. 9). The IPM can perform this function through notification of the EPI issuing bank (or other designated entity involved in the transaction), of the amount that should be deducted prior to forwarding of the payment to the merchant.

At 17K and 17L the processing related to the reward is performed by the IPM. In the embodiment reflected in FIG. 17, the program registrant's receipt from the merchant reflects a full undiscounted transaction amount, and does not show or otherwise reflect the redemption of an incentive offer. At 17L, the IPM processes and awards a reward consistent with the terms of the redeemed incentive offer to the program registrant. The reward can take the form of "points", a cash deposit into a designated bank account, a credit against a pre-existing debt (including a credit card or loan balance) or the EPI transaction itself, or any other form of incentive as set forth in 17M through 17P. 17K, 17J, and 17L are set forth in exemplary form as each, in this embodiment, occurs following the verification of a transaction as a redemptive event 17G, but as would be apparent to one of skill in the art, the processing related to 17K, 17J, and 17L can occur in any order, or substantially contemporaneously. The specific form of reward can be defined by the IPM as part of the system default, may be defined by the merchant as part of setting the terms of the incentive offer, or may be selected by the program registrant either as a default choice, or as may be specific to any reward. By way of example, the IPM may notify the program registrant that an incentive offer has been redeemed, and prompt the program registrant to select the specific form that the reward should take 17L. A program registrant making a personal purchase may desire and simply designate that the reward should be applied to the transaction itself (effectively reducing the price of the purchase) 17O or applied as a credit to a credit card statement. However, where a program registrant that desires to keep the reward from appearing on, for example, a credit card statement, they may select that the reward be delivered as a cash deposit into a designated checking or savings account 17N, and no record or trace of the incentive will appear on a credit card statement.

FIG. 18 is a depiction of certain processing methods that can be utilized in conjunction with an EPI transaction at a brick and mortar merchant and/or at a virtual merchant. 18A depicts a purchase, for example a purchase at a brick-and-mortar merchant by a program registrant utilizing a Visa card issued by Citibank, or in another example a customer utilizing an American Express card to purchase an airplane reservation from the online merchant Travelocity. Regardless of the manner in which a program registrant pays for the purchases, the aggregate transaction data associated with that purchase (or some subset of that transaction data), as depicted in FIG. 18B may be, and in this example is, sent electronically, and is stored in one or more databases and associated with that specific program registrant.

18C depicts one such way that the transaction data associated with any specific transaction can be processed and ultimately sent to one or more entities such as, in one embodiment, an IPM for use in creating and distributing incentive offers. Other methods may be utilized without departing from the scope of the invention. By way of example one such method of processing is through a Visa-like network. Specific workings of a Visa-like network are well-known to one of skill in the art, as are American Express-like networks, or Discover-like networks. A variety of such networks or methods of processing transaction data may be employed without departing from the scope of the system and method of this disclosure. In another example, a program registrant may use a Bank of America MasterCard to purchase items at a grocery store. In this example, the transaction data associated with that purchase at the grocery store, which may include the amount of the purchase, the specific items so purchased, the time of the purchase, the merchant identification and location, and/or other data associated with that purchase, may be transmitted by the grocery store via one or more systems. In one embodiment, the transaction data, or a subset thereof, is transmitted to that store's merchant acquirer. In other embodiments, transaction data additionally may be transmitted through any other method, including through the interne, and not through the merchant acquirer). In the embodiment where data is sent to the merchant acquirer, the acquirer thereafter transmits some of that data to the MasterCard network which utilizes that data to determine the issuing entity for the card (a bank, in this instance) that was used to make the purchase, whereupon some of that transaction data is sent to the issuing bank, in this instance Bank of America, so that the transaction may be either authorized or declined. Any entity along that chain may forward or transmit some or all of the transaction data to one or more entities, such as an IPM.

As depicted in 18D and 18E, additional processing by the IPM after receipt of certain transaction data may include post purchase program registrant incentive offer processing, such that a transaction is analyzed to determine whether or not it constitutes a redemptive event, whereupon a reward is processed and eventually transmitted to the program registrant. In addition, post purchase processing may be conducted such that a specific merchant, or other entity that created the incentive offer, may be charged for the redemption. As will be recognized by one of skill in the art, there exist or may exist multiple processing networks, only some of which are depicted by 18C, just as a wide variety of post purchase processing methods may be employed to provide a program registrant with a reward upon the performance of a redemptive event (e.g., qualifying purchase), or, and on the other hand, perform all other post-purchase processing required to, for example, charge the merchant for managing the incentive and/or processing, as well as compensate and or charge (as the case may be) any other merchants or entities participating in the program for or in conjunction with their involvement.

Figure 19:
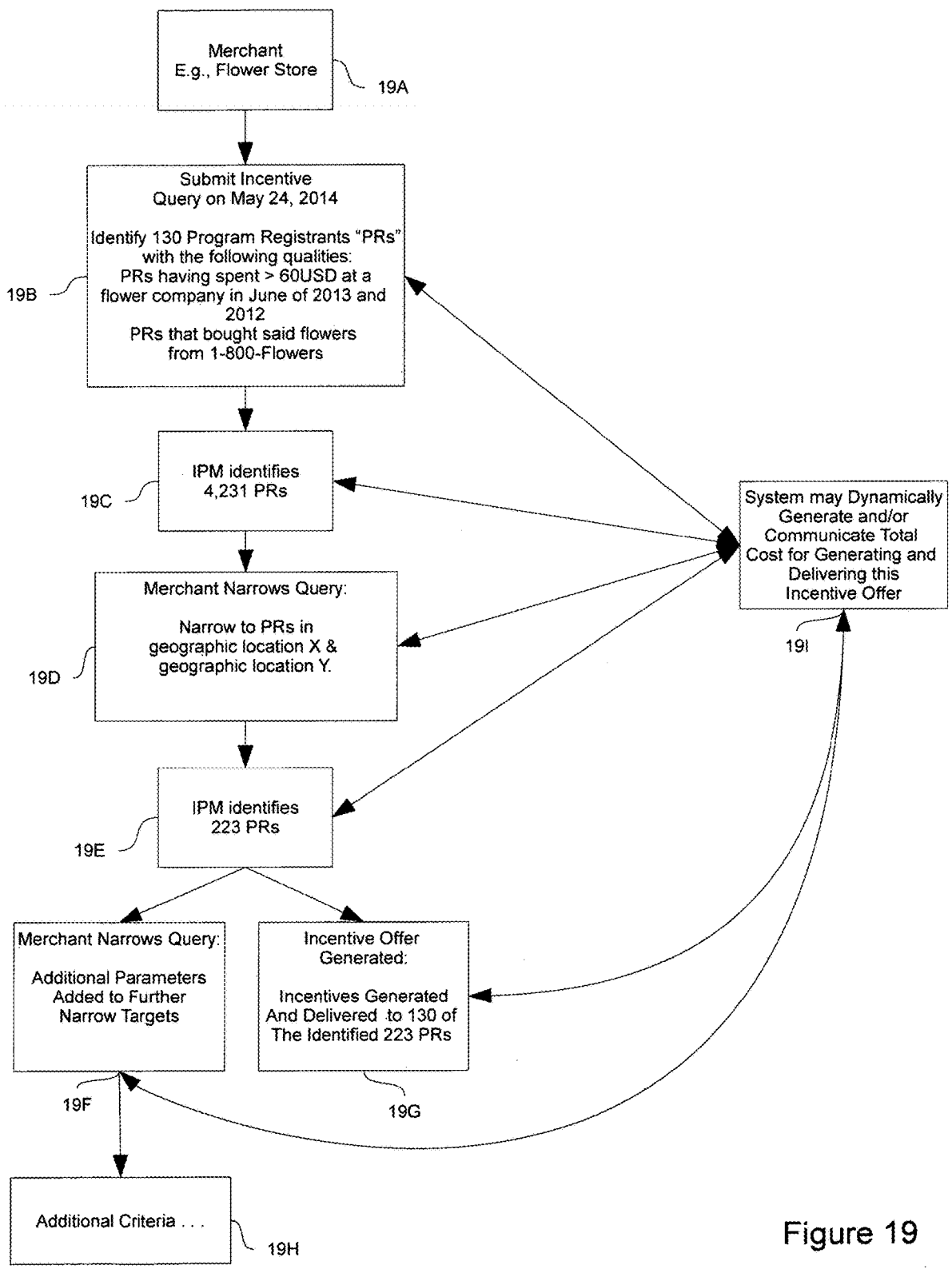
FIG. 19 charts an example of a merchant interacting with an incentive program manager to identify program registrants who are suitable targets for an incentive offer in one embodiment.

FIG. 19 charts an example of a merchant interacting with an incentive program manager to identify program registrants who are suitable targets for an incentive offer. In 19A a flower store determines that it wishes to make an incentive offer to certain individuals with certain characteristics. The flower store gets in contact with the incentive program manager utilizing one or more of the means identified in 15A or utilizing other technology. The flower store notifies or utilizes the incentive program manager to designate certain characteristics of the program registrants the flower store wishes to target for an incentive offer 19B. In this example they include certain spending behaviors at other competitive merchants. The IPM can provide dynamically-updated information about the number of program registrants that satisfy the identified criteria, and may also provide dynamic information about the cost of sending the requested incentive offer 19C, 19I. This information can be updated as the merchant adds or subtracts criteria, including additional criteria such as geographic limitations 19D or others 19H. At each step of the process, the IPM can provide updated feedback to the merchant on the cost of generating and delivering an incentive offer to the program registrants identified by the IPM that satisfy the merchant's criteria 19I.

At each step in the process, the IPM may make use of other filters to help select out program registrants for receipt of the incentive offer. For example, program registrants that have indicated they do not wish to receive incentive offers from flower stores need not be identified as program registrants that match the merchant's query, even if they otherwise satisfy the criteria identified by the merchant. Similarly, if the terms of the merchant's intended incentive offer falls below a threshold or other filter set up by a program registrant, such program registrant need not be included in the results, as opposed to having the offer "filtered out" as per FIG. 14F. It is worth emphasizing that this type of information and feedback may be provided to the merchant dynamically without any personally-identifiable information about any program registrant being shared with the merchant. In addition, in some embodiments the incentive offers may be redeemed by the program registrants who received the incentive offers in a way that is completely blind to the merchant, allowing program registrants to protect their privacy.

In some embodiments, merchants or entities that construct incentives may be charged a fee for permitting them to utilize certain data in constructing or delivering a given incentive. For example, data capable of identifying consumers that spend, on average, far more than the average consumer will be a particular interest to entities constructing incentives, simply because obtaining their business is more valuable. In such instances, the IPM or alternative entity may charge varying amounts for different classes of data. Utilizing data relevant to customer's home location may not cost anything to use. Data identifying customers with a demonstrated or announced preference for Italian food may incur a modest charge for utilizing that data "filter" to determine the recipients of incentives. Additionally, data relevant to delivering incentives directly to customers of a specific Italian restaurant may incur a higher charge, and data relevant to delivering targeted incentives to that targeted Italian restaurant's customers that spend demonstrably more (e.g., the 20 "biggest spenders" at that targeted Italian restaurant) may incur the highest costs of all. In some embodiments, a user interface may not only automatically calculate the total cost of constructing and deploying the incentive, but it may also be used to suggest the most cost efficient manner to deliver incentives to the most people for the most cost-effective amount.

Figure 20:
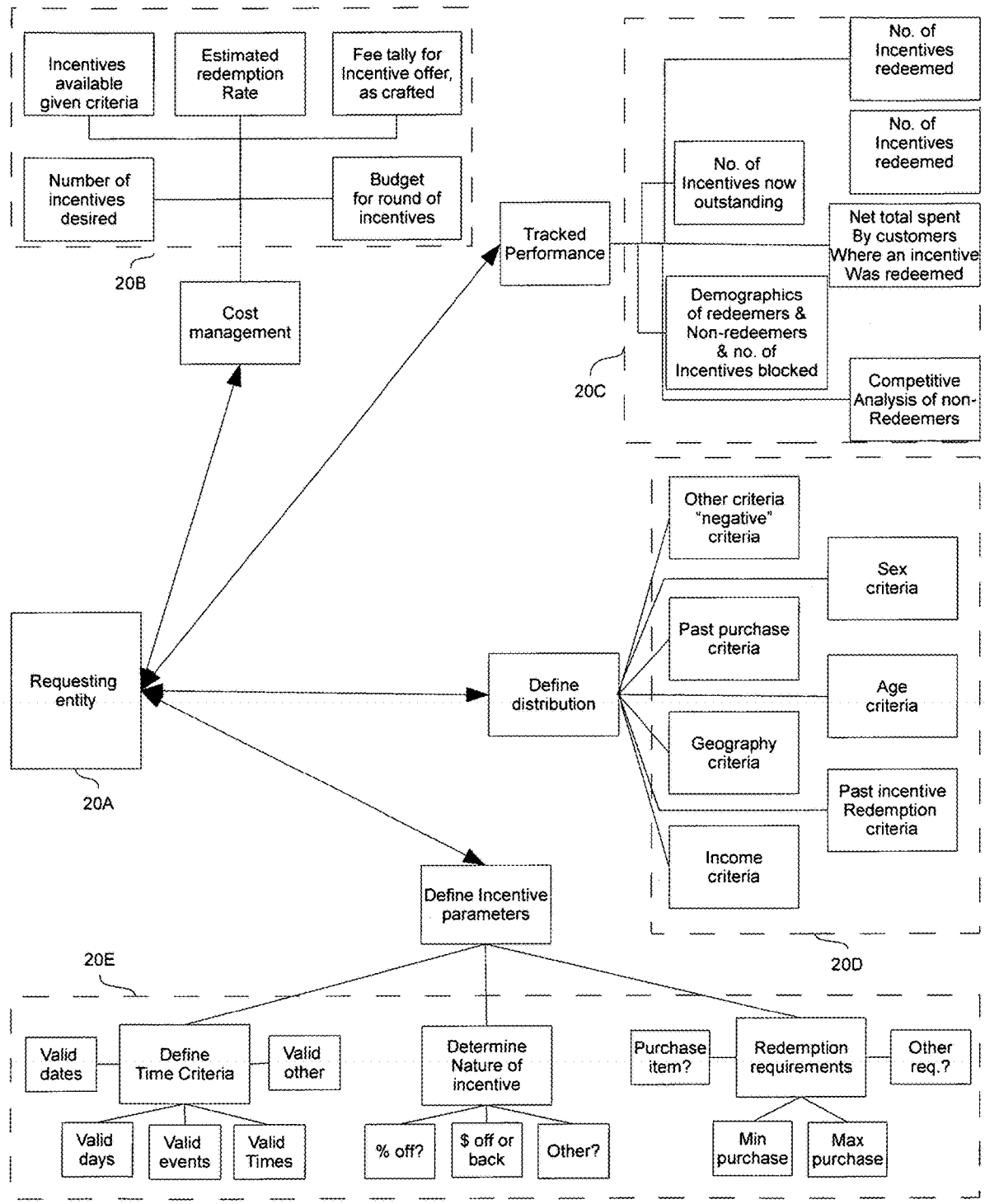
FIG. 20 is a diagram of how a requesting entity (e.g. merchant) may interact with the IPM to define the parameters of an incentive offer, distribute those offers to program registrants, manage the costs associated with creating and delivering those incentive offers, and track the performance of those incentive offers over time in one embodiment.

FIG. 20 is a schematic depiction of how a requesting entity (e.g. merchant), such as 20A, may interact with the IPM to define the parameters of an incentive offer or class of offers such as depicted in 20E, distribute those offers to intended program registrants 20D, manage the costs associated with creating and delivering those incentive offers 20B, and track the performance of those incentive offers over time 20C. Note that in some embodiments, an entity deploying an incentive offer may be charged, not for utilizing specific data to target desired customers, but rather may be charged if and only if customers redeem the incentive. In such embodiments, the fee charged to the entity deploying the incentive may depend on the number of individuals redeeming the incentive, the specific individuals that do the redeeming, or the amounts that are redeemed. Thus, the IPM (in one embodiment) may be paid $5.00 if "Customer G" redeems an incentive and $7.00 where "Customer J" redeems the incentive (the high cost reflecting the fact that Customer J is a "big spender" or frequently patronizes the competition). In an alternative embodiment, the IPM charges the incentivizing entity based on the gross sales attributable to redemptions, which is an advantage where, for example, a merchant wants to utilize the system but where they do not want to risk investing in an incentive campaign the effectiveness of which is in doubt. Any pricing criteria which take into account the data utilized in distributing incentives and/or data regarding incentivized transactions actually consummated may be utilizing without departing from the scope of the invention.

In another embodiment, a merchant may wish to have redeemed only a limited number of incentives, and yet the merchant is unaware of how many offers should be circulated in order to ensure that the target number of incentives is redeemed. In such a case, utilizing the data in, or accessed by, the IPM, the merchant may access or be provided automatic update on the status of the inventive, including the number of incentives still available and, in some embodiments, the terms of the offer may indicate that only a certain number of incentives are available (or still available) and that once the last is redeemed, no more will be honored. In such a case, the current "open" or "closed" status of the offer may be determined utilizing data in or accessible to the IPM, and the recipients of the incentives themselves may be dynamically notified of the number of incentives left unredeemed or when the last one is gone.

Turning to FIG. 20, and by way of example, a large retailer such as Target Corp., represented in this example as 20A, wishes to utilize the incentive system and method to send targeted incentive offers to certain classes of program registrants. By way of example, Target has a budget of $20,000 for the specific incentive program. In one embodiment, Target may log on to a website managed by the IPM that merchants such as Target may utilize to construct ad campaigns in a manner similar to the way Google utilizes their AdWords program. Target may indicate that they wish to reach 40,000 program registrants with their incentive campaign. Utilizing, in one embodiment, a website, Target defines certain incentive offer parameters for the campaign. As depicted in 20E, Target may utilize time criteria to dictate the dates that the incentive offer may be redeemed. As indicated by the exemplar categories, many other such criteria may be employed for other incentive offers, such as requiring that an incentive may only be redeemed on certain days of the week, or on days when a certain event occurs. In other instances. Target may determine that the redemption of an incentive may only be done within specific times of the day such as after 6 p.m. In this instance Target may indicate that their offer is good any day in the month of July 2013. Target may also use the website to indicate that the incentive will take the form of a percentage off of any qualifying purchase. Alternatively Target may have offered a specific dollar amount off a total purchase price across multiple items. In addition Target may require other redemption prerequisites as well, such as requiring a program registrant to purchase a specific item, or to make a purchase of a minimum amount, or make a purchase that does not exceed a maximum amount. In the context of a incentive campaign having multiple recipients, 20E may also be utilized to automatically adjust an incentive amount depending on a variety of factors, such that some segment of the set of recipients will receive a 30% off incentive and others will receive an increased or decreased incentive, based (for example) on their history of past redemptions. As will be recognized by one of skill in the art there are a substantial variety of incentive offer parameters that may be employed, with those indicated in 20E representing a small and exemplary sample.

Having defined the incentive parameters for its marketing campaign, Target may then utilize the website (or any other medium) to define distribution of that incentive offer. For example, Target may utilize the website to indicate that the 40,000 individuals it seeks to reach must be within a certain geographic area such as a specific state, a specific city, specific zip codes across the country, or any other geographic designation. Alternatively or in addition, Target may choose to send those incentives to individuals having a specific level of income or estimated level of income. Additionally, Target may choose to preferentially deliver incentive offers to individuals exhibiting past purchase behavior, such as (for example) only to those program registrants that have purchased over $100 worth of products from Kmart and/or Walmart within the past month, but have not made any such purchase at Target. In such a manner Target may reach exactly the target audience it wishes to reach without offering incentives to those individuals that are already loyal customers of Target and need no further incentive to encourage their continued patronage. Additionally Target may wish to further narrow the set of individuals to whom it wishes to send Targeted incentives. Target may wish to expand its market share among the men of a certain age group by targeting men or those in a certain age bracket for incentive offers, subject, of course, to the IPM having access to data regarding a program registrant's gender and age (or approximate age). In another embodiment, Target may wish to target program registrants based not on criteria they possess, but rather based on criteria they do not possess (i.e., negative criteria), such as identifying program registrants that are not presently customers of Target. As will be recognized by one of skill in the art the recipient distribution criteria examples that are provided in 20D are an exemplary representation of the array of criteria that may be utilized in the system.

It is worth noting that every time a new criteria is entered for the class of potential program registrants that Target wants to reach, the number of potential program registrants in that class will likely decrease. For example, if there are 27 million participants in the incentive program, only a small percentage of those individuals will reside in any one state. Thus if Target wishes to target program registrants in North Dakota, the number of potential recipients of the incentive offer will drop rapidly from 27 million to something less than 647,000 (i.e., roughly the current population of N. Dakota). Similarly if Target then designates an additional limitation stating that it only wishes to send incentive offers to men over 40 (or some other demographic that Target wishes to incentivize) then the total number of potential recipients will drop further. The same is true for any requirements that are designated as they relate to income, age, purchase history, etc., i.e., the addition of those criteria (indeed most criteria) operate to narrow the field. In one embodiment, while crafting Target's planned incentive offer, the system dynamically updates and makes known to the user the total number of program registrants in the system that currently satisfy given criteria, as depicted in the upper left-hand corner of 20B.

The IPM (or other entity) may charge Target based on the kinds of criteria that Target wishes to employ in distributing its incentives, and the aggregate cost of sending the incentive offers, given the data Target wants to utilize, may also be displayed as depicted in the upper right-hand corner of 20B. Based on past redemption data accessible by the IPM, the likelihood of any particular customer responding to an incentive offer may be calculated within a margin of error, and thus the likelihood of the total redemption across the entire class of targeted recipients may also be calculated within a margin of error and displayed. Note that it is possible to provide these estimates to Target in advance of sending out any incentive offers of the estimated redemption rate for the class so selected, and that data may determine whether or not the gross or net revenues attributable to the deployment of an incentive campaign are indeed worth the cost of the campaign itself. In other embodiments, this data may be utilized to charge merchants. As will be recognized by one of skill in the art a wide variety of such data may be displayed to any entity wishing to utilize the system to craft and distribute a set of incentive offers.

Once an incentive offer has been defined by utilizing, for example, criteria depicted in 20E, and once the recipients of that incentive offer have been designated through the criteria exemplified in 20D, and after the incentives have actually been delivered to the desired number of program registrants, for example as depicted in FIG. 13B, the redemption rate for that specific incentive, as well as any associated data that may be tracked, can be reported as indicated in 20C. For example, once a set of incentive offers has been launched, in this case the 40,000 incentive offers, Target may visit the website (or otherwise contact the IPM, see e.g. 15A) to track, among other things: the number of incentives redeemed to that date, the aggregate amount spent at Target by those program registrants that redeemed the incentive offer during the visit, the number of incentive offers still outstanding, certain demographic data about those program registrants that responded favorably to the offer, and in some embodiments certain demographic data about those program registrants that responded not just favorably but in an optimal way. In this manner Target may utilize the aggregate data maintained by the IPM to find out, for instance, whether or not it is able to entice customers away from Walmart, and if so are there any concrete patterns to the program registrants that they were able to so entice. As will be recognized by one of skill in the art, the kind of information that may be gleaned from the system is extraordinarily powerful, and extraordinarily valuable, especially since it will provide concrete, objective data relative to the success and/or failure of any one marketing effort, including marketing efforts that do not utilize the present system and method. It is worth emphasizing that no personally-identifiable information about any program registrant need be delivered to the merchant, and indeed, since the incentive offers may be redeemed simply by tendering the relevant electronic payment instrument, demographic and other redemption information may be provided to the merchant without compromising program registrant privacy.

Figure 21:
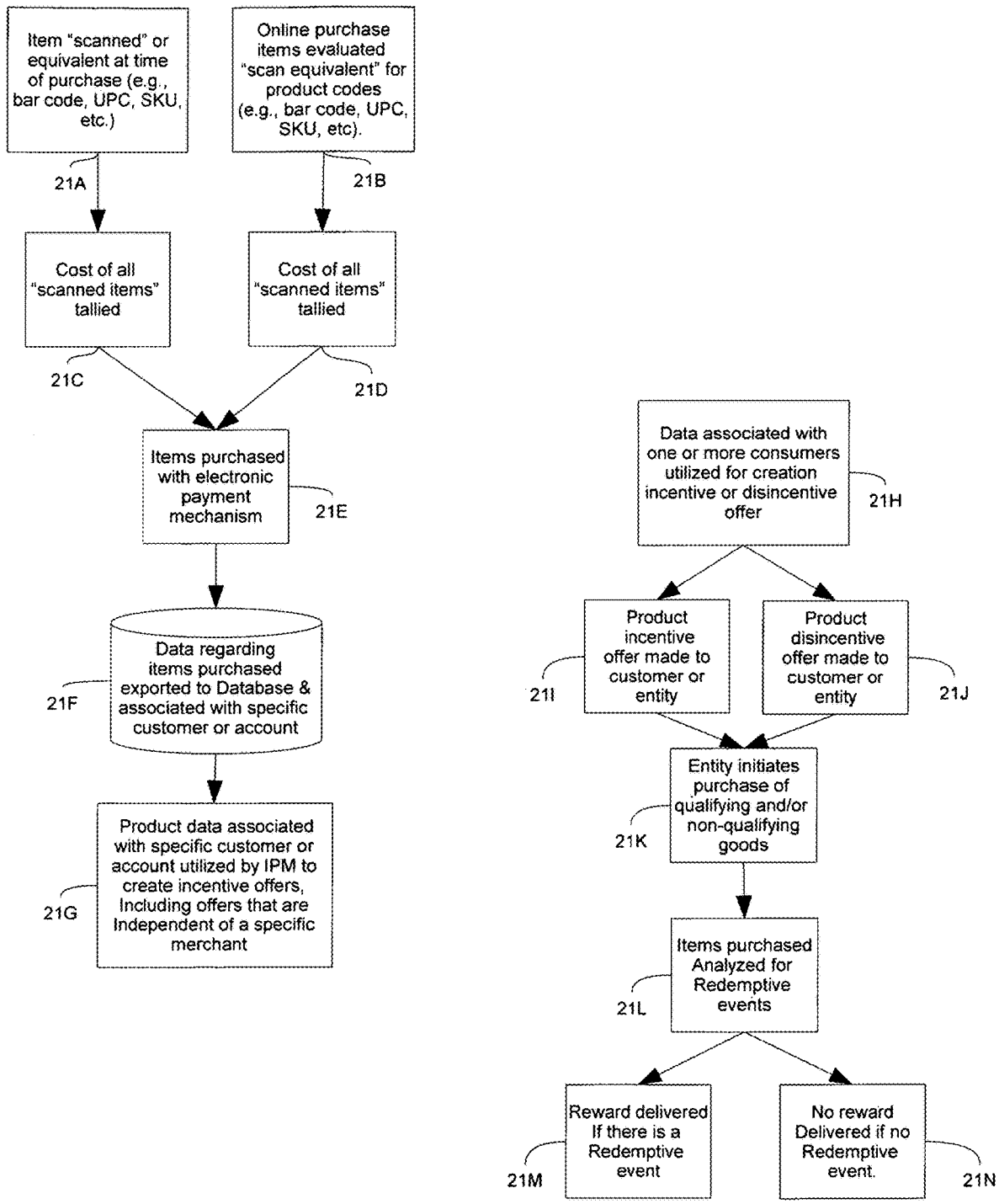
FIG. 21 is a diagram illustrating an embodiment where a program registrant may be incentivized to patronize not just a single merchant but to purchase specific items at one or a variety of merchants.

FIG. 21 is a diagram illustrating one embodiment whereby a program registrant may be incentivized to patronize not just a single merchant but to purchase specific items at one or a variety of merchants. In one embodiment, a program registrant goes to a grocery store and selects a number of items, each of which are marked with a barcode. In other embodiments, the products may be marked or otherwise designated with an alphanumeric code such as an SKU or Universal Product Code or data encoded into a pattern. The method of marketing an item within the store is not in and of itself important, and a variety of methods may be utilized without departing from the scope of the invention. Once a customer has chosen all of the items within a given merchant, such as a grocery store, they are taken to a checkout counter and scanned at the time of purchase, as indicated in 21A. As will be recognized one of skill in the art, it is not necessary to "scan" every item so long as each item is designated with a code that identifies it such as the UPC code, in one embodiment. Alternatively items that are purchased online, from online retailers such as Amazon-.com, may also be identified utilizing an alphanumeric code or equivalent (such as a barcode) which designates those products purchased through the website. Once all the items have been tallied either at the brick-and-mortar store, or tallied from an online "shopping cart" the prices associated with each of those items is tallied, tax and/or other fees are applied if applicable, and the item is purchased by the program registrant using an electronic payment instrument as indicated by 21E. Note that payment may be made in cash in certain other embodiments, so long as the purchase data is adequately captured and stored in a manner that associates that purchase with the consumer.

After the transaction has concluded or substantially contemporaneously with said transaction, data regarding the specific items purchased is transmitted or exported to a database 21F in order for those purchased items to be associated with the specific program registrant 21G. The method of transmission may take many forms, including via the Internet, through RF technology, or through technologies known to those of skill in the art or after developed. By aggregating the program registrant's purchases across a variety of stores, both brick-and-mortar and virtual, the cumulative purchasing history of the program registrant (or some subset thereof) may be stored and utilized for creating and delivering incentive offers including offers that are made, not only by retail merchants such as grocery stores, but also by the manufacturers of specific items purchased.

By way of example and not limitation, a program registrant who purchases Kraft macaroni and cheese, Campbell's tomato soup, and Ritz crackers, may, by utilizing the system, have each of those items scanned at the checkout counter, and have the fact of those purchases transmitted to a database, including, in one embodiment, a database maintained by the IPM. Thereafter, a requesting entity such as requesting entity 20A, may construct an incentive offer that is based in part on data drawn from those specific purchases, as depicted in 20D. By way of example and not of limitation, the requesting entity 20A may be a soup manufacturer that wishes to send incentive offers to program registrants that are known to have a history of purchasing Campbell's Soup, and specifically Campbell's tomato soup. Because thousands of individuals across the country regularly, purchase Campbell's tomato soup, and some of those individuals purchasing said soup are program registrants enrolled in an incentive program, it is possible to directly incentivize those customers to try a different soup. In this way the data associated with one or more program registrants is utilized for the creation of both incentive offers and disincentive offers as indicated by 21H. By way of example, a disincentive offer may be made by Campbell Soup to program registrants that are regular purchasers of Progresso, in order to reward them not only for purchasing Campbell's tomato soup but also for ceasing to purchase Progresso's soups, as indicated by 21I and 201J.

In addition to the above, because aggregate purchases may be tracked over time, incentive offers delivered to program registrants need not be for a single discrete purchase. By way of example, Campbell's may send offers to program registrants that frequently purchase Progresso soups, such that the first 10 cans of Campbell's soup that they purchase will be discounted at 5% per can, and for each can over 10 the discount will be 15% per can. Additional limitations on an incentive offer are also easy to implement, for example said incentive may be redeemed only at one brand of grocery store but not another brand of grocery store. In still another embodiment, the incentive may be agnostic with respect to the store where the purchases are made, and instead the only limitation is on patronizing a store that has the ability to transmit the purchase data to a database that records it, as indicated by 21E and 21F. Once the program registrant initiates the purchase of goods, as indicated by 21K, those items purchased are analyzed to determine whether or not any of the purchases qualify as a redemptive event as indicated by 21L. Where a redemptive event has been identified the designated reward is delivered 21M, and correspondingly where a purchase does not involve any redemptive events no reward will be delivered 21N, however the aggregate data from the purchase may be recorded by the database and later served as the data backdrop for additional incentive offers.

Importantly, by utilizing the system to gather not just transaction data, but transaction data that captures the specific items actually purchased, one can use the aggregate data so gathered to easily draw important correlation data that is highly valuable for marketing purposes. For example, where a million people enable data to be gathered regarding the specific items they purchase, that data can be analyzed to determine a) what percentage of people that purchase Tombstone Pizza (Canadian Bacon) also like to purchase Total Raisin Bran; b) of those individuals that purchase Little Debbie Snack Cakes, what percentage of them also buy vitamins and what brands are preferred?; for those individuals that buy 10 cans of Product X in a six month period of time, are there any products that they buy with much greater frequency than the population at large, and does that depend on what area of the country they live in? This kind of information is invaluable, since you easily utilize it to identify those people that are "super consumers" of your "Product R" (for example) and determine what other foods those people also tend to like ("Food Z"), and then you target consumers of "Food Z" that have no record of having ever purchased your "Product R" and then target those potential new customers for an impressive incentive (such as a free item or a heavily discounted item). In this way, a manufacturer of Product R need not guess at what market segment is likely to be pre-disposed to becoming a future consumer or super consumer of their products, they have the actual data that can provide that insight. Moreover, using the system and method, the manufacturer of Product R can target those individuals to receive incentives and yet the individuals consumers identities are never (or at least need not) be revealed. Of course, said data can be utilized to correlate food with non-food items or services. Said data can be analyzed by geographic location, too, and utilized in incentive campaigns (such as billboards) that do not rely on the present system and method. The intelligence data made available is hyper-accurate and nearly unlimited in scope.

It is worth noting that the system may be utilized by virtually any entity that wishes to provide an incentive for a program registrant to engage in or refrain from a consumptive act. Thus, the system is valuable not only for brick-and-mortar and virtual merchants, but also purveyors of both goods and services, original equipment manufacturers or OEMs, after-marker manufacturers, producers of specific food items, companies that manufacture components that are utilized in other products but are not normally sold separately, or an organization such as the AARP, the NRA, trade unions, the Girl Scouts, political organizations, clubs, or even individuals. In such a way, entities may provide incentives not to buy their own products, but to buy products that incorporate their products (e.g., Intel may incentivize the purchase of computers having Intel processors).

Figure 22:
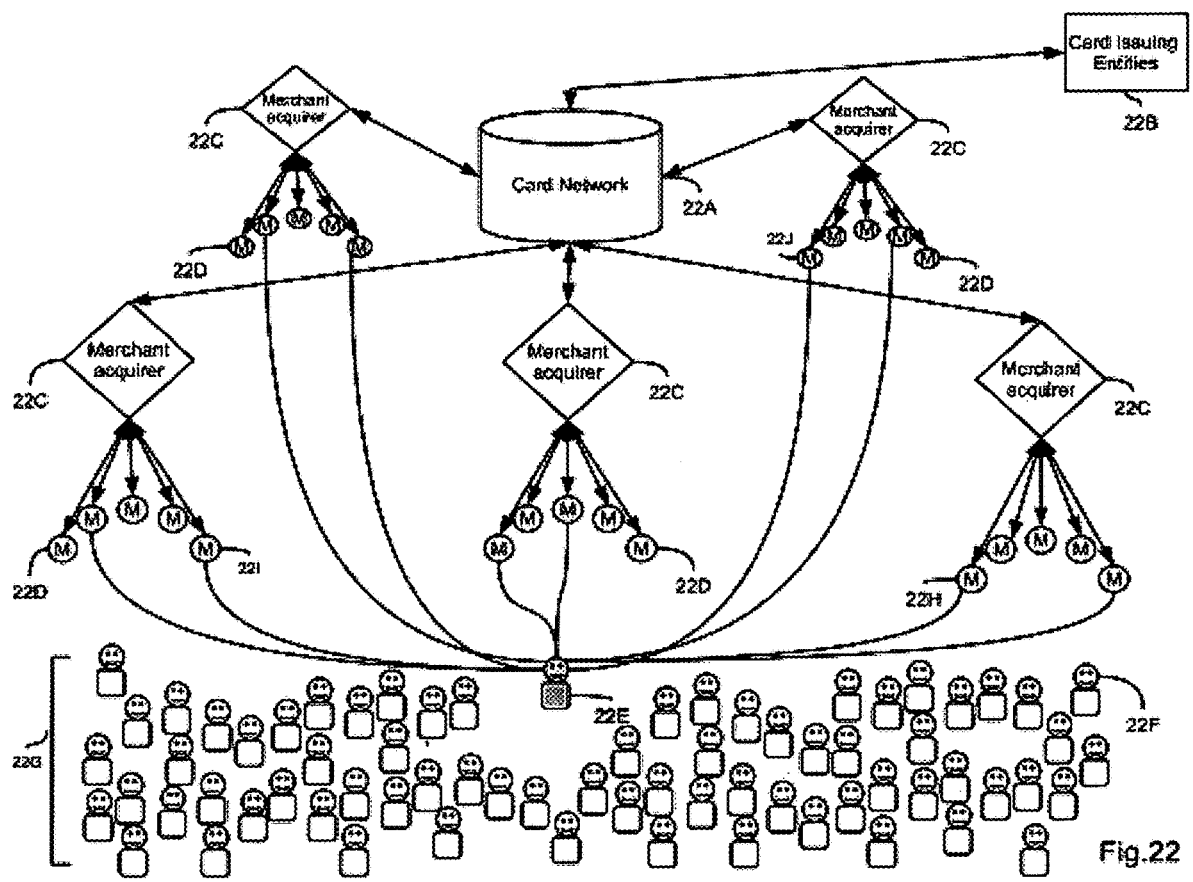
FIG. 22 is a diagram of the relationships between program registrants, merchants, a merchant acquirer associated with said merchant, a card network, and an EPI-issuing institution in one embodiment.

FIG. 22 is a high-level visual depiction of the relationships between program registrants, on the one hand, merchants, a merchant acquirer associated with said merchant, a card network, and an EPI-issuing institution. More specifically, a program registrant 22E is one of many program registrants depicted by 22G, some of which are enrolled in the incentive program and some of which are not. Each individual represented in 22G may patronize any number of merchants, only some of which are depicted by FIGS. 22D. In one embodiment, program registrant 22E receives an incentive offer from 22H (the receipt of said incentive offer not depicted here) and elects to redeem that offer by patronizing said merchant 22H. Utilizing his or her enrolled EPI, 22E makes the purchase, and data regarding that purchase is transmitted to merchant 22H's merchant acquirer 22C, as indicated by the arrow connecting the two entities, whereupon said merchant acquirer forwards some or all of the associated data to the card network 22A and ultimately to the card issuing entity depicted by 22B.

Not illustrated by FIG. 22, but as explained, passim, any entity involved in this transaction may, in some embodiments and without departing from the scope of the invention, transmit transactional data to one or more databases controlled by or accessible to the IPM to store aggregate data regarding transactions. Said databases may, of course, be maintained by the participating program registrant themselves, the merchant, a merchant acquirer, a network, a card-issuing entity, an IPM (which itself may be made of one or more of the aforementioned entities or by a different entity). Note also that FIG. 22 is a high level visual depiction of a Visa/MasterCard-type network, as opposed to an American Express or Discover-like network (both of which may also be utilized without departing from the scope of the invention).

In FIG. 22, program registrant 22E also patronizes other merchants, some of which are depicted by 22D. Some or all of these merchants may also gather and transmit transactional purchase data in the manner just explained, even where no incentive offer is involved or potentially involved in a transaction. The collection of said data is also useful, as it provides a data backdrop that can be utilized by the IPM to design, create, and/or deliver targeted incentive offers. For example, where program registrant 22E purchases items from a non-participating retailer (for example, Bloomingdales, as depicted in 22I), 22E's purchases at 22I are transmitted and stored in a manner that they can later be associated with program registrant 22E. When competing retailer Macy's, depicted by 22J, utilizes the system to deliver a targeted incentive offer to 22E (and/or other program registrants that patronize 22I), data regarding 22E's past purchases at 22I are utilized to identify 22E as a potentially preferential recipient of the incentive offer.

Of important note, a serious advantage of the system is that it encourages 22E to use an EPI (e.g. a card associated with that program registrant by the IPM) that is enrolled to track purchases, regardless of whether or not the purchase is related to a delivered incentive offer. The reason is that, by using an enrolled EPI for many purchases, program registrant 22E is communicating (and in some embodiments, communicating anonymously) to merchants that they patronize their competition. Thus, it is to the program registrant's advantage to communicate to Macy's the fact that they shop at Bloomingdales, because that fact incentivizes Macy's to try to capture the business it is otherwise losing to its competition. One way to capture that business, of course, is for Macy's to target an incentive offer to program registrants that shop at Bloomingdales. Of course, where Bloomingdales loses the business of program registrants to Macy's (due to incentive offers) Bloomingdale's may attempt to entice the program registrants back by making more attractive offers than those issued by Macy's.

Note also that in some embodiments, there are stealth aspects to the system and method because the identity of the program registrant receiving and redeeming the incentive offer need not be known to the merchant issuing the incentive. In addition, while traditional incentives which are broadcast via television, radio, advertisements on billboards, newspapers, magazines etc., are public, incentive offers delivered by an IPM need not be public. That is to say, when Macy's 22H chooses to send out 1,000 incentive offers to Bloomingdale's best customers, Bloomingdales 22I need not know about it and thus may not know why their sales are down or where those sales are being diverted. Nor does the program registrant, in some embodiments, know or need to know why they have been targeted to receive an incentive from Macy's 22H. Thus, while Bloomingdales 22I may be immediately aware of an incentive offer transmitted to customers by Macy's via television or other public media and while Bloomingdales may then promptly respond with an incentive offer of their own, by utilizing some aspects of the embodiments disclosed herein, Bloomingdales 22I will be unaware of Macy's 22H marketing and potentially unable to respond in the near term. Also of value is the fact that where a volume of incentives are sent out to Bloomingdale's customers, each of those customers may receive a Macy's incentive that differs in amount (or percentage off, for example) from those received by others. The fact that there is a disparity in the amounts so offered is also not public, and so a customer that receives a 25% off incentive may be happy even though the person in line ahead of them received an incentive for 35% off (perhaps because of their past purchasing history). Such an incentive campaign is difficult if not impossible to implement in other incentive-communicative media, such as television.

As explained elsewhere and as another example, as Macy's 22H issues its incentive offers to a class of participating program registrants matching its criteria for receiving said incentive offers, the individual incentive offers themselves need not be fungible. That is, Macy's may utilize data maintained by the IPM to tailor an incentive to specific program registrants by requesting the IPM to send, for example, a 25% off incentive offer to program registrants spending greater than $500 dollars at clothing merchants in the past month, but sending a 30% incentive offer to those program registrants that spent greater than $700 dollars at clothing merchants in the past month (for example). As will be evident to one of skill in the art, the ability to tailor an incentive offer based upon data associated with any one program registrant is virtually limitless and of substantial value to merchants. In some embodiments, a batch of incentives may be sent to 100 or more program registrants (for example) each of whom receives a slightly different incentive offer based upon data associated by the IPM with each of the program registrants.

Note also that in some embodiments, a program registrant may be rewarded or compensated by the IPM for "recruiting" another potential program registrant to participate in the incentive system, and in one embodiment said "recruiting" program registrant is rewarded for the recruitment efforts by receiving awards based on the "recruited" program registrant's subsequent purchases, or through any other incentive method used to encourage program registrants to recruit (for example) friends, family members, business colleagues, or other. Such an incentive structure can help facilitate early adoption by the public at large.

FIG. 23 illustrates how notification about incentive offer redemptions and rewards may be provided to the program registrant in accordance with one embodiment. In FIG. 23, the information about redeemed incentive offers may be provided to the program registrant through, for example, a web-accessible site or smartphone app. The program registrant is informed of the date of the incentive offer redemption 23A, the merchant from whom the incentive offer was redeemed 23B, the eligible transaction amount 23C, and the percentage reward based on the delivered incentive offer 23D. In this example embodiment, the incentive program manager takes a transaction fee based on the amount of the reward (in this case 10% of the total reward amount) 23E, and the remaining award which goes to the program registrant is set forth in the next column 23F. The status of the reward is also provided to the program registrant in FIG. 23, and is designated as either "Delivered," meaning that the reward has been delivered to the program registrant as by, for example, depositing the reward into a checking or other bank account, or as "Pending" meaning that the deposit has not yet occurred, but is expected 23G. The final column provides information to the program registrant as to how the reward was delivered 23H. In this example, the program registrant has requested that, at least restaurant and bar transaction rewards (indicated by R) be applied to pay down a pre-existing credit card, while salon and hotel transaction rewards (indicated by S and H) are deposited into a bank account, such as a checking or saving account.

As illustrated in FIG. 24, the system and method of this disclosure, in certain embodiments, provides program registrants that have an incentive offer delivered by the IPM in accordance with the system and method of this disclosure, with the ability to "haggle" with the merchant. In accordance with dne embodiment of the system and method of this disclosure, a program registrant solicits incentive offers, such as 25% off on food and drinks within ¼ mile of current location and available for redemption that day, if a restaurant or bar has an incentive offer available it is then delivered to the program registrant through, for example, an "app" or other smartphone portal. The specific interface is not critical and any interface that facilitates feedback is within the scope of the system and method.

In one embodiment, the "app" or smartphone portal is configured with a button that allows the program registrant to seek a better, or more preferable to the program registrant under the specific circumstances, incentive offer from the merchant. By way of example, upon receiving an incentive offer that corresponds, either closely or specifically, to the program registrant's requested terms, the program registrant can, in some embodiments, tap the "haggle" button, to solicit more preferable terms.

Upon indicating that a program registrant would like to haggle over the terms of the incentive offer, the online system or smartphone "app" presents an online interface allowing the program registrant to select incentive offer parameters that are more to the program registrant's liking, such as a greater percentage rebate amount for a larger minimum transaction amount. An exemplar interface is illustrated by drawings 24A and 24B.

In one embodiment, a program registrant utilizes a smartphone app to solicit available incentive offers for restaurants within ¼ mile of their current location. Upon reviewing a total of 4 incentive offers through the smartphone app, the program registrant sees a restaurant that is of particular interest, but believes the terms of the delivered incentive offer are inadequate. The program registrant then hits the "haggle" button on the screen associated with the incentive offer potentially of interest to the program registrant.

The smartphone app then presents the program registrant with an overview of the incentive offer terms, and allows the program registrant to modify certain terms, or enter new terms that will make the incentive offer more acceptable to the program registrant. In the example reflected in 24B, the program registrant changes the reward from 25% cash back to a 35% applied directly to their credit card bill, and alters the minimum purchase amount for redemption of the incentive from $30.00 to $100.00.

The smartphone app then transmits the program registrant's revisions to the IPM which analyzes the offer from the program registrant, and compares it to the outer limits of acceptable incentive offers selected by the merchant in an IPM controlled or accessible database. The outer limits analysis may, in certain embodiments, include an analysis of the extent to which the program registrant's demographic and transactional information comport with a pre-defined profile from the merchant of its ideal customer. The closer the program registrant profile hews to the merchant's preference for its customers, the more likely the IPM system is to accept a counteroffer from a program registrant.

It is worth noting, that the IPM writes and stores haggle data into its database indicating the program registrant's tendency to "haggle" over incentive offers. Such haggle data is incorporated into the profile data and allows the IPM to selectively present less favorable offers to program registrants with a history of "haggling" extensively. Such offers are less desirable, at least initially, than those provided to program registrants with a similar demographic and transactional profile in the expectation that such program registrants will haggle and ultimately receive and redeem incentive offers that are consistent with those of a similar profile.

In yet another embodiment, the IPM integrates with a database of restaurant menus, and the program registrant requests incentive offers specific to particular menu items. Where the merchant has configured their EPI terminals to transmit data regarding specific products purchased from the merchant to the IPM as part of the "swipe," an incentive counteroffer directed to specific menu items from a program registrant is accepted or rejected by the IPM. If accepted by the IPM, the incentive offer may be redeemed by the program registrant simply by making a purchase that complies with the terms of the accepted incentive offer/counteroffer by utilizing the relevant electronic payment instrument.

In yet another embodiment, where the merchant has not configured the terminals to transmit specific product purchase information, the IPM accepts a product specific incentive counteroffer and transmits an alphanumeric code, bar code, or traditional electronic coupon to the program registrant through a smartphone "app" that the program registrant presents to the merchant in order to redeem.

By way of example, a program registrant utilizing an online menu to solicit, rather than a specific percentage or dollar discount, a specific price on certain items, such as $10.00 for two Summit tap beers and $6.00 for an appetizer of chicken wings, where the normal list price is $13.00 for the beers and $9.00 for the wings. Where the terminals are configured to transmit specific purchase data to the IPM, the incentive counteroffer, where accepted, is redeemed simply by tendering an enrolled EPI for payment, or, where not so configured, the IPM simply transmits a traditional electronic coupon that the program registrant presents at the merchant for redemption.

Figure 25:
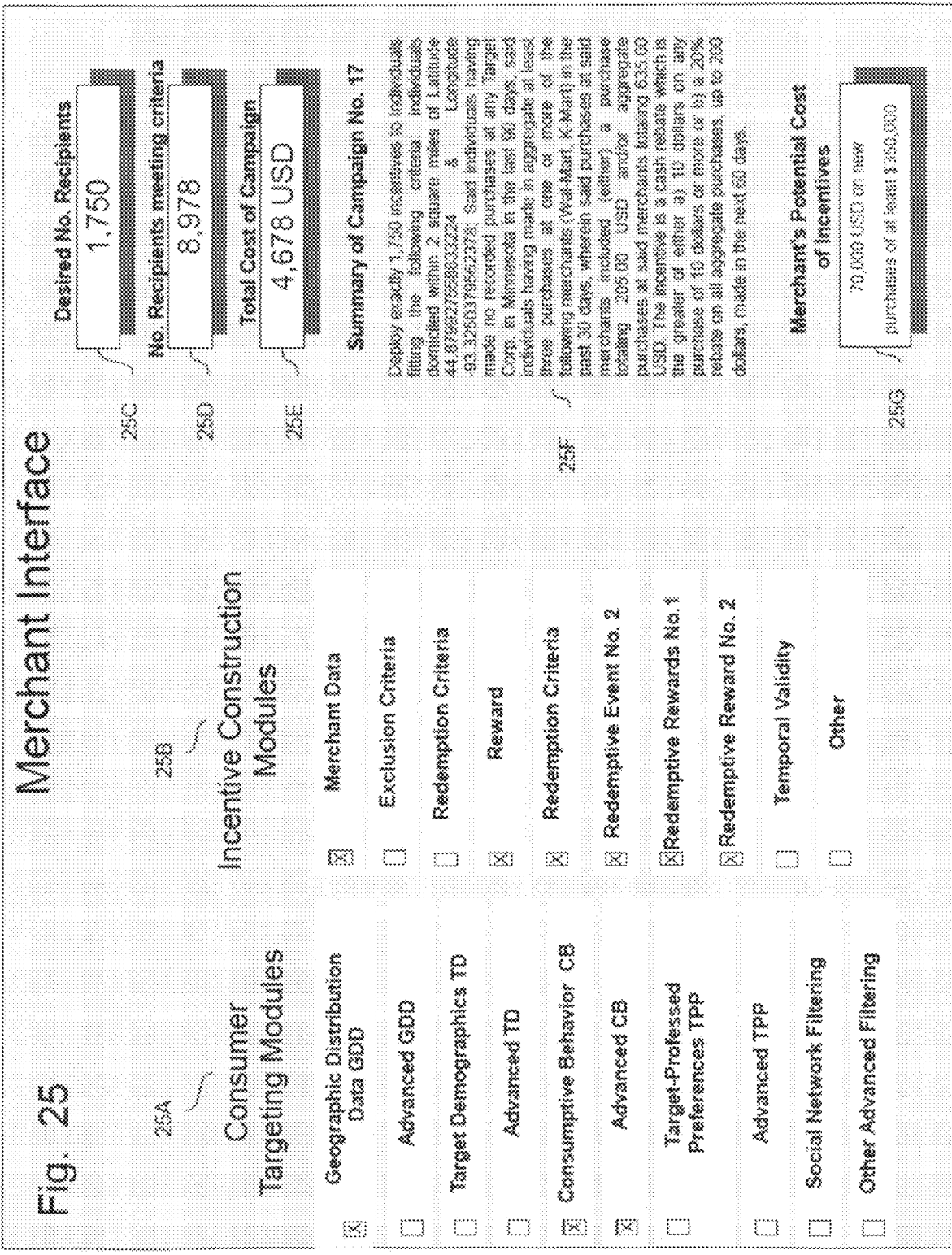
FIG. 25 is an example of a merchant interface that may be employed to design, implement, and manage one or more targeted incentive campaigns in one embodiment.

FIG. 25 is an exemplar depiction of a graphical user interface utilized by Merchants to enter data into one or more underlying databases stored on one or more computers in order to facilitate the creation and management of incentive offers and campaigns. In one embodiment, Consumer Targeting Modules 25A may be accessed in order to provide information to one or more underlying databases (See generally FIGS. 15-16 and FIG. 30A, infra.).

FIG. 34 is an exemplar depiction of an underlying GUI specific to the entry of data that is used to, among other things, limit the geographic distribution of incentives to those individuals residing in a defined area. As depicted, the Merchant (or any entity defining the "metes and bounds" of an incentive offer or campaign) designates that they wish to utilize three categories of data in constructing their offer: Geographic Distribution Data, Consumptive Behavior Data, and Advanced Consumptive Behavior data. In this embodiment, Merchants are charged for utilizing data relevant to the distribution of their incentives, some of that data being "Standard" data" and some being "Advanced" data. There are no objective criteria by which data is categorized as "Standard" or "Advanced", however in this embodiment, Advanced data represents data that is more costly to utilize and/or premium data that is obtained or generated through the use of the system and method.

An example of the utilization of standard "Consumptive Behavior" data in this example includes data indicating that a user has made purchases in the past at an Italian Restaurant. By clicking on the "Consumptive Behavior" module, the Merchant utilizes the GUI to restrict the deployment of an incentive to individuals that have engaged in consumptive behavior that is consistent with the past and future purchase of Italian food. See, e.g., FIG. 30A (see, Incentive ID 4). By designating these criteria, the search algorithm queries a database for individuals that have records of transactions at merchants, wherein said merchants are "coded" as being an "Italian Restaurant" (see, e.g., FIG. 29A; Merchant ID 0013) as opposed to a "Asian Restaurant" (id. at Merchant ID 0005). Querying one or more databases for this data yields a number of potential participants that fit the merchant's desired "target profile" for receiving an incentive.

In another embodiment, and as an alternative or in addition to utilizing past transaction data associated with merchants coded to be "Italian restaurants," the system queries the database regarding food "likes" and "dislikes" of specific program registrants (see, e.g., FIG. 28A). By way of example, the data contained in table 28A, which is part of a database housed in one or more computers, is populated by users as part of providing preference data via a "Participant Interface" GUI (for example, FIG. 26) wherein the program registrants themselves directly indicate what they like and do not like. In another embodiment, the fields in the database table (FIG. 28A) are populated by importing data from one or more social network sites—e.g., Facebook—containing data on that user's preferences, including food preferences. In an alternative embodiment, the IPM builds this database by running queries, whether scheduled or unscheduled, of accessible databases housing participant transactional data and merchant data. The queries identify those individuals that patronize Italian restaurants with a frequency sufficient to generate a "Likes Italian" designation in conjunction with a particular program registrant. As will be appreciated by one of skill in the art, there are a variety of ways to construct a Merchant GUI facilitating the construction of an incentive campaign.

An example of data considered to represent "Advanced Consumptive Behavior" is reflected in FIG. 25A (and thus subject to enhanced pricing for its utilization), in one embodiment includes program registrants satisfying the following criteria: 1) the set of Individuals that "like" Italian restaurants; 2) that have patronized (specifically) Italian restaurant 0013 (FIG. 29A); and 3) have spent 50% more at Merchant 0013 (FIG. 31B) on average than other participants, said 50% figure calculated by averaging the aggregate purchase amount of all participants that have patronized Merchant 0013 in the last six months. As will be apparent to one of skill in the art, "advanced" data of this type is valuable to any merchant wishing to target individuals that satisfy specific criteria.

The above represent only a few exemplarity embodiments of the system and method; as will be recognized by one of skill in the art, an infinite variety of such criteria may be utilized across a wide array of embodiments without departing from the scope of the invention.

In another embodiment, the merchant interface is employed to construct the incentive offer. Incentive Construction Modules FIG. 25B generate incentive offer data based on criteria selected by the merchant. In one example, the merchant selects those stores or subset of stores at which an incentive may be redeemed (Merchant Data); data which, if associated with an otherwise qualifying participant, may be used to exclude them from receiving the incentive offer (Exclusion Criteria Data); data dictating the act or acts required to qualify for a redemption (Redemptive Events); and the nature of the reward which is earned by satisfying those Redemptive Events (Reward; Redemptive Rewards); the time period or periods during which the reward may be redeemed, including, as facilitated using a separate "Temporal Reward" GUI, the staggered start and end deadlines for redeeming the incentive. As will be recognized by one of ordinary skill in the art, other embodiments may be utilized without departing from the scope of the invention.

Additional selection criteria accessible to the merchant through a merchant interface (or alternative interface) includes options to designate the number of desired recipients one wishes to target 25C, the number of participants 25D that satisfy the set of targeting parameters entered by the merchant via (for example) 25A; and the total cost of launching the campaign 25E in those embodiments where merchants are charged for deploying the incentive or for utilizing the functionality of the IPM. In one embodiment, a merchant is presented with a summary of the constructed campaign 25F, to ensure its accuracy, and in other embodiments may be presented with summary data indicating how much the incentive campaign may cost, given 100% participation 25G, in this instance a cost (in rebates that will be paid out) of 70,000 USD on a minimum of 350,000K in potential purchases.

As previously mentioned in conjunction with FIG. 25, FIG. 34 depicts a GUI for manipulating Geographical Distribution Data. In one example, the Geographical Distribution Data is used to limited the geographic distribution of an incentive to individuals identified in one or more databases that are domiciled in a designated area. In this embodiment, the merchant limits the distribution of the incentive 34A to a specific area. The limiting of the distribution may be accomplished in any one of a number of disparate ways, as will be noted by one of skill in the art, however in the embodiment depicted, the merchant utilizes the GUI to select a subsection of a city map 34B, in this instance an area covering much of the "Uptown" section of Minneapolis, Minn. Using the map, which itself draws on a database of points, such as latitude and longitude points, the desired area is defined, as indicated by the four coordinate points on the four corners of the designated area. Utilizing those points, the system calculates the total set of coordinates that are contained in that area. By comparing coordinate data for individual participants 34E this embodiment of the system and method identifies program registrants 34D that are domiciled in the selected 34B area for possible inclusion in the incentive campaign. While this embodiment and its equivalents permit extremely accurate targeting of incentives, as will be recognized by one of skill in the art, any one of a number of alternative methods and embodiments may be employed without departing from the scope of the invention. For example, zip codes may also be utilized to identify individuals within a defined area. In another embodiment, address data stored in conjunction with participant identification can be correlated with geographic location where, for example, a merchant chooses to target people in a certain city or a certain state for inclusion in their campaign.

FIG. 26 represents one embodiment of a GUI for program registrants to manage aspects of their interaction with IPM. In this embodiment, the user logs onto their account which is accessible via a secure server 26A2 the information on which is maintained and protected using, in one embodiment, 256-bit SSL EV encryption. Once logged into their account, the program registrant may access the incentives delivered to them 26A1. The program registrant, in one embodiment, may utilize the GUI to enter EPIs, such as debit and credit cards, in order to enable the system to track their transactions, the data from which may be automatically entered into database tables and thereby expand the functionality of the system. The program registrant may also utilize the GUI to link external data sources to the IPM 26A4, including social websites storing information about the program registrant, including "likes" and "dislikes," in order to add additional personal data to the system thereby enabling it to function with even greater accuracy. Similarly, portal 26A5 permits a program registrant to record their likes and dislikes (e.g., "I like Italian food)", wherein the data provided by the program registrant via the graphical user interface is automatically entered into a database (see, e.g., 28A) which may be queried by merchants, including merchants operating Italian restaurants, that wish to use the system and method to identify and deliver incentives only to those individuals with a demonstrated affection for Italian food.

As depicted in 26A6, the program registrant may actively manage the frequency with which they receive incentives and dictate how they want to receive rewards. As depicted in 26A7, the program registrant may elect to employ filtering technology to restrict or otherwise opt out of incentive campaigns that they otherwise would have been eligible to receive. By way of example and as indicated in this embodiment, a program registrant may elect to receive a limited number of incentives in a day or a week, for example. A participant may utilize the GUI to restrict out all incentives that are not incentives for restaurants, thereby eliminating the need to review offers for manicures, which are of no interest in this example. Additionally, where a program registrant receives too many offers, they may choose to block, filter, or otherwise avoid any incentive offer that fails to meet the program registrant's identified threshold for a "good" deal. In addition, program registrant may block incentive offers from any specific merchant.

The system and method is also applicable to many pre-existing "daily incentive" services. For example, utilizing the GUI 26A7, a program registrant may elect to actively manage their Groupon incentives so that the program registrant need not have to read and discard classes of unwanted incentives. In one embodiment, the program registrant indicates the parameters of the filter they want to employ, and all such incentives delivered by the system and method are filtered out if they do not conform. In such instances, the user, in one embodiment, provides the GUI with login information for the email account where she received Groupons. Groupons are then coded as, for example, "for a restaurant" or "for a service," and where a program registrant has elected to filter out "restaurant" incentives, or "service" incentives, the system automatically logs into the email account, deletes the Groupon, and logs out of the email account automatically. In other embodiments, the third-party provider, e.g. Groupon, itself links to the IPM and the IPM instructs the third-party not to deliver offers that fail to satisfy the filtering criteria. Such filtering is performed by "coding" or categorizing the kind and terms of the incentive and then performing database filtering or queries to identify only those individuals whose filtering criteria permit the delivery of the incentive.

In the instant embodiment 26A7, the program registrant has indicated they want to employ filters for Groupon, Living Social, Buy WithME, Dealon, and KGB Deals to reduce the flow of unwanted offers. As will be recognized by one of skill in the art, the same database-driven system for implementing said filters in conjunction with the IPM may be deployed with the same effect (and without departing from the scope of the invention) in conjunction with other discount services, such as the ones names above.

FIGS. 27A, 27B, 28A, 28B, 28C, 29A,30A, 30B, 31A and 31B provide examples of the data stored in one or more databases accessible by the IPM, which, as disclosed supra may be utilized in conjunction with the targeting, distribution and redemption of incentives. By way of example, where a merchant is constructing an incentive campaign and is attempting to target individuals domiciled in the 55428 zip code region (for example), and is further looking for that subset of those individuals with a demonstrated preference for That food, a database query with access to the data found in 27A (Participant location data) in conjunction with 28A (participant food preferences) will yield at least one potential match, namely Participant ID 0003, who has authorized American Express Card 376254803268183 for use with the system and method. Where the merchant in fact deploys a targeted incentive to participant 0003, said participant may redeem that incentive using that registered American Express card, or any other card Participant 0003 chooses to association with IPM, and transactions utilizing those cards are monitored or otherwise accessed for qualifying transaction (redemptive events). Where such a redemptive event has taken place, the system queries FIG. 31A to determine that the participant's preferred reward is to use the rebate to "pay down" an American Express card.

The functionality of the system is driven by data, and as demonstrated above, the emergent properties and capabilities of the database expand with the addition of information. One example of the expanded functionality is the ability to aggregate transaction data over time to ascertain differences in average spending behavior at specific merchants. See, e.g., FIG. 31B. In other embodiments, data regarding future travel may be entered into a database (e.g., 27B) or otherwise imported directly to the IPM from an outside source thereby enabling (for example) a business traveler's ability to receive timely incentives in the cities where he or she will be traveling. FIGS. 27A, 27B, 28A, 28B, 28C, 29A,30A, 30B, 31A and 31B

Figure 33:
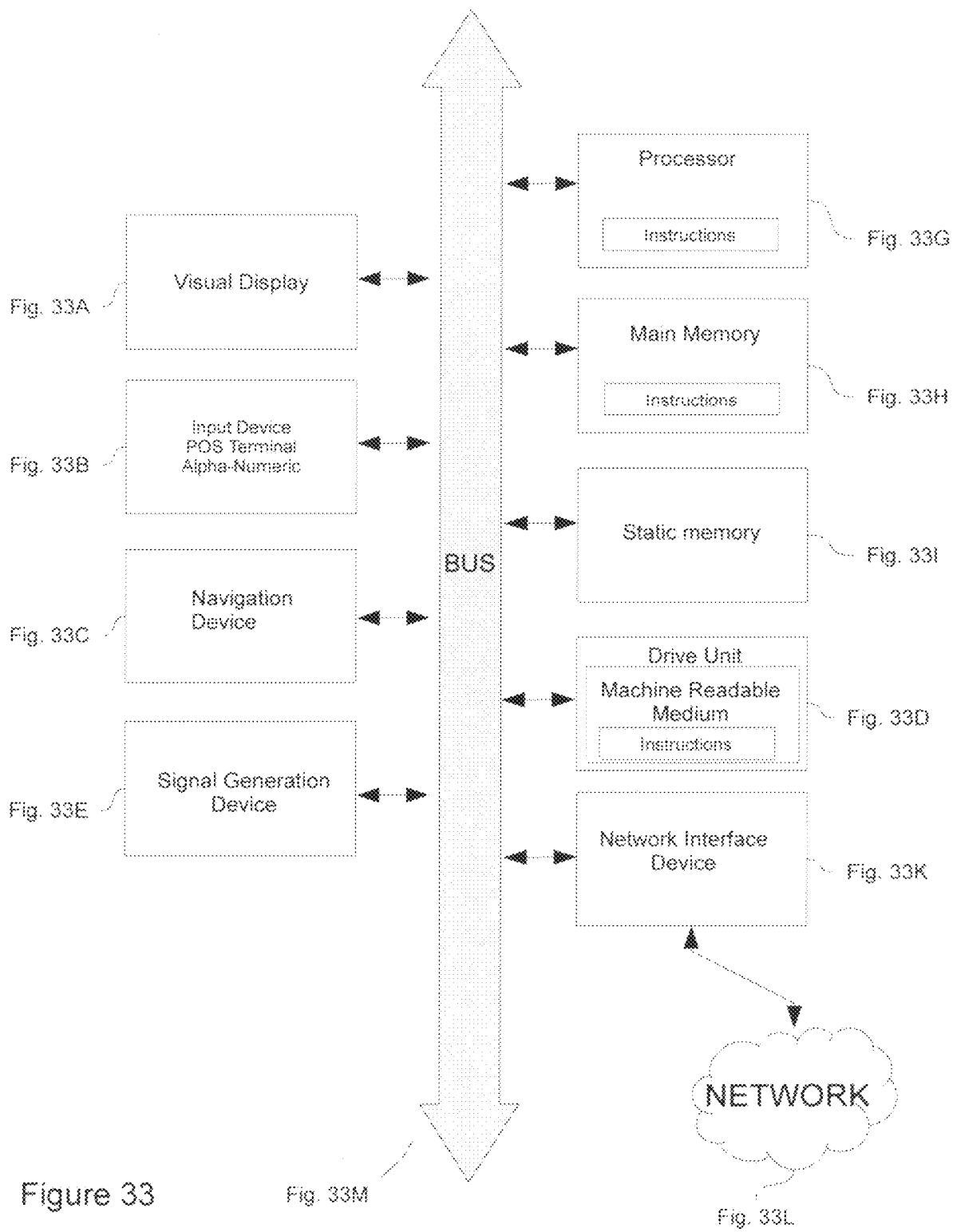
FIG. 33 is a diagram representing the interaction of various hardware utilized by the system and method.

As illustrated in FIG. 33 a machine in the illustrative form of a computer system causes the system to perform one or more of the IPM-related methodologies discussed herein. A shown, a bus 33M allows the various machine elements to maintain operative communication between and among each other. As recognized by one of skill in the art of computer systems, a visual display 33A and input devices 33B and 33C facilitate operation of the system. Static and main memory 33I and 33H are memory structures allowing the storage and retrieval of information and the loading of instructions permitting the hardware to execute instructions related to the IPM-related methodologies described herein. Static memory, in certain embodiments, provides storage for IPM-related databases containing incentive data, profile data, program registrant data, and other data structures.

Drive unit 33D and signal generation device 33E execute instructions relating to database queries and other IPM functions in operative communication with main and static memory. Drive unit and signal generation device, generate signals corresponding to the data structures relied upon by the IPM in certain embodiments described more fully herein. Network interface device 33k enables communication with a computer-accessible network, such as the Internet, to facilitate the upload and download of data, including transactional data, incentive data, profile data, and program registrant data. In some embodiments, the network is in further operative communication with devices controlled by program registrants, merchants, and third-party hosts of data used by the IPM.

As previously indicated, supra, pre-existing credit card issuers gather limited information that is attributed to an individual transaction, such as the date the transaction was authorized, the business where the purchase was made, the amount of the purchase, the time of day of the purchase, etc. In many ways, a credit card swipe terminal is a mechanism for exchanging information. The same technology with relatively simple software modifications and well within the knowledge of those of skill in the art can be used to convey much more information concerning a transaction (or even past transactions or other data).

That information is potentially extraordinarily useful in crafting and targeting incentive offers. Take for example a typical visit to a store such as Target or Walmart. The average person shopping on a weekend may be buying such items as CDs, various canned goods, frozen pizzas, towels, items of clothing etc. Each of these items possesses an identifier, such as a bar code, which is "scanned" or otherwise "read" in at the checkout aisle, and the particular barcode for a particular item is matched in an in-store database with a price which is then tallied by computer means (e.g., via a register) along with the prices of every other item purchased. Additional calculations are also performed, such as associating a specific percentage of tax with the specific item that is scanned in. When all the purchases have been rung up, and all additional amounts have been assessed (e.g., taxes) a final total is communicated to the customer and the customer tenders payment, whether that be cash or credit card. Where cash is used, the transaction itself is, for all intents and purposes, anonymous, which is to say that the store from which the items were purchased will be unable to identify the specific individual that actually purchased items. Where, however, an electronic payment instrument, such as a credit, debit, gift, check card or transactionally-enabled smart device is utilized, the store is able to identify the individual by virtue of the name on the credit card or the entity associated with the payment instrument. In addition to the store, a credit card company and other parties involved in processing the electronic transaction may possess a certain amount of information about the transaction, such as the amount of the transaction, the name and type of merchant were the transaction took place, the date upon which the transaction took place, the time that the transaction took place, etc.

Neither the credit card issuer, nor other entities privy to the transaction (see, e.g., FIG. 12) generally know what was purchased, as such information is not transferred to the credit card company through the data terminals or via standard transaction data channels. Modifying the data terminals or employing other transaction data channels in order to transmit additional data is possible by, for example, employing software modifications to POS hardware and transaction data recipients up and down stream. Properly modified, the data terminals can be made to communicate detailed information about what was purchased and in what quantities during any given transaction. Such information may go through the traditional route of sending it to the acquirer then through the credit card network then through the issuing bank as set forth in FIG. 9. Where a credit card issuer acts as an incentive program manager, the modified, enhanced, and detailed card information can be transmitted through the credit card terminal, or through a computer to another entity such as a customer database used for the specific purpose of identifying and targeting program registrants for more optimal incentive offers. As one of ordinary skill in the art will readily realize, there are numerous methods by which augmented information regarding a customer's purchases may be communicated to a database, however in common to most of these methods a credit card terminal or a computer accessing the Internet through the Internet connection must the configured to transmit the additional data. While configuring such a system to transmit this kind of data may be counter-intuitive (because, among other reasons in increases the amount of data that must be transmitted and thus the time necessary to authorize a transaction) configuring the system to do so is, as will be recognized by one of skill in the art, a straightforward enterprise. Whatever data is thus communicated, it may, but need not, be encrypted prior to sending to a recipient database. Alternatively, some but not all of the data may be encrypted.

As discussed earlier and as detailed further herein, these databases may be maintained by an acquiring bank, a global payment company such as Visa or MasterCard, or a card issuing bank such as Wells Fargo or US Bank, or in an alternative embodiment another entity capable of receiving electronic transmissions from retailers. Note that in some embodiments the traditional information that is passed from the merchant through an acquirer and the card associations (e.g., the Visa network cloud) and finally the card issuing bank, need not be the only entities that receive data electronically regarding the transaction and in fact these entities need never receive augmented information at all, as it can be sent to a database separate and aside from the card processing depicted in FIG. 9. In an alternative embodiment a customer will make purchases, a merchant will ring them up and, the customer will slide an electronic payment instrument, such as a credit card, through an electronic terminal. The information stored on the magnetic strip of the card, or a subset thereof, in conjunction with data regarding the purchase will be sent electronically to the acquirer, through the card associations such as Visa, and on to an issuing bank. At the same time another set of information traveling over the same or different system may communicate additional information to a database maintained by a third party and that additional information may be comprised of, for example, specific numbers of items purchased, the median price of said objects, what the items themselves actually are, and virtually any other information regarding the purchase that is susceptible to electronic characterization and communication. In fact, where a store such as Walgreen's has previously and internally tracked customer data for its own use by tracking purchases made on a specific credit card or credit cards, that past stored data (or a subset thereof) may also be transmitted to an outside entity or database as well.

By way of example, if the details of what was purchased at a merchant may be sent through the authorization network (or alternatively though any other electronic means) then the incentive program manager to further determine and refine patterns of what a program registrant purchases and what they do not purchase. In yet another embodiment, information on the barcode of any product would be registered, and the information concerning the products purchased would be forwarded to the IPM or an acquiring bank (for example) (which in one embodiment is a credit card company) along with information that can be used to refine and more specifically target incentive offers to the program registrant. In another embodiment that same information can be forwarded to an external database utilizing any communicatively appropriate means, such as via the interne, phone, card terminal, touchless "swipe" terminal, etc. All that is required is that the data is communicated by the merchant or the customer via electronic means to (directly or indirectly) a database tied or accessible by the system.

The present invention has been described above in reference to certain illustrative embodiments and drawings in sufficient detail to allow the system and method to be practiced by those of ordinary skill in the art of incentive system and method design and implementation. However, other embodiments in addition to those set forth herein may, and likely will, be apparent to those of skill in the art based upon a review of the foregoing specification and drawings. Accordingly, the foregoing description is to be understood as illustrative of the invention, which is defined by the following claims and other claims that are supported by this description, as well as their equivalents.

All embodiments and examples have been described herein in detail. One of skill in the art will, however, recognize that elements and/or steps from one embodiment or example may be combined with elements and/or steps of one or more other embodiments or examples without departing from the scope of the invention.

Individual elements of the present invention may be combined with one another and/or with other known incentive methods without departing from the intended scope of the invention. For example, the methods disclosed herein that enable participants to implement advanced incentive filtering may be utilized in conjunction with other aspects of the disclosed system and method, but may also be implemented in connection with other known incentive systems and services to provide previously unknown and thereby novel features and function without departing from the scope of the invention. By way of another example, the system and methods disclosed herein for soliciting or enabling incentive offers redeemable in regions remote from the participant's home may be combined with other steps and elements disclosed herein without departing from the scope of the invention. However, that and other embodiments or examples disclosed herein for enabling the receipt of incentive offers in remote geographic locations may be employed in conjunction with one or more known incentive methods and services (such as known group-based or "social" incentive systems) without departing from the scope of the invention. As one of skill in the art will recognize, any of the new functionality enabled by the embodiments disclosed herein can be combined with known existing systems to produce the advanced and novel functionality without departing from the scope of the invention.

One or more elements may be omitted from an embodiment or example of the system without departing from the scope of the invention. By way of example, an embodiment or example of the system and method may employ incentive filtering, via any of a variety of disclosed means, and yet not employ advanced merchant filtering.

While the disclosed embodiments or examples operate in conjunction with computer hardware and software, other forms of hardware and software may be employed to enable the same functionality found in the system and methods without departing from the scope of the invention. Advancements or later-developed technology (for example, new methods of communication or new EPIs) may also be utilized in conjunction with the disclosed system and methods without departing from the scope of the invention.

As will be recognized by one of skill in the art, one or more steps or elements of the invention may be implemented (in whole or in part) by using geographically desperate hardware, software, and processing means without departing from the scope of the invention. That one or more steps in the system and method are carried out in desperate countries does not remove that embodiment from the scope of the invention. Indeed, it is expressly within the scope of the invention that, with respect to some embodiments, one or more steps or aspects of the claimed system and method will be carried out in different countries. That one or more aspects of the invention are implemented in other countries does not vitiate the fact that the practice of claimed embodiments of the system and method are effectively directed to occur by any entity that implements a necessary step of that system and method in the United States. Attempts to digitally launder one or more required steps in certain embodiments of the system and methods do not operate to vitiate act of infringement under United States law.

What is claimed:

1. A computer-implemented method for generating a targeted incentive by an Incentive Program Manager (IPM), the computer-implemented method comprising:
   accessing first transaction data associated with a first program registrant from a remote networked database, wherein the transaction data is transmitted to the IPM via electronic means from at least one of a consumer device, a merchant device, a merchant acquirer device, an interchange device, or an issuing bank device;
   obtaining incentive redemption parameter data for the targeted incentive;
   obtaining first registrant parameter data for the first program registrant;
   determining that the targeted incentive should be administered to the first program registrant based upon the first registrant parameter data;
   identifying a first electronic payment instrument of the first program registrant;
   associating the targeted incentive data with the first electronic payment instrument;
   identifying, from the first transaction data, second transaction data for a first discrete purchase between the program registrant using the first electronic payment instrument and a counter party;
   determining whether the first discrete purchase satisfies the incentive redemption parameter data; and
   in response to determining that the first discrete purchase satisfies the incentive redemption parameter data, confidentially granting an incentive corresponding to the targeted incentive data to the first program registrant after completion of the first discrete purchase, wherein the confidentially granting comprises isolating the counter party at the point of sale from observing a first indication of the confidential granting of the incentive.

2. The method of claim 1, wherein: the targeted incentive is associated with first incentive eligibility criteria data; and determining that the targeted incentive should be administered to the first program registrant comprises determining that the first registrant parameter data conforms to the first incentive eligibility criteria data.

3. The method of claim 2, wherein first incentive eligibility criteria data define at least one of a merchant type criterion, a merchant location criterion, and an incentive property criterion.

4. The method of claim 1, wherein: the isolating the counter-party comprises generating a first post-sale output on a counter-party device associated with the counter-party; and the first post-sale output excludes any indication of the confidentially granting of the targeted incentive.

5. The method of claim 1, wherein:
the isolating the counter-party comprises generating a second post-sale output on a registrant device associated with the first program registrant; and
the second post-sale output includes at least one indication of the confidentially granting of the targeted incentive.

6. The method of claim 1, wherein:
the isolating the counter-party comprises generating a third post-sale output on a first electronic payment device associated with the first electronic payment instrument;
the third post-sale output comprises a first indication of a first payment amount to the first electronic payment instrument;
the first payment amount is determined based on incentive parameter data for the targeted incentive.

7. The method of claim 6, wherein the first payment amount is further determined based on a transactional fee associated with the first discrete purchase.

8. An apparatus comprising at least one processor and at least one memory including computer program code, the at least one memory and the computer program code configured to, with the at least one processor, cause the apparatus to perform a method for generating a targeted incentive by an Incentive Program Manager (IPM), the method comprising:
accessing first transaction data associated with a first program registrant from a remote networked database, wherein the transaction data is transmitted to the IPM via electronic means from at least one of a consumer device, a merchant device, a merchant acquirer device, an interchange device, or an issuing bank device;
obtaining incentive redemption parameter data for the targeted incentive;
obtaining first registrant parameter data for the first program registrant;
determining that the targeted incentive should be administered to the first program registrant based upon the first registrant parameter data;
identifying a first electronic payment instrument of the first program registrant;
associating the targeted incentive data with the first electronic payment instrument;
identifying, from the first transaction data, second transaction data for a first discrete purchase between the program registrant using the first electronic payment instrument and a counter-party;
determining whether the first discrete purchase satisfies the incentive redemption parameter data; and
in response to determining that the first discrete purchase satisfies the incentive redemption parameter data, confidentially granting an incentive corresponding to the targeted incentive data to the first program registrant after completion of the first discrete purchase, wherein the confidentially granting comprises isolating the counter-party at the point of sale from observing a first indication of the confidential granting of the incentive.

9. The apparatus of claim 8, wherein:
the targeted incentive is associated with first incentive eligibility criteria data; and
determining that the targeted incentive should be administered to the first program registrant comprises determining that the first registrant parameter data conforms to the first incentive eligibility criteria data.

10. The apparatus of claim 9, wherein first incentive eligibility criteria data define at least one of a merchant type criterion, a merchant location criterion, and an incentive property criterion.

11. The apparatus of claim 8, wherein:
the isolating the counter-party comprises generating a first post-sale output on a counter-party device associated with the counter-party; and
the first post-sale output excludes any indication of the confidentially granting of the targeted incentive.

12. The apparatus of claim 8, wherein:
the isolating the counter-party comprises generating a second post-sale output on a registrant device associated with the first program registrant; and
the second post-sale output includes at least one indication of the confidentially granting of the targeted incentive.

13. The apparatus of claim 8, wherein:
the isolating the counter-party comprises generating a third post-sale output on a first electronic payment device associated with the first electronic payment instrument;
the third post-sale output comprises a first indication of a first payment amount to the first electronic payment instrument;
the first payment amount is determined based on incentive parameter data for the targeted incentive.

14. The apparatus of claim 13, wherein the first payment amount is further determined based on a transactional fee associated with the first discrete purchase.

15. A computer program product comprising a non-transitory computer readable medium storing computer readable instructions, the computer readable instructions configured, when executed by a processor, to cause the processor to perform a method for generating a targeted incentive by an Incentive Program Manager (IPM), the method comprising:
accessing first transaction data associated with a first program registrant from a remote networked database, wherein the transaction data is transmitted to the IPM via electronic means from at least one of a consumer device, a merchant device, a merchant acquirer device, an interchange device, or an issuing bank device;
obtaining incentive redemption parameter data for the targeted incentive;
obtaining first registrant parameter data for the first program registrant;
determining that the targeted incentive should be administered to the first program registrant based upon the first registrant parameter data;
identifying a first electronic payment instrument of the first program registrant;

associating the targeted incentive data with the first electronic payment instrument;

identifying, from the first transaction data, second transaction data for a first discrete purchase between the program registrant using the first electronic payment instrument and a counter-party;

determining whether the first discrete purchase satisfies the incentive redemption parameter data; and in response to determining that the first discrete purchase satisfies the incentive redemption parameter data, confidentially granting an incentive corresponding to the targeted incentive data to the first program registrant after completion of the first discrete purchase, wherein the confidentially granting comprises isolating the counter-party at the point of sale from observing a first indication of the confidential granting of the incentive.

16. The computer program product of claim 15, wherein:

the targeted incentive is associated with first incentive eligibility criteria data; and determining that the targeted incentive should be administered to the first program registrant comprises determining that the first registrant parameter data conforms to the first incentive eligibility criteria data.

17. The computer program product of claim 16, wherein first incentive eligibility criteria data define at least one of a merchant type criterion, a merchant location criterion, and an incentive property criterion.

18. The computer program product of claim 15, wherein:

the isolating the counter-party comprises generating a first post-sale output on a counter-party device associated with the counter-party; and the first post-sale output excludes any indication of the confidentially granting of the targeted incentive.

19. The computer program product of claim 15, wherein:

the isolating the counter-party comprises generating a second post-sale output on a registrant device associated with the first program registrant; and the second post-sale output includes at least one indication of the confidentially granting of the targeted incentive.

20. The computer program product of claim 15, wherein:

the isolating the counter-party comprises generating a third post-sale output on a first electronic payment device associated with the first electronic payment instrument;

the third post-sale output comprises a first indication of a first payment amount to the first electronic payment instrument;

the first payment amount is determined based on incentive parameter data for the targeted incentive.

* * * * *

UNITED STATES PATENT AND TRADEMARK OFFICE
CERTIFICATE OF CORRECTION

PATENT NO. : 10,521,813 B2  
APPLICATION NO. : 13/176883  
DATED : December 31, 2019  
INVENTOR(S) : Okerlund Page 1 of 1

It is certified that error appears in the above-identified patent and that said Letters Patent is hereby corrected as shown below:

In the Claims

Column 79
Line 1, "counter party" should read --counter-party--

Signed and Sealed this
Fifth Day of May, 2020

Andrei Iancu
*Director of the United States Patent and Trademark Office*